United States Patent [19]
Inoue et al.

[11] Patent Number: 5,838,408
[45] Date of Patent: Nov. 17, 1998

[54] LIQUID CRYSTAL DEVICE AND ELECTRONIC EQUIPMENT USING THE SAME

[75] Inventors: Yasuyuki Inoue, Nerima; Chiyoaki Iijima; Toshihiko Tsuchihashi, both of Suwa, all of Japan

[73] Assignee: Seiko Epson Corporation, Tokyo, Japan

[21] Appl. No.: 666,284

[22] PCT Filed: Oct. 26, 1995

[86] PCT No.: PCT/JP95/02204

§ 371 Date: Jul. 8, 1996

§ 102(e) Date: Jul. 8, 1996

[87] PCT Pub. No.: WO96/13752

PCT Pub. Date: May 9, 1996

[30] Foreign Application Priority Data

| Oct. 26, 1994 | [JP] | Japan | 6-262529 |
| Oct. 26, 1994 | [JP] | Japan | 6-262530 |
| Jul. 24, 1995 | [JP] | Japan | 7-186784 |

[51] Int. Cl.[6] ............... G02F 1/1347; G02F 1/13
[52] U.S. Cl. ............... 349/118; 349/76; 349/78; 349/179; 349/181; 349/186
[58] Field of Search ............... 349/118, 76, 78, 349/179, 181, 186

[56] References Cited

FOREIGN PATENT DOCUMENTS

| A-1-222218 | 9/1989 | Japan. |
| A-2-118516 | 5/1990 | Japan. |
| A-2-167526 | 6/1990 | Japan. |
| A-3-269412 | 12/1991 | Japan. |
| A-5-19304 | 1/1993 | Japan. |
| A-5-107413 | 4/1993 | Japan. |
| A-5-157913 | 6/1993 | Japan. |
| A-6-175125 | 6/1994 | Japan. |
| A-7-20437 | 1/1995 | Japan. |
| A-7-140462 | 6/1995 | Japan. |
| A-7-146463 | 6/1995 | Japan. |
| A-7-146464 | 6/1995 | Japan. |
| A-7-225374 | 8/1995 | Japan. |
| A-7230266 | 8/1995 | Japan. |
| A-7-294908 | 11/1995 | Japan. |
| A-7-294910 | 11/1995 | Japan. |
| A-7-318968 | 12/1995 | Japan. |
| A-7-333601 | 12/1995 | Japan. |
| A-8-15691 | 1/1996 | Japan. |
| A-8-15696 | 1/1996 | Japan. |
| A-8-68982 | 3/1996 | Japan. |
| A-8-190081 | 7/1996 | Japan. |

OTHER PUBLICATIONS

Report of Research of Electronic Information and Communications Society, vol. 89, No. 421, pp. 51–54.

Primary Examiner—William L. Sikes
Assistant Examiner—Julie Ngo
Attorney, Agent, or Firm—Oliff & Berridge, PLC

[57] ABSTRACT

This invention refers to a liquid crystal device that provides a color display by utilizing a colorization phenomenon caused by double refraction birefringence of a liquid crystal, wherein the color tone that appears when no voltage or a non-selected voltage is applied is white or a non-color close thereto, and at least two colors are displayed when a voltage is applied, and electronic equipment in which this liquid crystal device is installed.

A liquid crystal device which is capable of displaying colors without using color filters and which is also capable of displaying white or a non-color close thereto is implemented by optimizing the value of $\Delta n \cdot d$ of the liquid crystal and the relationship between the value of $\Delta n \cdot d$ of the liquid crystal and the value of retardation (R) of an optically anisotropic substance such as a retardation film.

In other words, the liquid crystal cell and the optically anisotropic substance should be such as to satisfy the following relationships:

$$\Delta n \cdot d \geq 1 (\mu m)$$

$$15.5 \times \alpha^2 - 40 \times \alpha + 25.1 \leq R - \Delta n \cdot d \leq 15.5 \times \alpha^2 - 40 \times \alpha + 25.8 (\mu m)$$

19 Claims, 39 Drawing Sheets

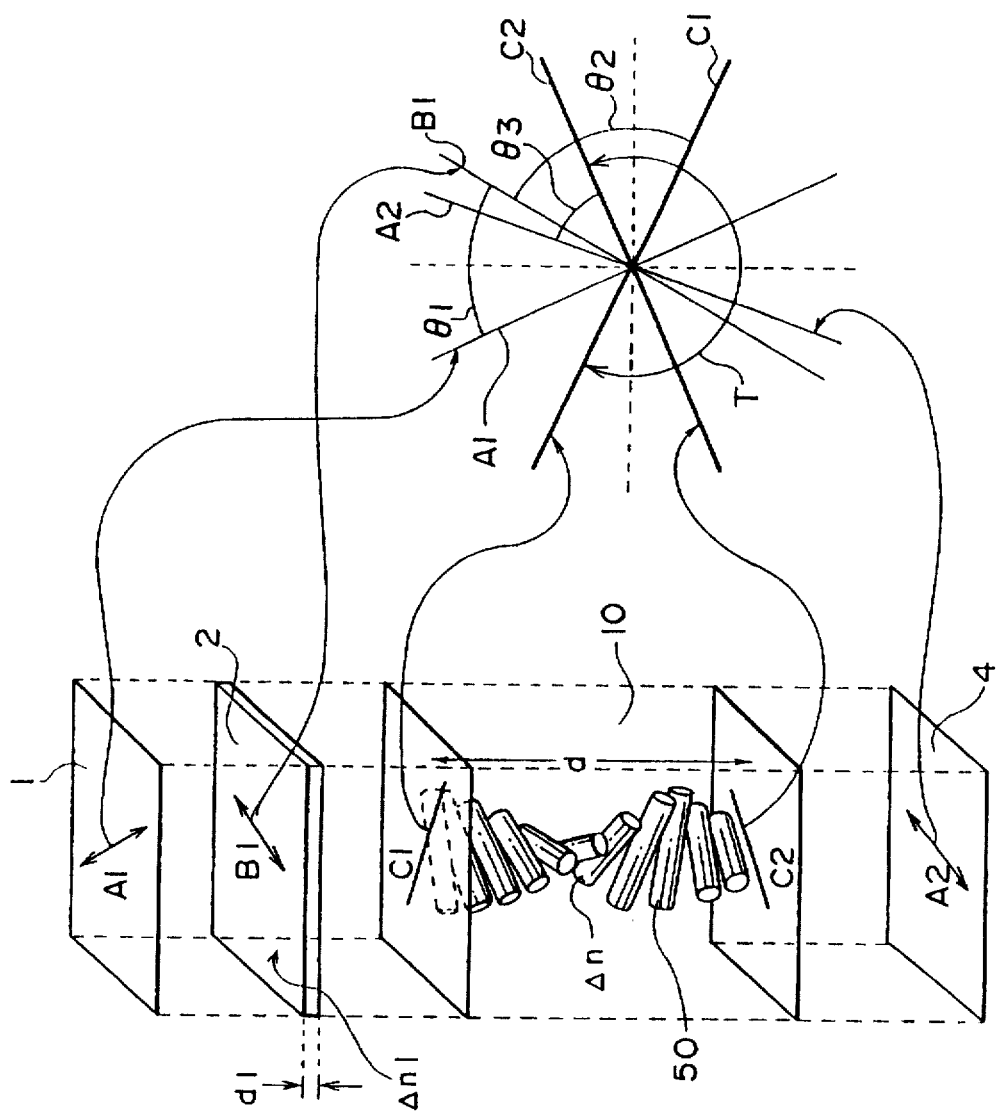

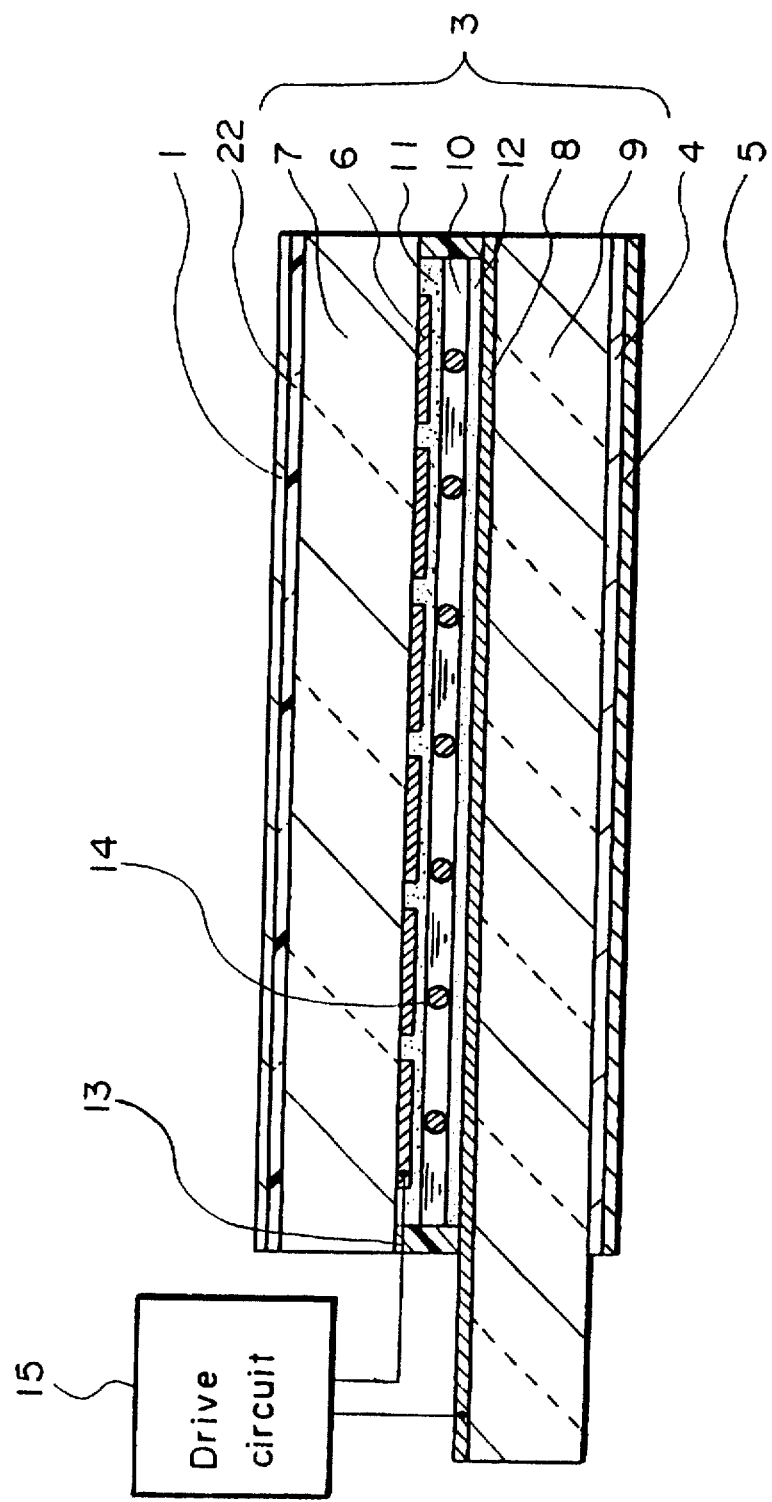

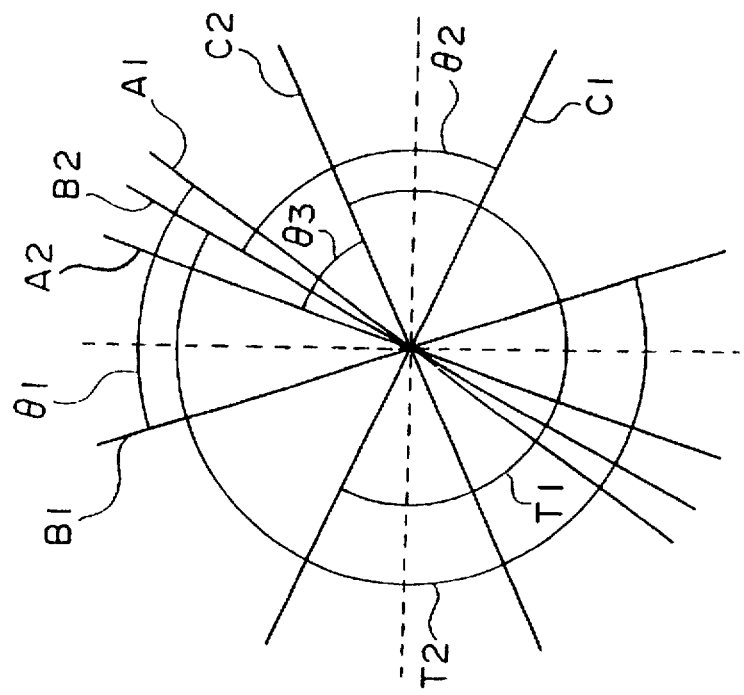
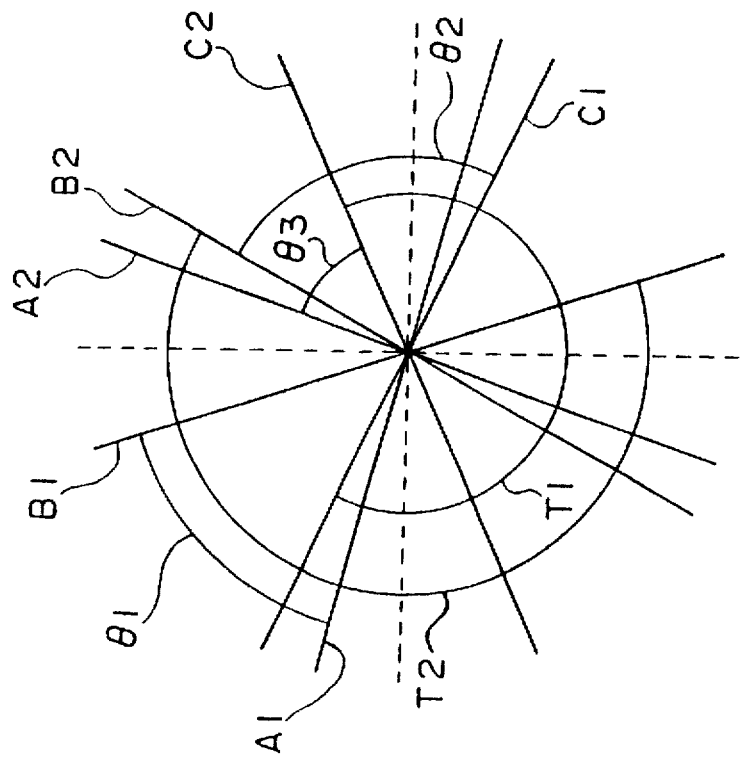

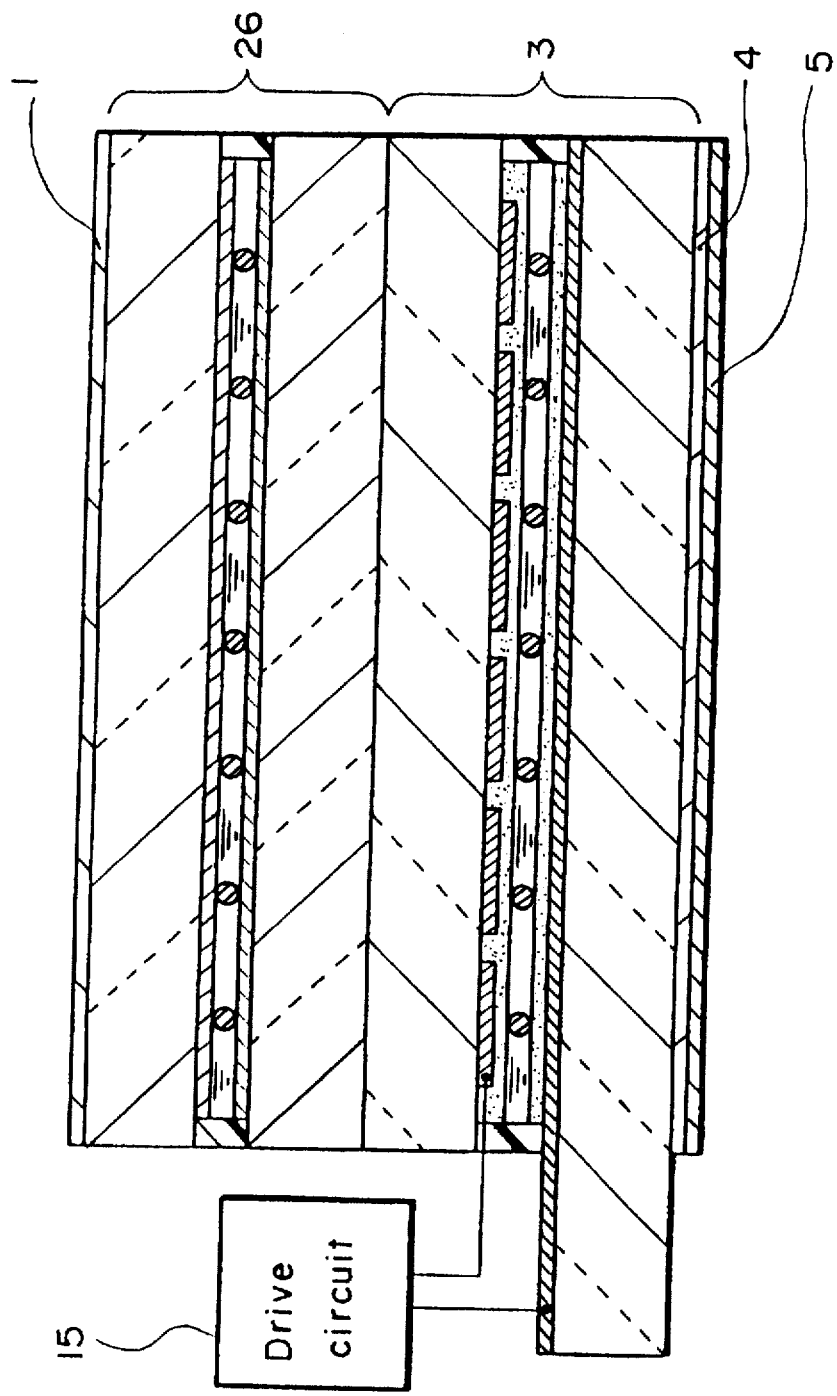

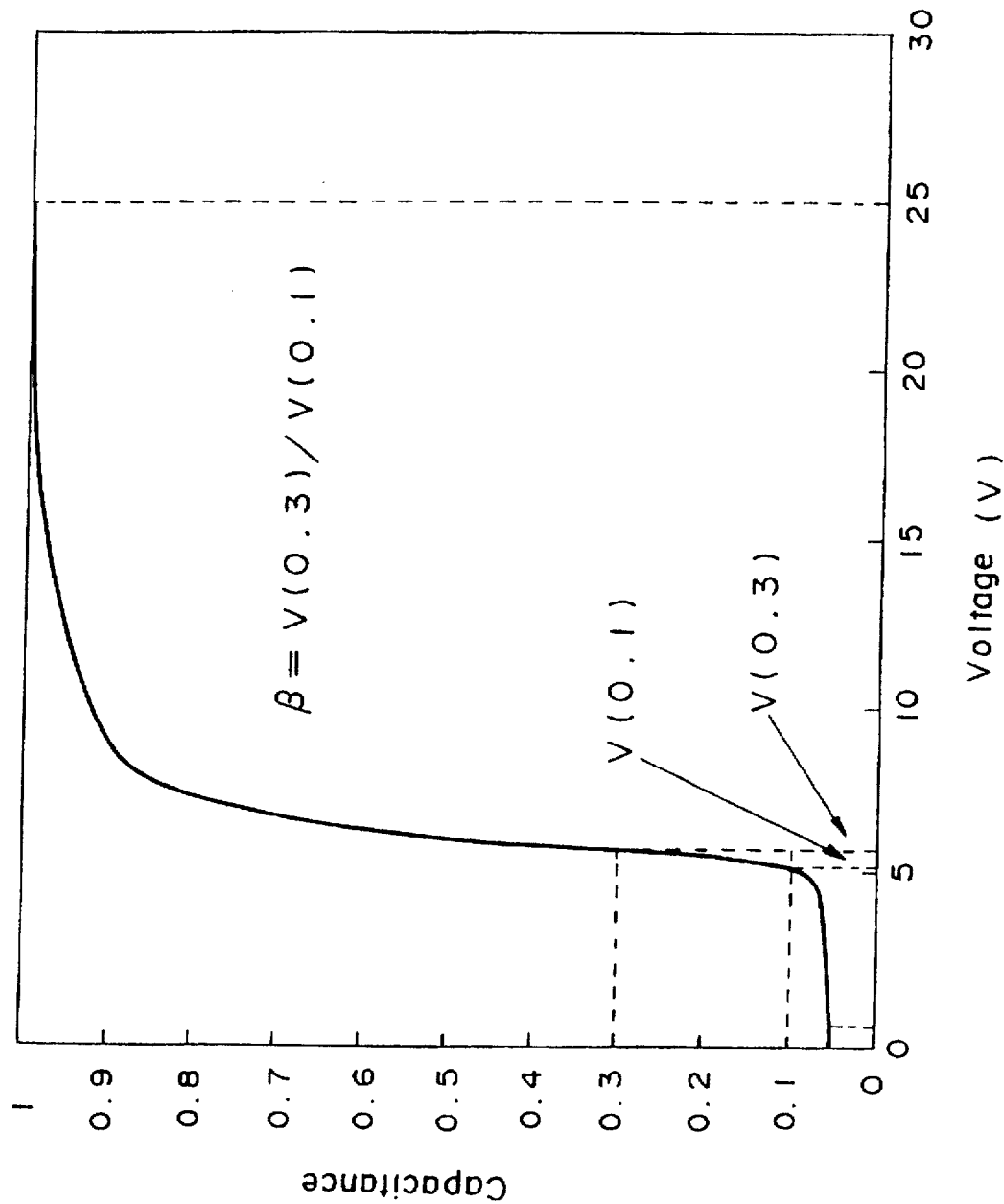

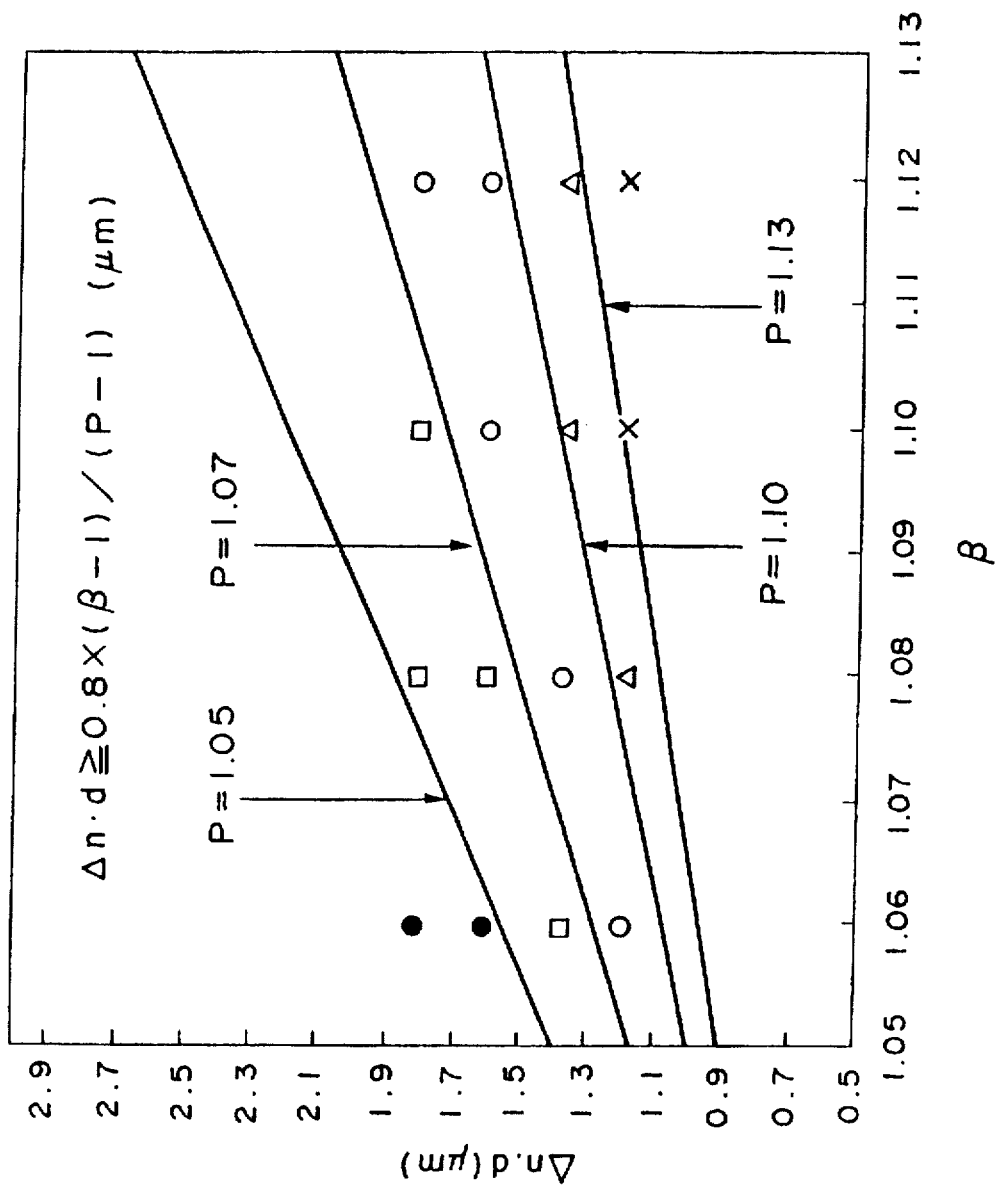

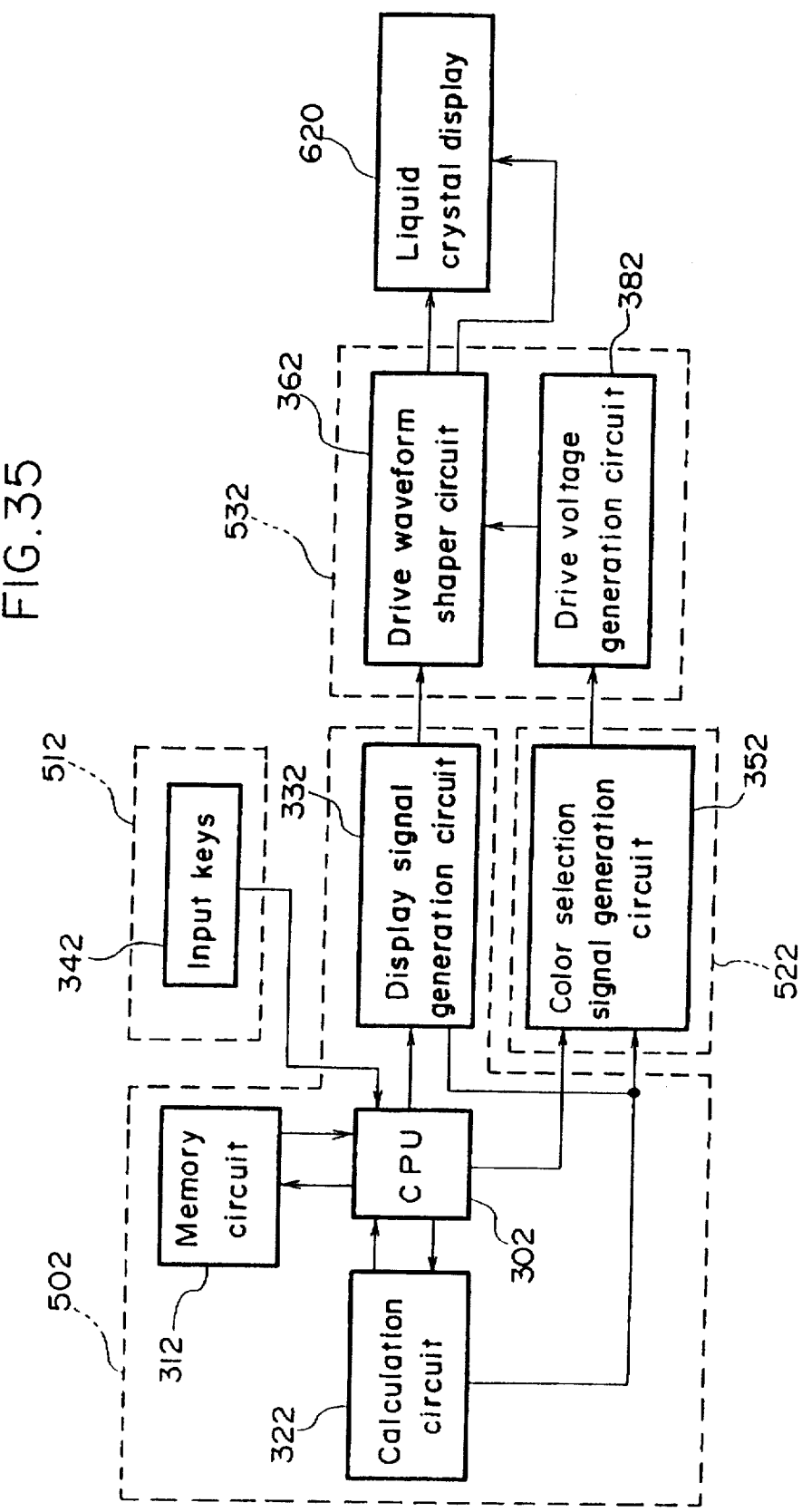

LIQUID CRYSTAL DEVICE AND ELECTRONIC EQUIPMENT USING THE SAME

TECHNICAL FIELD

This invention relates to a liquid crystal device and electronic equipment in which a liquid crystal device is installed and, in particular, to a liquid crystal device that provides a color display by utilizing a colorization phenomenon caused by double refraction birefringence of the liquid crystal and electronic equipment in which this liquid crystal device is installed.

BACKGROUND OF ART

A prior-art color liquid crystal device that achieves a colorized display uses color filters to colorize light that is transmitted therethrough. This color liquid crystal device is configured of a liquid crystal display element that is formed from a liquid crystal cell provided with a color filter and a pair of polarizing plates disposed to sandwich this liquid crystal cell, and a display drive means for driving the liquid crystal cell.

However, this prior-art color liquid crystal device has a problem in that the liquid crystal display element has to use color filters to colorize the light transmitted therethrough, so that the transmittance of light therethrough is low and thus the display is dark.

This is caused by the absorption of light by the color filter. In other words, a color filter has a fairly high absorptance index for light in the wavelength band corresponding to the color thereof, so that the quantity of colored light that has passed through this color filter is reduced in comparison with light of that wavelength band that was incident on the color filter, and thus the display becomes darker.

Note that the liquid crystal display element in this prior-art color liquid crystal device is of a transmittance type. If, however, a reflective type of device is created by disposing a reflective plate on the rear surface of this liquid crystal display element, light that is incident on the front surface of the liquid crystal display element, is reflected by the reflective plate on the rear surface, and is then emitted from the front surface side passes through the color filter twice and thus the quantity thereof is reduced so that the display becomes much darker and therefrom, this type is rarely used for a display device.

To solve the above problems, the present Applicants have previously developed a color liquid crystal device that colorizes light transmitted therethrough without using color filters and has a high transmittance of light, and thus is capable of providing a display of a sufficiently high luminance.

This liquid crystal device is a retardation effect color (REC) mode reflective color super-twisted nematic (STN) liquid crystal device that utilizes a method of using a colorization phenomenon created by double refraction birefringence of the liquid crystal, and the configuration thereof is disclosed in Japanese Patent Application Laid-Open No. 2-118516.

The retardation effect color (REC) method is a method of using double refraction birefringence of the liquid crystal to implement a color display; the retardation of the liquid crystal is varied by controlling the voltage applied to the liquid crystal layer, so that multiple colors can be displayed.

Since an REC mode liquid crystal device does not require any color filters, it is bright and also inexpensive, and is suitable for a reflective liquid crystal display (LCD) in a popular type of portable electronic equipment.

The colorization principle of an REC mode color STN to liquid crystal device will now be described with reference to FIG. 38.

As shown in FIG. 38, incident light (light for each of the colors red, green, blue) passes through a polarizing plate 3000 and is subjected to linear polarization thereby, then is incident on a super-twisted nematic (STN) liquid crystal cell 3100.

Liquid crystal molecules exhibit optical anisotropy in that their refractive index in the long-axis direction thereof differs from the refractive index in the short-axis direction. This is called double refraction. This means that the speed of transmission of incident linearly polarized light differs in the directions of the long axis and short axis of the liquid crystal molecules and thus the light is subjected to elliptical polarization. Since the state of this elliptical polarization depends on color, a difference is generated in the quantity of light of each color passing through a polarizing plate 3400, so that light of a predetermined color can be created by combining light of different colors that is transmitted therethrough.

If a voltage is applied to the STN liquid crystal cell 3100, the effective value of Δn·d of the liquid crystal layer decreases as the voltage increases. Note that Δn is the optical anisotropy of the liquid crystal and d is the thickness of the liquid crystal layer.

Therefore, if the initial value of Δn·d could be set to be high, the value of Δn·d of the STN liquid crystal could be made to vary greatly by changing the voltage applied thereto, the state of the elliptical polarization of light after it has passed through the liquid crystal cell is thereby varied greatly, and thus changes in display color such as those shown in FIG. 39 can be implemented.

An REC mode color STN liquid crystal device has superior characteristics such as being bright and inexpensive, but further research by the inventors of the present invention has identified points that could be improved further.

In other words, to increase the reflection luminance in a reflective type of liquid crystal device provided with a reflective plate on one of the outer sides of a polarizing plate or a transflective liquid crystal device provided with a transflector, it is required that the color tone (hereinafter called background color) achieved when no voltage is applied (hereinafter referred to as "at zero voltage") or when an off-voltage is applied should be white or a non-color close thereto, and, moreover, it is necessary that a non-color such as black or white is displayed as the background color even in a transmittance type of liquid crystal device that is provided with backlighting on the outer side of a polarizing plate.

However, a liquid crystal device using the method shown in FIG. 38 tends to have a background color that is green or blue-green, and it is known to be difficult to always display white or a non-color close thereto.

The present invention was devised by the inventors of this application on the basis of the above described results of experiments.

DISCLOSURE OF INVENTION

An objective of this invention is to provide a liquid crystal device which is capable of displaying at least two colors without using color filters and which is also capable of displaying white or a non-color close thereto.

Another objective thereof is to provide high-performance electronic equipment in which is installed a bright and inexpensive color display means.

The liquid crystal device of this invention comprises a liquid crystal cell having a layer of nematic liquid crystal twisted to within the range of 180° to 360°, a pair of opposed polarizing plates disposed on either side of the liquid crystal cell in a sandwich form, and an optically anisotropic substance provided between the liquid crystal cell and one polarizing plate of the pair of polarizing plates, wherein the liquid crystal cell and the optically anisotropic substance satisfy the relationships of Equations (1) and (2) below:

$$\Delta n \cdot d \geq 1 (\mu m) \quad (1)$$

$$15.5 \times \alpha^2 - 40 \times \alpha + 25.1 \leq R - \Delta n \cdot d \leq 15.5 \times \alpha^2 - 40 \times \alpha + 25.8 (\mu m) \quad (2)$$

where: $\Delta n \cdot d$ is the product of the optical anisotropy $\Delta n$ of the nematic liquid crystal and the thickness d of the nematic liquid crystal; and R is the sum of the products $\Delta n j \cdot dj$ of the optical anisotropy $\Delta n j$ of a jth (where j is an integer) layer of the optically anisotropic substance and the thickness dj of the jth layer of the optically anisotropic substance, taken from a first layer to an ith layer (where i is an integer greater than or equal to j) when i layers of the optically anisotropic substance are used. In addition, $\alpha$ is the ratio of the optical anisotropy of the optically anisotropic substance at a wavelength of 450 nm with respect to the optical anisotropy thereof at a wavelength of 590 nm. In other words, $\alpha$ is $\Delta n_{450\,nm}/\Delta n_{590\,nm}$.

A liquid crystal device which is capable of displaying colors without using color filters and which is also capable of displaying white or a non-color close thereto is implemented by optimizing the value of $\Delta n \cdot d$ of the liquid crystal and the relationship between the value of $\Delta n \cdot d$ of the liquid crystal and the value of the retardation (R) of the optically anisotropic substance that is, for example, a retardation film. This liquid crystal device has a background color that is white or a non-color close thereto, for example, and displays at least two colors when a voltage is applied thereto.

Note that the distinction between terms "retardation" and "$\Delta n \cdot d$" as used in principle in this document is such that "retardation" is used in reference to an optically anisotropic substance such as a retardation film, and "$\Delta n \cdot d$" is used in reference to the liquid crystal.

When a retardation film of polyvinyl alcohol (PVA) is used as the optically anisotropic substance, it is preferable that the liquid crystal cell and the retardation film are configured in such a manner as to satisfy the relationship: $0.51 \leq R - \Delta n \cdot d \leq 1.21 (\mu m)$.

When a retardation film of polycarbonate (PC) is used as the optically anisotropic substance, it is preferable that the liquid crystal cell and the retardation film are configured in such a manner as to satisfy the relationship: $-0.08 \leq R - \Delta n \cdot d \leq 0.62 (\mu m)$.

When a retardation film of polysulfone (PSF) is used as the optically anisotropic substance, it is preferable that the liquid crystal cell and the retardation film are configured in such a manner as to satisfy the relationship: $-0.40 \leq R - \Delta n \cdot d \leq 0.30 (\mu m)$.

In a preferred embodiment, the liquid crystal device of this invention should have a time division drive circuit that is capable of applying at least one other voltage between a selected voltage and a non-selected voltage, in addition to this selected voltage and non-selected voltage.

In another preferred embodiment, the liquid crystal cell in the liquid crystal device of this invention should satisfy the relationship: $\Delta n \cdot d \geq \{0.8 \times (\beta - 1)/(P - 1)\} + 0.6 (\mu m)$. Note that $\Delta n \cdot d$ is the product of the optical anisotropy $\Delta n$ of the nematic liquid crystal layer and the thickness d of the nematic liquid crystal layer; $\beta$ is the ratio of the voltage at which the capacitance of the liquid crystal cell is 0.3 to the voltage at which the capacitance of the liquid crystal cell is 0.1, when the capacitance of the liquid crystal cell is 0 for a voltage of 0.5 V applied between a pair of electrode substrates and the capacitance of the liquid crystal cell is 1 for a voltage of 25 V applied between the pair of electrode substrates, and P is the ratio of a selected voltage to a non-selected voltage.

When the above conditions are satisfied, a predetermined plurality of colors can be displayed by using a time division drive circuit to drive the liquid crystal cell in a method of frame rate control.

The liquid crystal device of this invention preferably uses a polymer film as the optically anisotropic substance.

In addition, the polymer film that is the optically anisotropic substance in the liquid crystal device of this invention preferably has a refractive index nx in the direction of the maximum refractive index parallel to the film surface, a refractive index ny in a direction perpendicular to nx and parallel to the film surface, and a refractive index nz in the film thickness direction, where these refractive indices satisfy the relationship: $(nx-nz)/(nx-ny) \leq 0.7$.

Furthermore, the direction of the slow axis of the polymer film that is the optically anisotropic substance of the liquid crystal device of this invention preferably is parallel to the film surface and also varies continuously with respect to the film thickness direction.

In addition, a second liquid crystal cell could be used as the optically anisotropic substance of the liquid crystal device of this invention. In such a case, the value of the retardation could be varied continuously.

Furthermore, the liquid crystal used in the second liquid crystal cell of the liquid crystal device of this invention is preferably a nematic liquid crystal, and the ratio of the nematic-isotropic phase transition temperatures (clearing point or NI point) of the nematic liquid crystal in the second liquid crystal cell and the nematic liquid crystal used in another liquid crystal cell is in the range of 0.8 to 1.2.

In addition, at a contacting surface between one polarizing plate of the pair of polarizing plates and the liquid crystal cell in the liquid crystal device of this invention, the angle between the direction in which molecules of the nematic liquid crystal are aligned in contact with the inner surface of the liquid crystal cell and one of the absorption axis and polarization axis of the polarizing plate is preferably within the range of 15° to 75°.

In addition, at a contacting surface between the liquid crystal cell and the optically anisotropic substance in the liquid crystal device of this invention, the angle between the direction in which molecules of the nematic liquid crystal are aligned in contact with the inner surface of the liquid crystal cell and the slow axis of the optically anisotropic substance is preferably in the range of 60° to 120°.

In addition, at a contacting surface between the optically anisotropic substance and one polarizing plate of the pair of polarizing plates in the liquid crystal device of this invention, a contacting surface between the optically anisotropic substance and the polarizing plate, the angle between the slow axis of the optically anisotropic substance and the absorption axis or polarization axis of the polarizing plate is preferably in the range of 15° to 75°

In the liquid crystal device of this invention, one of a reflective plate and transflector is preferably further provided on an outer side of one polarizing plate of the pair of polarizing plates.

Electronic equipment of this invention is provided with the above described liquid crystal device. This provides bright, inexpensive, high-performance electronic equipment.

In addition, electronic equipment of this invention is provided with the above described liquid crystal device, and is also provided with an input means for inputting data necessary for displaying an image on the liquid crystal device. This makes it possible to implement a compact, portable piece of electronic equipment to which data can be input, for example.

BRIEF DESCRIPTION OF DRAWINGS

FIG. 2 is a diagram illustrative of the method of recording all of the mutual relationships between the directions of the absorption axes (polarization axes) of the polarizing plates, the direction the slow axis of the retardation film, and the directions of alignment of the nematic liquid crystal in the liquid crystal device of FIG. 1;

FIG. 21 is a sectional view through another example of the liquid crystal device of this invention;

FIG. 22A shows an example of the mutual relationships between the directions of the absorption axes (polarization axes) of the polarizing plates, the direction of the slow axis of the retardation film, and the directions of alignment of the nematic liquid crystal in the liquid crystal device of FIG. 21, and FIG. 22B shows another example of the mutual relationships between these directions;

FIG. 23 is a sectional view through another example of the liquid crystal device of this invention;

FIG. 25 is a diagram illustrative of the concept of the steepness ratio $\beta$ of a nematic liquid crystal;

FIG. 26 shows the relationships between $\Delta n \cdot d$ of the liquid crystal cell, the retardation R of the retardation film, and the steepness ratio P of the nematic liquid crystal in a liquid crystal device that satisfies the relationships within the suitable range shown in FIG. 4;

FIG. 35 shows an example of a circuit for driving the liquid crystal device mounted in the electronic equipment of FIG. 34A;

BEST MODE FOR CARRYING OUT THE INVENTION

A. Conditions Necessary for Obtaining Required Results

With a liquid crystal device that uses a nematic liquid crystal (hereinafter referred to as an STN liquid crystal) that is twisted to within the range of 180° to 360° and an optically anisotropic substance configured of means such as a retardation film or a second liquid crystal cell, to ensure that a color tone that is white or a non-color close thereto is displayed when a voltage applied to the STN liquid crystal is zero and, furthermore, to ensure that at least two colors are displayed when voltages are applied thereto, it is necessary to satisfy the following first and second conditions:

First Condition:

$$\Delta n \cdot d \geq 1 (\mu m) \qquad (1)$$

Second Condition:

$$15.5 \times \alpha^2 - 40 \times \alpha + 25.1 \leq R - \Delta n \cdot d \leq 15.5 \times \alpha^2 - 40 \times \alpha + 25.8 (\mu m) \qquad (2)$$

where: Δn·d is the product of the optical anisotropy Δn of the STN liquid crystal and the thickness d of the STN liquid crystal; R is the sum of the products Δnj·dj of the optical anisotropy Δnj of a jth (where j is an integer) layer of the optically anisotropic substance and the thickness dj of the jth layer of the optically anisotropic substance, taken from a first layer to an ith layer (where i is an integer greater than or equal to j) when i layers of the optically anisotropic substance are used; and α is the ratio of the optical anisotropy of the optically anisotropic substance at a wavelength of 450 nm with respect to the optical anisotropy thereof at a wavelength of 590 nm.

The above first condition is necessary for causing a sufficient change in color and thus enable the display of at least two colors in a practicable manner. This first condition was deduced from the results of various experiments.

The above second condition ensures that the color tone that is displayed when the voltage applied to the STN liquid crystal is zero is white or a non-color close thereto. This second condition was obtained by collecting data from the results of various experiments and performing computer simulations on the basis of this data.

This second condition is a general equation that can be applied to all configurations, such as when a retardation film or a second liquid crystal cell is used as the optically anisotropic substance, or when a stack of several retardation films is used, or when retardation films are used above and below an STN liquid crystal cell.

B. Method of Deriving Equation for Second Condition

The above equation for the second condition was obtained by the method shown in FIGS. 30A, 30B, 31A, and 31B.

This is described in sequence below.

First Step

Figure 30B:
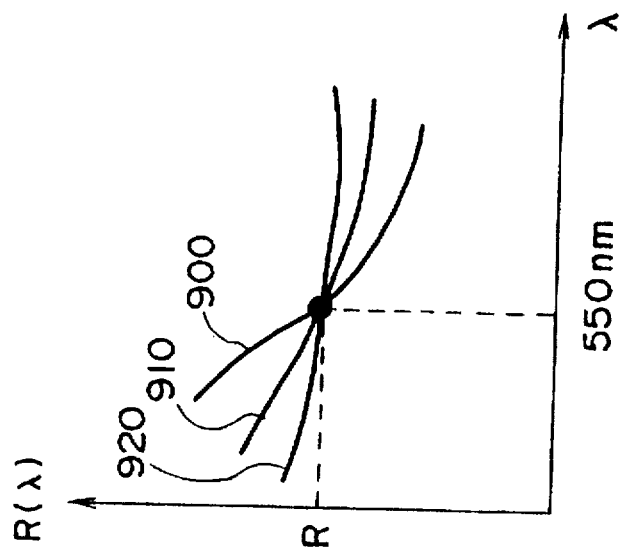
FIG. 30B is a diagram illustrative of the wavelength dispersion ratio α of the retardation film.
Figure 30A:
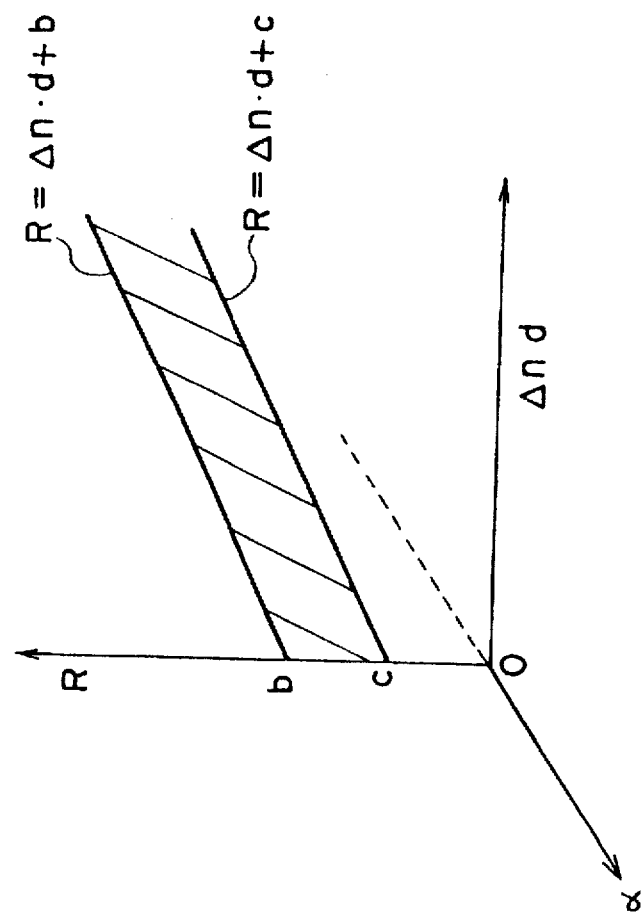
FIG. 30A is a diagram illustrative of the relationships between Δn·d of the liquid crystal cell, the retardation R of the retardation film, and the wavelength dispersion ratio α of the retardation film.

Various combinations of values of Δn·d of the STN liquid crystal cell and the retardation R of the optically anisotropic substance, such as a retardation film, were first combined as shown in FIG. 30A, these samples were investigated to determine whether or not they were capable of displaying white or a non-color, and a range thereof capable of such a display was investigated. These experiments were performed for various samples with different materials and configuration to obtain experimental data.

Functions for regulating the range in which white or a non-color can be displayed were then obtained for each of the experimental samples. The results of experiments performed by the inventors have determined that these functions are linear functions having a slope of 1 and having Δn·d as a variable, as shown in FIG. 30A. In other words, a region in FIG. 30A sandwiched between two linear functions (shown hatched in the figure) is a range in which the display of white or a non-color can be achieved.

As shown in FIG. 30A, the two linear functions that express an upper limit and a lower limit are R=Δn·d+b and R=Δn·d+c, where the intercepts (constants) b and c of these linear functions give upper and lower limiting values of the difference (R−Δn d) between the retardation R of an optically anisotropic substance such as a retardation film and the value of Δn·d, necessary for forming the display of white or a non-color.

In other words, the display of white or a non-color is possible if c≤R−Δn·d≤b.

However, when b and c are used as constants, it is not possible to reliably express the conditions necessary for displaying white or a non-color. That is to say, in order to express the characteristics of an optically anisotropic substance, it is necessary to introduce a wavelength dispersion ratio α. In other words, use of this wavelength dispersion ratio α makes it possible to express the above conditions more accurately. This is described in detail below.

The value of the retardation R of the optically anisotropic substance is that when the wavelength λ is 550 nm, as shown in FIG. 30B. However, although the value of the retardation R is the same throughout the optically anisotropic substance, such as a retardation film, different optical anisotropies are exhibited for light at wavelengths other than 550 nm. In other words, an optically anisotropic substance 900 shown in FIG. 30B exhibits a steep transition of optical anisotropy with respect to the wavelength λ, an optically anisotropic substance 920 exhibits a gentle transition of optical anisotropy, and an optically anisotropic substance 910 exhibits an intermediate steepness in transition of optical anisotropy.

That is to say, each of the optically anisotropic substances 900, 910, and 920 has the same value of the retardation R, but they have different rates of change of optical anisotropy with wavelength λ, so that it would be possible to determine the above conditions more accurately by identifying and expressing this characteristic of each of these optically anisotropic substances.

The above described difference in the rate of change of optical anisotropy with respect to wavelength λ can be expressed by the wavelength dispersion ratio α. This wavelength dispersion ratio α is the ratio of the optical anisotropy of the optically anisotropic substance at a wavelength of 450 nm with respect to the optical anisotropy of the optically anisotropic substance at a wavelength of 590 nm. The intercepts b and c of the two linear functions of FIG. 30 can be expressed more accurately by using this wavelength dispersion ratio α.

Therefore, one experimental example was obtained by determining the range in which the display of white or a non-color is enabled, as shown in FIG. 30A, and obtaining the intercepts b and c of two linear functions of slope 1 that define the upper and lower limits thereof. This work was repeated for each of the experimental samples.

In this manner, conditions such that $F_1(\alpha) \leq R - \Delta n \cdot d \leq F_2(\alpha)$ was obtained for each of the experimental samples. In this case, $F_1(\alpha)$ and $F_2(\alpha)$ are functions that represent the above intercepts b and c, using the wavelength dispersion ratio α as a parameter.

If a retardation film formed of polyvinyl alcohol (PVA) is used as the optically anisotropic substance, the results of experiments have determined that a display of white or a non-color is enabled when the liquid crystal cell and the retardation film satisfy the following relationship:

$$0.51 \leq R - \Delta n \cdot d \leq 1.21 (\mu m).$$

In addition, if a retardation film formed of polycarbonate (PC) is used as the optically anisotropic substance, it has been determined that a display of white or a non-color is enabled when the liquid crystal cell and the retardation film satisfy the following relationship:

$$-0.08 \leq R - \Delta n \cdot d \leq 0.62 (\mu m)$$

Furthermore, if a retardation film formed of polysulfone (PSF) is used as the optically anisotropic substance, it has been determined that a display of white or a non-color is enabled when the liquid crystal cell and the retardation film satisfy the following relationship:

$$-0.40 < R - \Delta n \cdot d < 0.30 (\mu m).$$

Second Step

The above first step obtained data relating to a suitable display range on the basis of the results of experiments. This second step performed computer simulations within ranges that were not derived experimentally in the first step, to obtain data relating to a suitable display range, similar to that of the first step. The data obtained by the first step and the data obtained by this computer simulation were comprehensively analyzed, and equations were derived therefrom to determine generalized conditions, irrespective of the material or arrangement of the optically anisotropic substance or the configuration of the liquid crystal cell. Finally, specific embodiments of the thus derived condition equations were implemented by computer simulation to verify the presence of a range in which the display of white or a non-color is enabled. Thus were obtained condition equations.

Figure 31A:
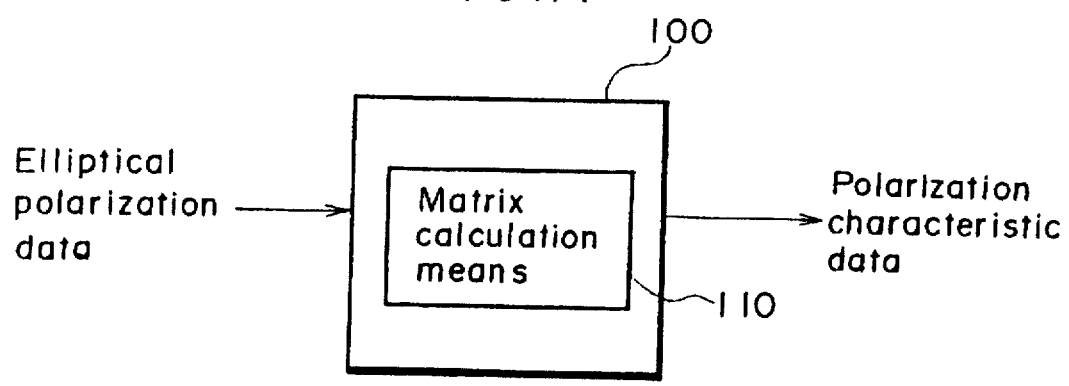
FIG. 31A is a diagram illustrative of the concept of a simulator and FIG. 31B is a graph illustrative of the general functions $f_1(\alpha)$ and $f_2(\alpha)$.
Figure 31B:
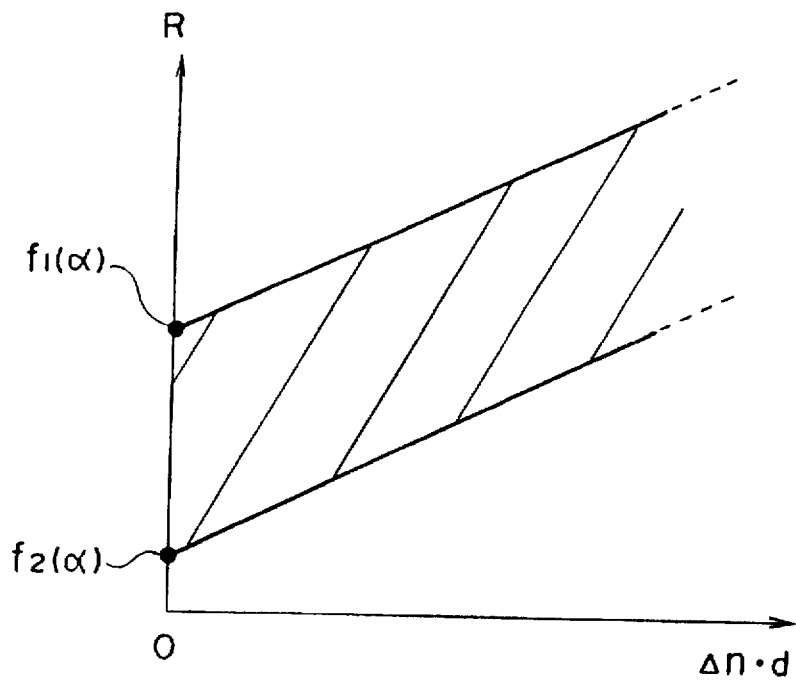

In other words, the condition $f_1(\alpha) \leq R - \Delta n \cdot d \leq f_2(\alpha)$ was obtained, as shown in FIG. 31B. In this case, each of $f_1(\alpha)$ and $f_2(\alpha)$ is a generalized function of the value of the retardation R which enables the display of white or a non-color, with the wavelength dispersion ratio α expressed as a parameter.

More specifically, $f_1(\alpha)$ and $f_2(\alpha)$ can be expressed as follows:

$$f_1(\alpha) = 15.5 \times \alpha^2 - 40 \times \alpha + 25.1 \text{(units are } \mu m)$$

$$f_2(\alpha) = 15.5 \times \alpha^2 - 40 \times \alpha + 25.8 \text{ (units are } \mu m)$$

The above described second condition was obtained therefrom.

The simulation is described in detail below.

This simulation was performed by a simulator 100 as shown in FIG. 31A. This simulator 100 has a matrix calculation means 110 acting as a functional block, and polarization characteristics of elliptically polarized light after passing through the optically anisotropic substance are analyzed by this matrix calculation means 100.

The description now turns to the principle of calculating the changes in the state of polarization of the light that has passed through the liquid crystal cell and the optically anisotropic substance such as a retardation film.

Light that is incident on the optically anisotropic substance is generally subjected to elliptical polarization, and the reference trace of the elliptically polarized light in the positive Z-axis direction can be expressed as in the column vector of Equation a, using the xy components as elements;

$$E = \begin{bmatrix} a_x \exp i(\omega t + \phi_x) \\ a_y \exp i(\omega t + \phi_y) \end{bmatrix} \qquad \text{Equation a}$$

where: ai is the amplitude of an ith component, ω is angular frequency, and φi is the phase angle of the ith component. Since the absolute phase of the wave motion causes no problems in this case, the optical frequency and absolute phase items can be omitted, and thus the polarization state is expressed by a normalized Jones' vector in which the amplitude of each component is standardized, as shown by Equation b:

$$E = \begin{bmatrix} \dfrac{a_x}{\sqrt{a_x^2 + a_y^2}} \exp\left(-i\dfrac{\delta}{2}\right) \\ \dfrac{a_y}{\sqrt{a_x^2 + a_y^2}} \exp\left(i\dfrac{\delta}{2}\right) \\ (\delta \equiv \phi_y - \phi_x) \end{bmatrix} \qquad \text{Equation b}$$

The state of polarization of light that has passed through an optically anisotropic substance changes, so the polarized light E of Equation b becomes polarized light E'. An optically anisotropic substance can be expressed as a 2×2 matrix that performs this transform.

If, for example, this optically anisotropic substance is a uniaxial linear phase element, the Jones' matrix R (Δ, θ) thereof can be expressed by Equation c:

$$R(\Delta,\theta) = \begin{bmatrix} \cos^2\theta\exp\left(i\frac{\Delta}{2}\right) + \sin^2\theta\exp\left(-i\frac{\Delta}{2}\right) & 2i\sin\theta\cos\theta\sin\left(\frac{\Delta}{2}\right) \\ 2i\sin\theta\cos\theta\sin\left(\frac{\Delta}{2}\right) & \cos^2\theta\exp\left(-i\frac{\Delta}{2}\right) + \sin^2\theta\exp\left(i\frac{\Delta}{2}\right) \end{bmatrix}$$

Equation c where: θ is the angle between the fast axis of the linear phase element and the X axis, Δ is defined by the value of Δn·d of the linear phase element and the wavelength λ of the light, such that $\Delta \equiv 2\times\pi\times(\Delta n\cdot d)/\lambda$.

The state of polarization of light that has passed through this linear phase element is obtained from Equation d, by applying the Jones' matrix R (Δ, θ) of Equation c:

Equation d $$E' = R(\Delta, \theta)E$$

In addition, if the optically anisotropic substance is a plurality of superimposed uniaxial linear phase elements, this polarization state is obtained from Equation e, by applying the Jones' matrix of Equation C sequentially:

Equation e $$E' = R(\Delta_n, \theta_n)R(\Delta_{n-1}, \theta_{n-1})\ldots R(\Delta_2, \theta_2)R(\Delta_1, \theta_1)E$$

If the optically anisotropic substance is a liquid crystal cell in which the molecules of liquid crystal are twisted, calculation of the state of the polarization is complicated. However, if the liquid crystal layer is divided into a sufficiently large number of layers, it can be approximated by adding the products of liquid crystal layers with no twist orientation. Since a liquid crystal layer with no twist is a uniaxial linear polarization element, a plurality of such layers can be superimposed in a manner similar to that of the previously described uniaxial linear polarization elements to make it possible to obtain the state of polarization of light that has passed through the liquid crystal cell.

The polarization state were obtained by applying suitable parameters in the above method.

It was thus verified that satisfaction of the above first and second conditions ensures that the color tone at zero voltage is white or a non-color close thereto and color changes to at least two colors are displayed when a voltage is applied, even when polycarbonate, polyvinyl alcohol, polysulfone or various types of second liquid crystal cell are used as the optically anisotropic substance.

C. Characteristics of the Liquid crystal device of this Invention

The characteristics of the liquid crystal device of this invention will now be described briefly below, with reference to FIGS. 37A, 37B, and 37C.

Figure 38:
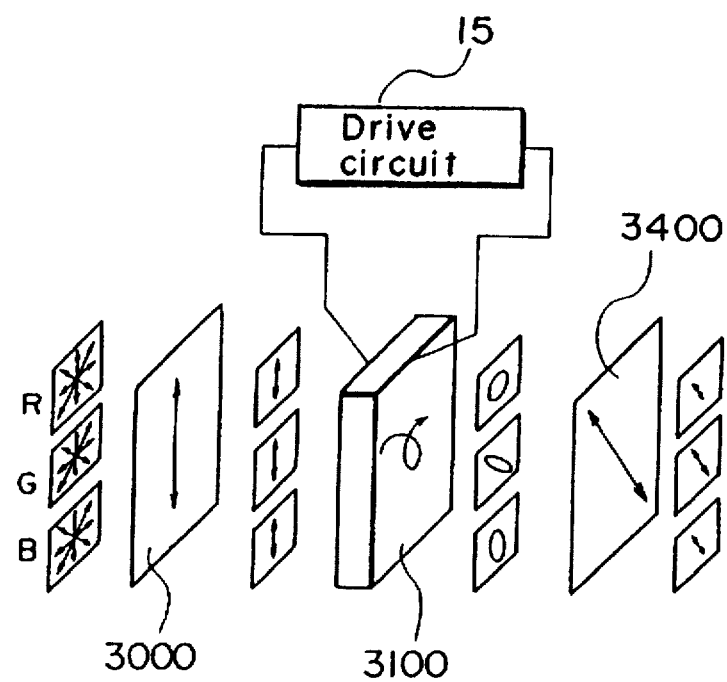
FIG. 38 is a diagram illustrative of the principle of the color display in an REC mode liquid crystal device.
Figure 39:
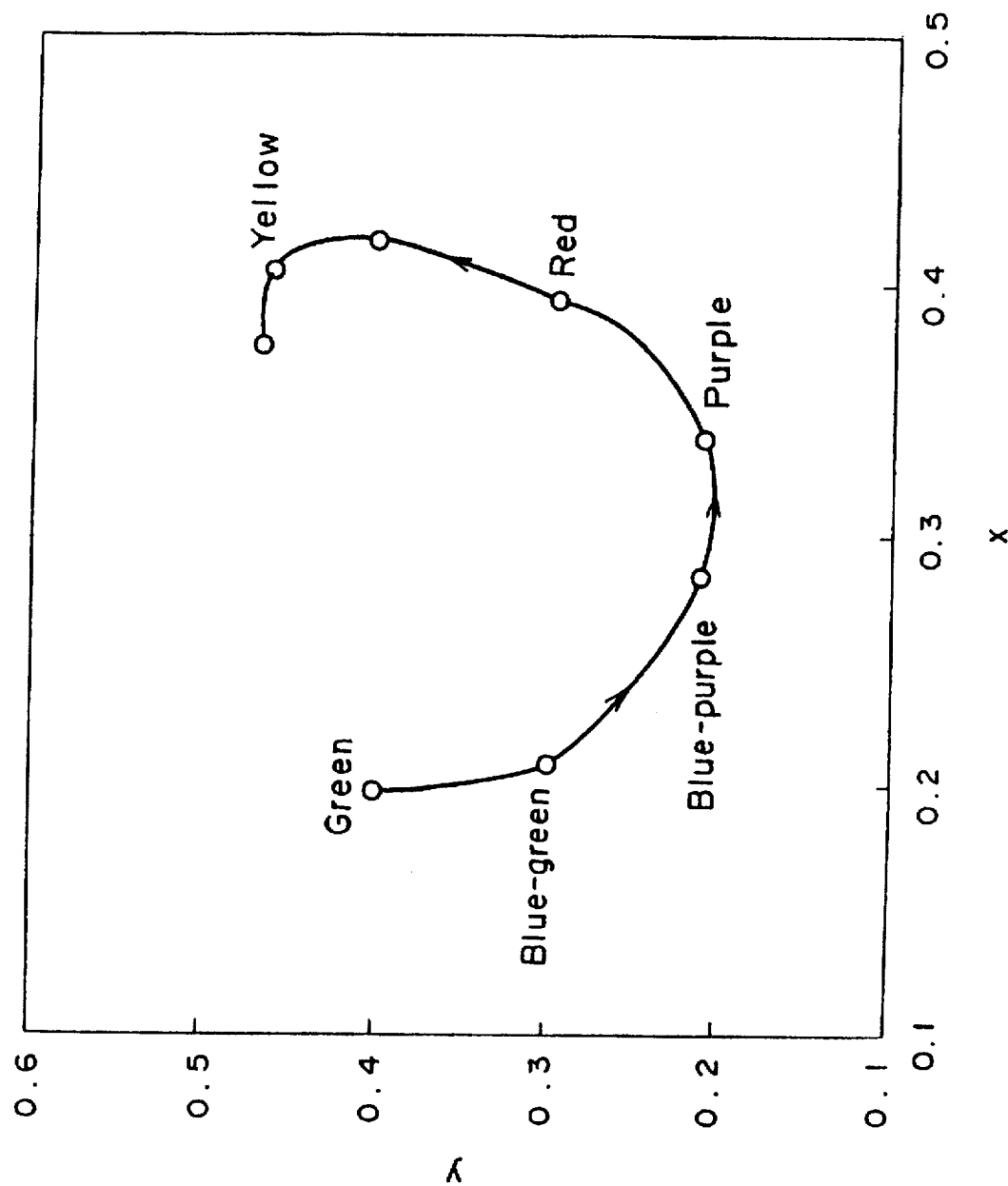
FIG. 39 shows an example of display colors achieved when a voltage is applied to the liquid crystal device of FIG. 38.

The liquid crystal device of this invention is configured of the previously described REC mode color liquid crystal device of FIG. 38, to which is further added an optically anisotropic substance 3200 such as a retardation film formed of a uniaxial polymer film and which can be made to display white or a non-color by phase compensation of light by this optically anisotropic substance 3200.

Figure 37A:
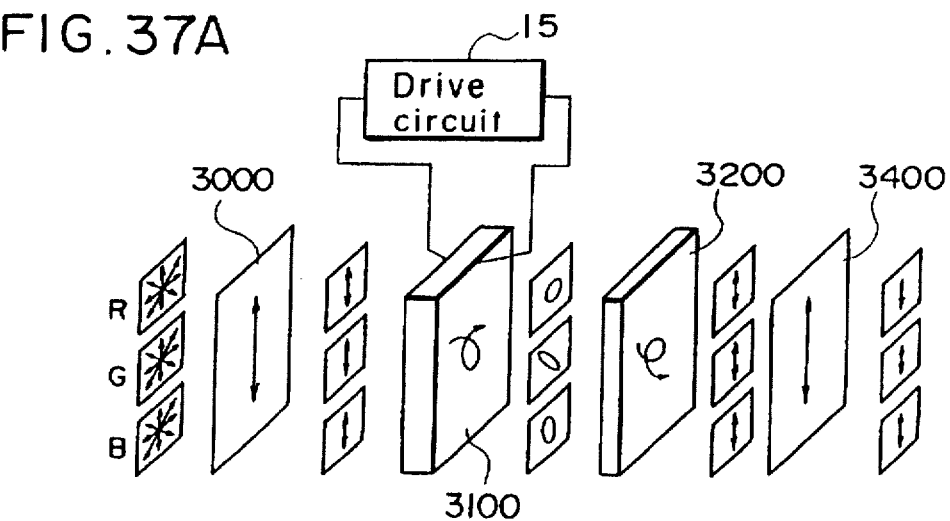
FIGS. 37A to 37C are each diagrams illustrative of the function of the retardation film in the liquid crystal device of this invention.

In other words, elliptically polarized light that has passed through the liquid crystal cell 3100 is converted in reverse by the optical compensation effect of the optically anisotropic substance 3200 such as a retardation film, so that the display of white is enabled by returning the polarization to substantially the same linear polarization of the incident light, as shown in FIG. 37A.

Figure 37B:
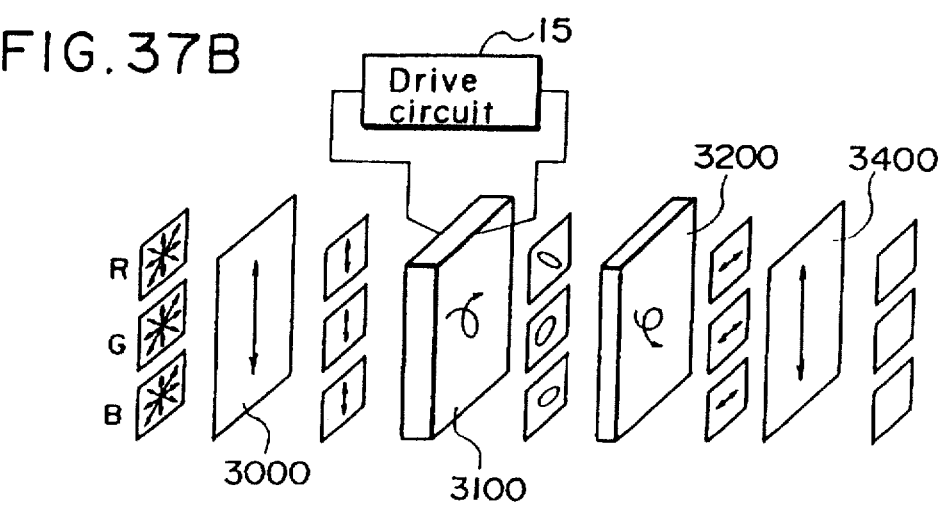

In addition, a state in which light is completely blocked (a black display) can be achieved by ensuring that the direction of linearly polarized light that has passed through the optically anisotropic substance 3200 is perpendicular to the polarization axis of the polarizing plate 3400, as shown in FIG. 37B.

Figure 37C:
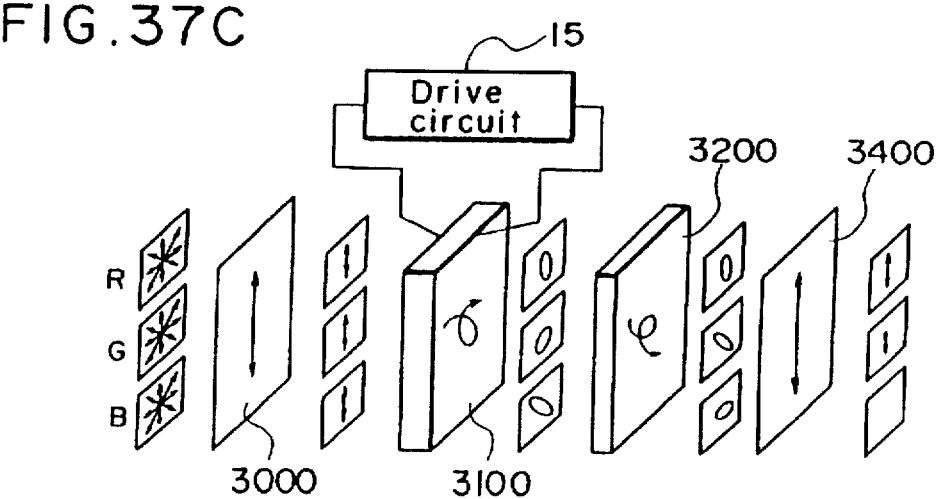

Furthermore, the display of at least two colors is enabled by applying a voltage to change the optical refractive index of the liquid crystal cell 3100 and thus changing the polarization state of each of red, green, and blue light after it has passed through the optically anisotropic substance 3200, as shown in FIG. 37C.

This invention is described more specifically below, with the aid of embodiments thereof.

EMBODIMENT 1

This embodiment gives examples of the use of a single uniaxially drawn retardation film as the optically anisotropic substance.

Figure 1:
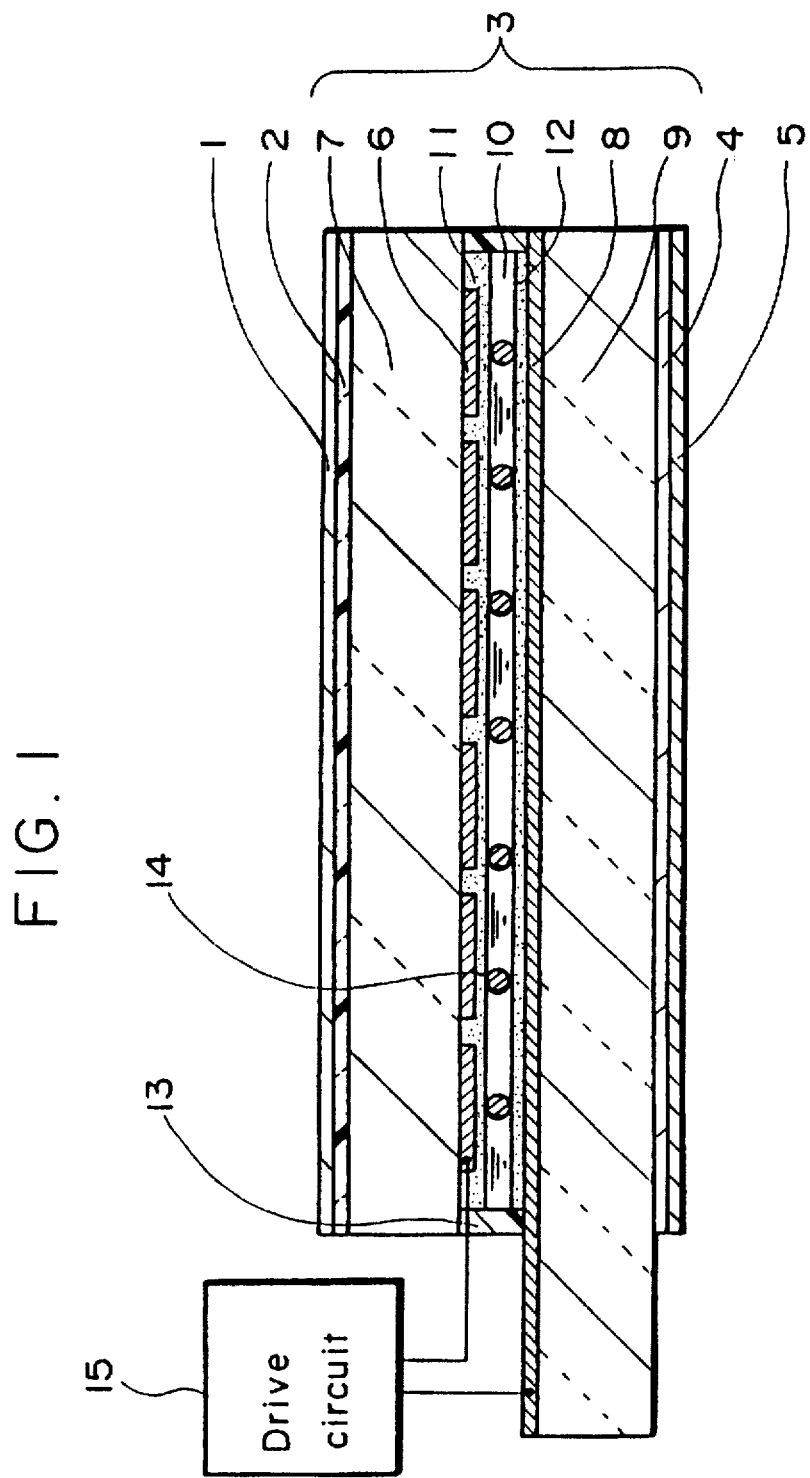
FIG. 1 is a sectional view through an example of a liquid crystal device (a reflective type of liquid crystal device) of this invention.

A sectional view through a reflective type of liquid crystal device is shown in FIG. 1.

This reflective type of liquid crystal device is configured to comprise an upper polarizing plate 1, a retardation film 2, a liquid crystal cell 3, a lower polarizing plate 4, and a reflective plate 5.

The liquid crystal cell 3 is formed of a layer of nematic liquid crystal 10 sandwiched between an upper substrate 7 having electrodes 6 on a lower surface thereof and a lower substrate 9 having electrodes 8 on an upper surface thereof.

The nematic liquid crystal 10 is given a twist orientation by implementing a process such as rubbing on alignment layers 11 and 12 formed on the upper and lower substrates 7 and 9.

A sealing material 13 disposed in a peripheral portion between the upper and lower substrates 7 and 9 holds the nematic liquid crystal 10 between the upper and lower substrates 7 and 9 and also keeps the distance between the upper and lower substrates 7 and 9 constant. In addition, spacers 14 that are glass fibers, plastic balls, or the like may be arranged between the upper and lower substrates 7 and 9. A drive circuit 15 capable of applying at least three voltages is connected between the upper and lower electrodes 6 and 8. A preferable example of this drive circuit is a time division drive circuit provided with a function of displaying gray scale by frame rate control or pulse width modulation.

With the above reflective type of liquid crystal device, display is by light (natural light or light from an illuminating light source) that is incident on the front surface side thereof being reflected by the reflective plate 5 on the rear surface side, the incident light from the front surface side passes through the upper polarizing plate 1, the retardation film 2, STN liquid crystal 10, and the lower polarizing plate 4 before being reflected by the reflective plate 5, then passes again through the lower polarizing plate 4, the STN liquid crystal 10, the retardation film 2, and the upper polarizing plate 1 and is emitted.

In the liquid crystal cell 3, linearly polarized light that has passed through the upper polarizing plate 1 and is incident thereon is subjected to the polarization action of the retardation film 2 as it passes through the retardation film 2 and is thus elliptically polarized, then it is subjected to the further polarization action of the STN liquid crystal 10 as it passes through the STN liquid crystal 10, so that the polarization state thereof is changed.

Therefore, light that has passed through the retardation film 2 and the STN liquid crystal 10 and is incident on the lower polarizing plate 4 has been subjected to the polarization actions of the retardation film 2 and the STN liquid crystal 10 and is thereby polarized in a non-linear manner; of this non-linearly polarized light, only light of the wavelength of the polarized component that passes through the lower polarizing plate 4 does pass through the lower polarizing plate 4 and become colorizing light.

In this case, the polarization action of the retardation film 2 does not vary but the orientation state of the liquid crystal molecules in the STN liquid crystal 10 does vary in accordance with the voltage applied between the electrodes 6 and 8 so that the STN liquid crystal 10 has a polarization action that changes with the orientation state of the liquid crystal molecules in the STN liquid crystal 10.

The description below concerns the colorization of light transmitted through the retardation film 2, caused by the polarization action thereof. Light from the exterior is subjected to linear polarization by the upper polarizing plate 1, is incident on the retardation film 2 which has a slow axis that is at a predetermined angle with respect to the polarization axis of the upper polarizing plate 1, and is subjected to a polarization action corresponding to the retardation R of the retardation film 2 as it passes through this retardation film 2, thus becoming elliptically polarized.

If elliptically polarized light emitted from the retardation film 2 subsequently passes unchanged through the STN liquid crystal 10 and is incident on the lower polarizing plate 4, only light of the wavelength of the polarized component of this elliptically polarized light that passes through the lower polarizing plate 4 does pass through the lower polarizing plate 4, so that the light that has passed through the lower polarizing plate 4 (linearly polarized light) becomes colorizing light.

The colorizing light that has passed through the lower polarizing plate 4 is then reflected by the reflective plate 5, returns along a path that is the reverse of the optical path described above, and is emitted from the upper polarizing plate 1, and a display pattern is produced by this colorizing light.

Note that, in this case, the colorizing light reflected by the reflective plate 5 is only light of the wavelength of the polarized component that has passed through the lower polarizing plate 4, of the light that was polarized in a non-linear manner by the above described polarization actions of the retardation film 2 and the STN liquid crystal 10, and this light is again subjected to the polarization actions of the STN liquid crystal 10 and the retardation film 2 so that the colorizing light that passes through and is emitted from the upper polarizing plate 1 is light of an even better color purity than colorizing light reflected by the reflective plate 5.

In this manner, this reflective type of liquid crystal device colorizes light that is transmitted therethrough without using color filters, and thus the transmittance of light therethrough is good and it can provide a luminance of display that is sufficiently high.

Figure 3B:
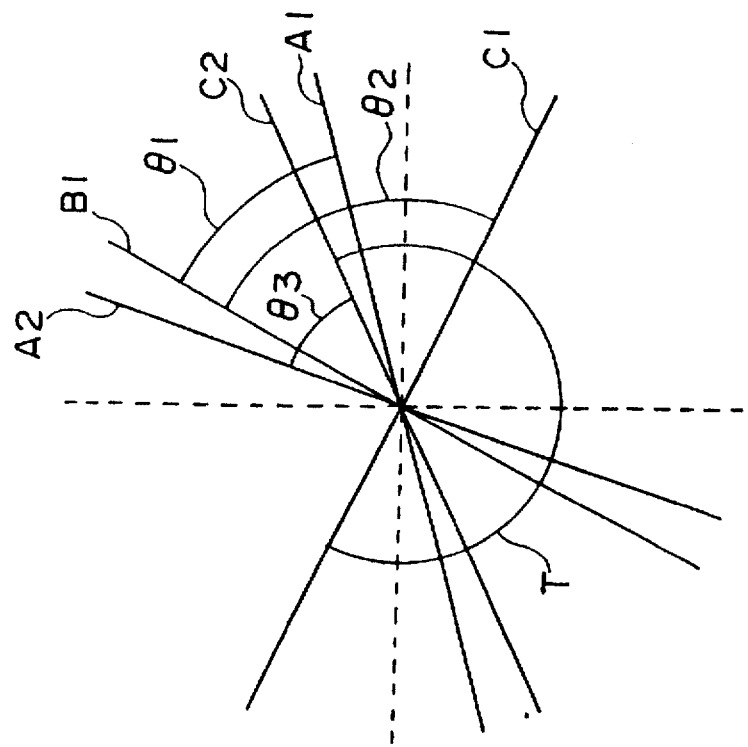
FIG. 3B shows another example of these relationships.
Figure 3A:
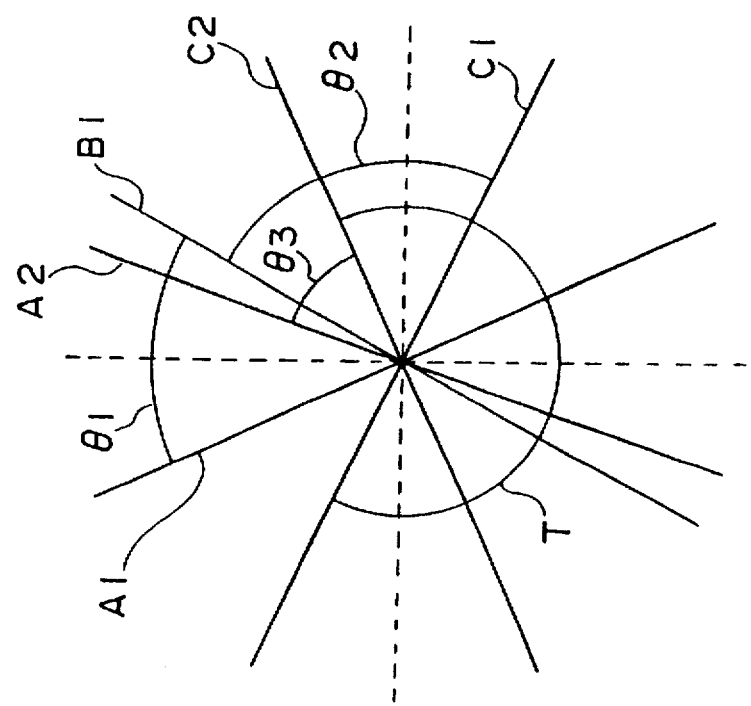
FIG. 3A shows an example of the relationships between the directions of the absorption axes (polarization axes) of the polarizing plates, the direction of the slow axis of the retardation film, and the directions of alignment of the nematic liquid crystal in the liquid crystal device of FIG. 1, using the recording method of FIG. 2.

The mutual relationships between the directions of the absorption axes (or polarization axes) of the polarizing plates 1 and 4 of FIG. 1, the direction of the slow axis of the retardation film 2, and the direction in which the nematic liquid crystal 10 is aligned are shown in FIGS. 3A and 3B. FIGS. 3A and 3B are differentiated by the direction of the absorption axis (or polarization axis) of the upper polarizing plate 1.

The relationships between the situation of FIG. 3A and the configuration of FIG. 1 are shown in FIG. 2.

As shown in FIG. 2, the STN liquid crystal layer 10 is provided with liquid crystal molecules 50 that are twisted, the optical anisotropy of these liquid crystal molecules 50 is $\Delta n$, and the thickness of the liquid crystal layer is d. The retardation R of the retardation film 2 is expressed by the product ($\Delta n1 \cdot d1$) of the optical anisotropy $\Delta n \cdot d$ of the retardation film 2 and the thickness d1 of the retardation film 2.

Note that, although rubbing was used as the method of orientating the nematic liquid crystal 10 in this embodiment, another method such as oblique evaporation of SiO could be used. In the description below, the directions in which the nematic liquid crystal 10 in contact with the upper and lower substrates 7 and 9 are orientated are called the directions of rubbing of the upper and lower planes.

In FIGS. 3A and 3B, A1 and A2 are the directions of the absorption axes (or polarization axes) of the upper and lower polarizing plates 1 and 4, B1 is the direction of the slow axis of the retardation film 2, and C1 and C2 are the directions of rubbing of the upper and lower planes.

In addition, T is the twist angle of the nematic liquid crystal 10, $\theta 1$ is the angle between the direction A1 of the absorption axis (or polarization axis) of the upper polarizing plate 1 and the direction B1 of the slow axis of the retardation film 2, $\theta 2$ is the angle between the direction B1 of the slow axis of the retardation film 2 and the direction of rubbing C1 of the upper plane, and $\theta 3$ is the angle between the direction of rubbing C2 of the lower plane and the direction A2 of the absorption axis (or polarization axis) of the lower polarizing plate 4.

$\theta 1$ is set to be more than 0° and less than 90°. With the above configuration, the opposing arrangement of the upper and lower substrates 7 and 9 is such that the twist angle T of the nematic liquid crystal 10 is in the range of 180° to 360°. In this case, the twist angle T of the nematic liquid crystal 10 is governed by the directions of rubbing C1 and C2 of the upper and lower planes and the type and quantity of substance having an optical rotatory power added to the nematic liquid crystal 10.

Embodiment 1-1

A uniaxially drawn film of polycarbonate (hereinafter abbreviated to PC) was used as the retardation film 2 in the above described the configuration of FIGS. 1 and 3A. In this case, the ratio α of the optical anisotropy at a wavelength of 450 nm with respect to the optical anisotropy at a wavelength of 590 nm (i.e., the wavelength dispersion) was 1.09.

The twist angle T of the nematic liquid crystal 10 was set to 240°, the angle $\theta 1$ between the direction A1 of the absorption axis (or polarization axis) of the upper polarizing plate 1 and the direction B1 of the slow axis of the retardation film 2 was set to 35° to 55°, the angle $\theta 2$ between the direction B1 of the slow axis of the retardation film 2 and the direction of rubbing C1 of the upper plane was set to 80° to 100°, the angle $\theta 3$ between the direction of rubbing C2 of the lower plane and the direction A2 of the absorption axis (or polarization axis) of the lower polarizing plate 4 was set to 35° to 55°, various combinations of the product $\Delta n \cdot d$ of the optical anisotropy $\Delta n$ and the thickness d of the nematic liquid crystal 10 and the product $\Delta n1 \cdot d1$ of the optical anisotropy $\Delta n1$ and the thickness d1 of the retardation film 2 (hereinafter referred to as the retardation R for Embodiment 1) were set up as shown in Table 1 below, and the change of color produced when a voltage was applied between the upper and lower electrodes 6 and 8 was measured with a spectrophotometer (IMUC-7000, manufactured by Otsuka Electronics.

TABLE 1

| No. | Δn | d (μm) | Δn · d (μm) | R (μm) |
|---|---|---|---|---|
| 1 | 0.13 | 7.0 | 0.91 | 1.4 |
| 2 | 0.18 | 7.0 | 1.26 | 1.8 |
| 3 | 0.18 | 7.0 | 1.26 | 2.0 |
| 4 | 0.18 | 7.0 | 1.26 | 2.2 |
| 5 | 0.23 | 7.0 | 1.61 | 1.8 |
| 6 | 0.23 | 7.0 | 1.61 | 2.0 |
| 7 | 0.23 | 7.0 | 1.61 | 2.2 |
| 8 | 0.24 | 8.0 | 1.92 | 1.8 |
| 9 | 0.24 | 8.0 | 1.92 | 2.0 |
| 10 | 0.24 | 8.0 | 1.92 | 2.2 |

As a result, the color tone at zero voltage was seen to be white or a non-color close thereto and at least two colors are displayed when a voltage was applied, provided that the retardation R of the retardation film 2 and the product Δn·d of the optical anisotropy Δn and the thickness d of the nematic liquid crystal 10 were in a predetermined relationship. These results are shown in FIG. 4.

Figure 4:
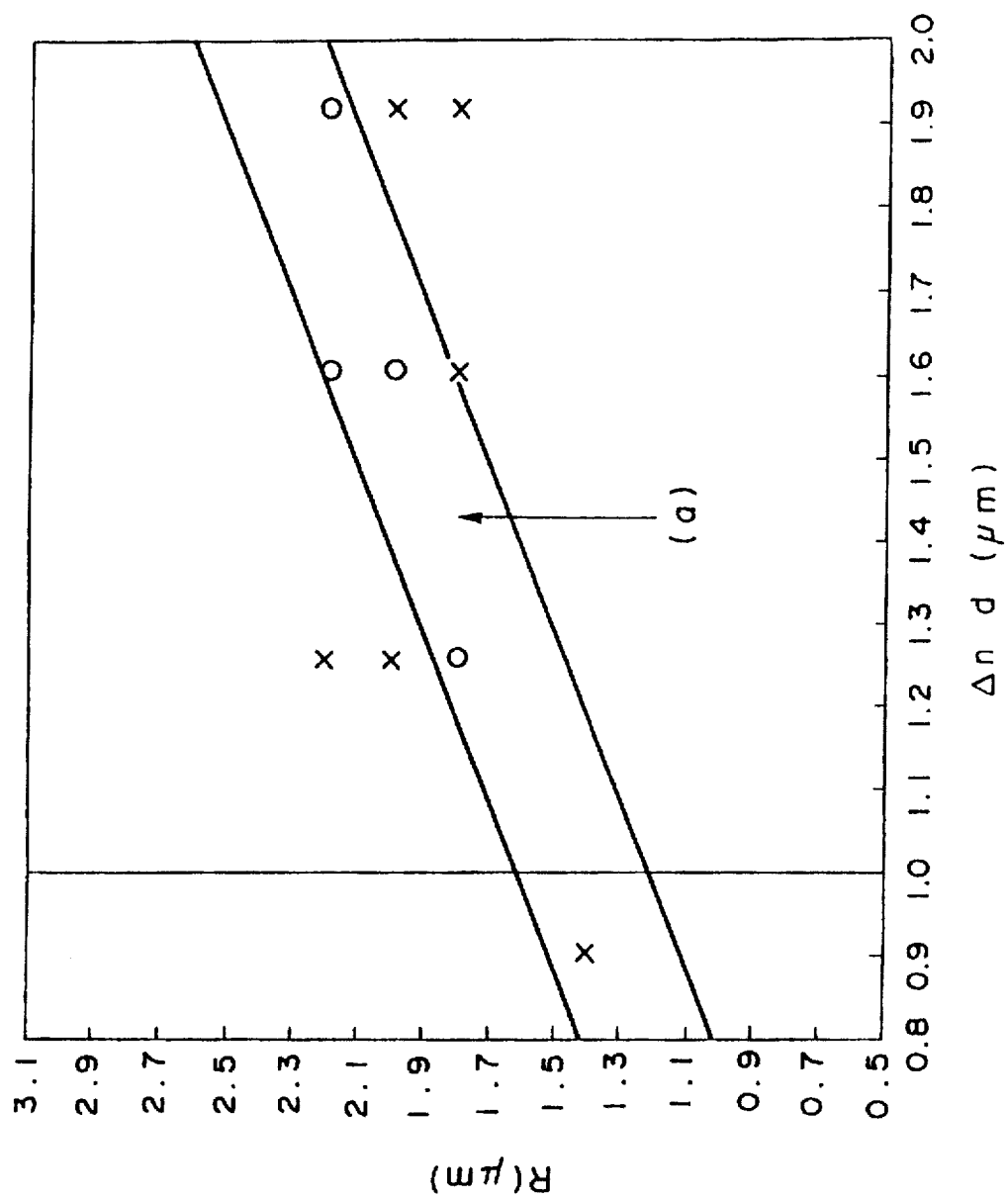
FIG. 4 shows an example of ranges of the values of $\Delta n \cdot d$ of the liquid crystal and the retardation R of the retardation film that are suitable for achieving the desired display, when a uniaxially drawn retardation film of polycarbonate (PC) is used as the retardation film 2 of FIG. 1.

In FIG. 4, a portion (a) is a range within which the color tone at zero voltage is white or a non-color close thereto and at least two colors are displayed when a voltage is applied. In other words, this is the region in which the previously described first and second conditions are satisfied.

Therefore, within the range (a) in FIG. 4, the color tone at zero voltage is white or a non-color close thereto and at least two colors are displayed when a voltage is applied.

Conversely, outside the range (a) of FIG. 4, either the color tone at zero voltage was not white or a non-color close thereto, or display of at least two colors did not occur when a voltage was applied.

Figure 5:
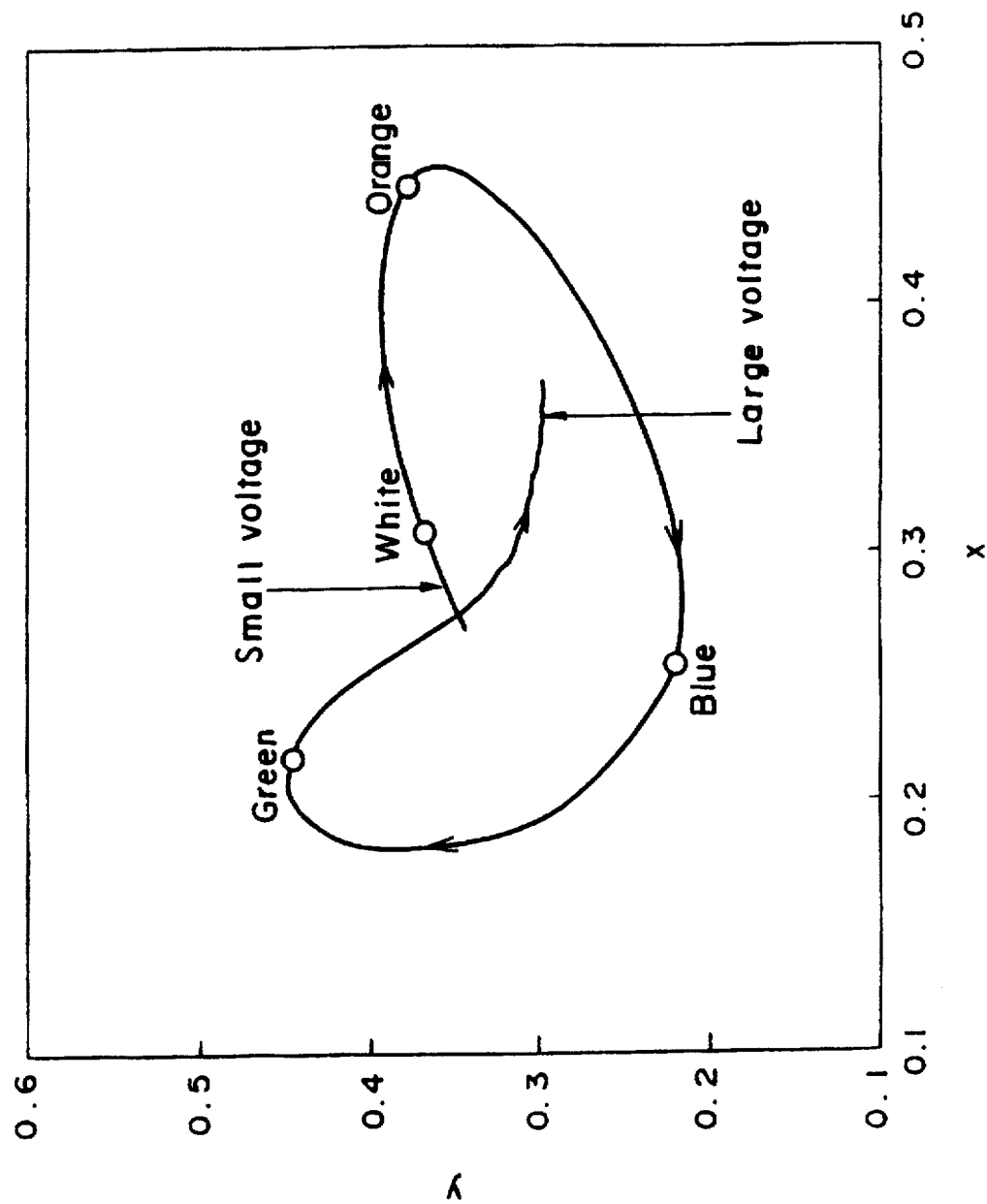
FIG. 5 is a CIE chromaticity diagram showing an example of the change of color produced when a voltage was applied to a liquid crystal device within the suitable range shown in FIG. 4.

To demonstrate an example of conditions within the portion (a) of FIG. 4, FIG. 5 shows color changes with respect to applied voltage that occurred when a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 2 μm.

In this example, the color tone at zero voltage was a bluish white, at an effective voltage of 2.15 V it was orange, at 2.20 V it was blue, and at 2.22 V it was green. In other words, this example exhibits one of the most suitable sets of conditions for the liquid crystal device of this invention.

In addition, to demonstrate conditions that show the region that is a boundary at which the color tone at zero voltage becomes white or a non-color close thereto within the portion (a) of FIG. 4, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 2.2 μm, alternatively a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 1.8 μm; in these cases, the color tone at zero voltage was a reddish white. When a voltage was applied, color changes to orange, blue, and green occurred as the voltage increased. In other words, these are boundary conditions for the liquid crystal device of this invention.

Conversely, to demonstrate conditions outside the portion (a) of FIG. 4 under which the color tone at zero voltage is not white or a non-color close thereto, a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 2 μm, alternatively a liquid crystal cell 3 was used in which the optical anisotropy Δn of the nematic liquid crystal 10 was 0.24 and the thickness d was 8 μm, in other words in which Δn·d was 1.92 μm, and the retardation R of the retardation film 2 was 2 μm; and the color tone at zero voltage was orange in the former case, and in the latter case, the color tone at zero voltage was a bluish black. In other words, these are conditions that are not suitable for the liquid crystal device of this invention.

To further demonstrate conditions outside the portion (a) of FIG. 4 under which display of at least two colors does not occur when a voltage is applied although the color tone displayed at zero voltage is white or a non-color close thereto, a liquid crystal cell 3 was used in which the optical anisotropy Δn of the nematic liquid crystal 10 was 0.13 and the thickness d was 7 μm, in other words in which Δn·d was 0.91 μm, and the retardation R of the retardation film 2 was 1.4 μm; in this case, the color tone at zero voltage was a bluish white, but the color changed only to orange when a voltage was applied. In other words, these are conditions that are not suitable for the liquid crystal device of this invention.

Embodiment 1-2

A uniaxially drawn film of PC was used as the retardation film 2 in the configuration of FIGS. 1 and 3B.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 was set to 35° to 55°, the angle θ2 between the direction B1 of the slow axis of the retardation film 2 and the direction of rubbing C1 of the upper plane was set to 80° to 100°, the angle θ3 between the direction of rubbing C2 of the lower plane and the direction A2 of the absorption axis (or polarization axis) of the lower polarizing plate 4 was set to 35° to 55°, combinations of the product Δn·d of the optical anisotropy Δn and the thickness d of the nematic liquid crystal 10 and the retardation R of the retardation film 2 were set up as shown in Table 2 below, and the change of color produced when a voltage was applied between the upper and lower electrodes 6 and 8 was measured with a spectrophotometer.

TABLE 2

| No. | Δn | d (μm) | Δn · d (μm) | R (μm) |
|---|---|---|---|---|
| 1 | 0.13 | 7.0 | 0.91 | 1.2 |
| 2 | 0.18 | 7.0 | 1.26 | 1.4 |
| 3 | 0.20 | 7.0 | 1.4 | 1.6 |
| 4 | 0.20 | 7.0 | 1.4 | 1.8 |
| 5 | 0.20 | 7.0 | 1.4 | 2.0 |
| 6 | 0.23 | 7.0 | 1.61 | 1.6 |
| 7 | 0.23 | 7.0 | 1.61 | 1.8 |
| 8 | 0.23 | 7.0 | 1.61 | 2.0 |
| 9 | 0.24 | 8.0 | 1.92 | 1.6 |
| 10 | 0.24 | 8.0 | 1.92 | 1.8 |
| 11 | 0.24 | 8.0 | 1.92 | 2.0 |

As a result, the color tone at zero voltage was seen to be white or a non-color close thereto and at least two colors were displayed when a voltage was applied, provided that the retardation R of the retardation film 2 and the product Δn·d of the optical anisotropy Δn and the thickness d of the nematic liquid crystal 10 were in a predetermined relationship. These results are shown in FIG. 6.

Figure 6:
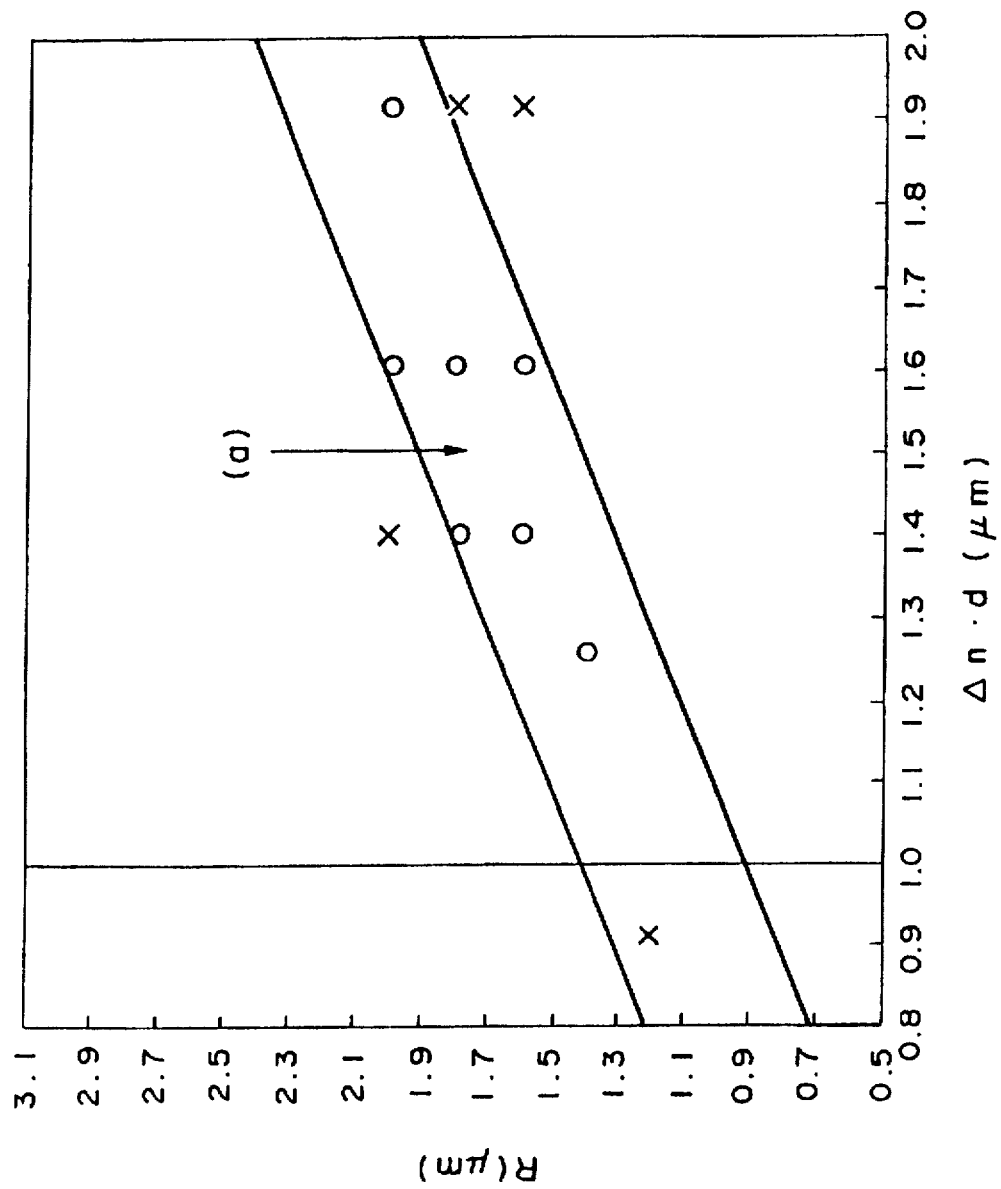
FIG. 6 shows another example of ranges of the values of $\Delta n \cdot d$ of the liquid crystal and the retardation R of the retardation film that are suitable for achieving the desired display, when a uniaxially drawn retardation film of polycarbonate (PC) is used as the retardation film 2 of FIG. 1.

In FIG. 6, a portion (a) is a range within which the color tone at zero voltage is white or a non-color close thereto and at least two colors are displayed when a voltage is applied, so that this is the range in which the previously described first and second conditions are satisfied.

Therefore, within the range included in the portion (a) of FIG. 6, the color tone at zero voltage was white or a non-color close thereto and at least two colors are displayed when a voltage was applied.

Conversely, in the range that is not within the portion (a) of FIG. 6, either the color tone at zero voltage was not white or a non-color close thereto, or display of at least two colors did not occur when a voltage was applied.

Figure 7:
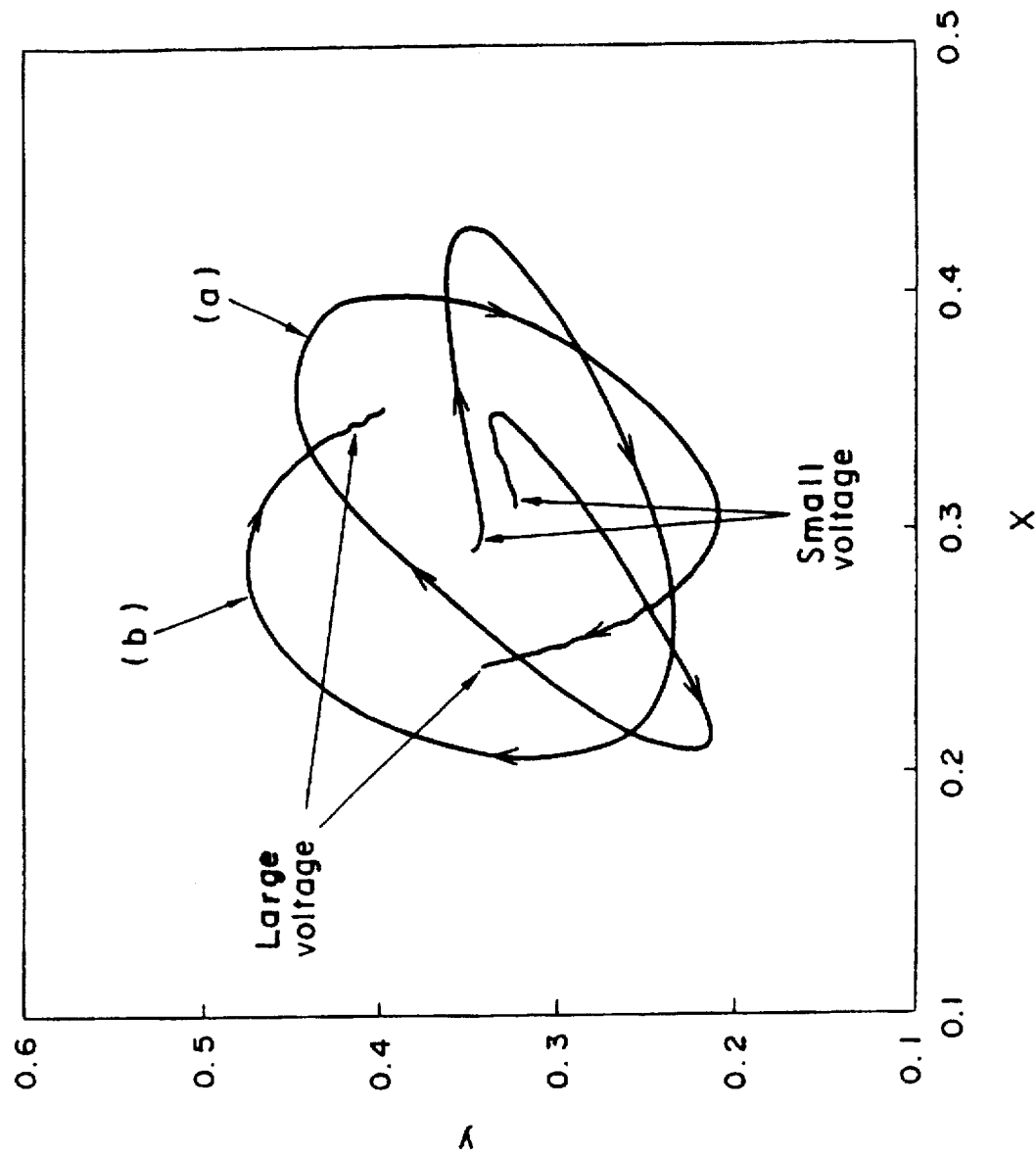
FIG. 7 is a CIE chromaticity diagram showing another example of the change of color produced when a voltage was applied to a liquid crystal device within the suitable range shown in FIG. 6.

To demonstrate an example of conditions within the portion (a) of FIG. 6, a curve (a) of FIG. 7 shows color changes with respect to applied voltage that occurred when a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 1.8 μm. The color tone at zero voltage was a yellowish white, at an effective voltage of 2.20 V it was black, at 2.23 V it was blue, at 2.25 V it was a yellow-green, and at 2.35 V it was pink. In other words, this is one set of conditions that is most suitable for the liquid crystal device of this invention.

In addition, to demonstrate the boundary conditions at which it is assumed the color tone at zero voltage becomes white or a non-color close thereto within the portion (a) of FIG. 6, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 2 μm, alternatively a liquid crystal cell 3 was used in which the optical anisotropy Δn of the nematic liquid crystal 10 was 0.2 and the thickness d was 7 μm, in other words in which Δn·d was 1.4 μm, and the retardation R of the retardation film 2 was 1.8 μm; in these cases, the color tone at zero voltage was gray dark. When a voltage was applied, color changes to black, blue, yellow-green, and pink occurred as the voltage increased. In other words, these are boundary conditions for the liquid crystal device of this invention.

Furthermore, as an example of another set of conditions within the portion (a) of FIG. 6, a curve (b) in FIG. 7 shows color changes with respect to applied voltage that occurred when a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 1.4 μm. The color tone at zero voltage was a greenish white, at an effective voltage of 2.18 V it was orange, at 2.22 V it was blue, and at 2.25 V it was green.

In other words, this is one set of conditions that is most suitable for the liquid crystal device of this invention. In addition, when a liquid crystal cell 3 was used in which the optical anisotropy Δn of the nematic liquid crystal 10 was 0.22 and the thickness d was 7 μm, in other words in which Δn·d was 1.54 μm, and the retardation R of the retardation film 2 was 1.7 μm, substantially the same color changes as those of curve (b) in FIG. 7 occurred; when Δn·d was 1.6 μm or less, by modulating the angle θ1 between the direction A1 of the absorption axis (or polarization axis) of the upper polarizing plate 1 and the direction B1 of the slow axis of the retardation film 2, the angle θ2 between the direction B1 of the slow axis of the retardation film 2 and the direction of rubbing C1 of the upper plane, and the angle θ3 between the direction of rubbing C2 of the lower plane and the direction A2 of the absorption axis (or polarization axis) of the lower polarizing plate 4, color changes similar to those of curve (a) of FIG. 7 became color changes similar to those of curve (b) of FIG. 7.

Conversely, to demonstrate conditions outside the portion (a) of FIG. 6 under which the color tone at zero voltage is not white or a non-color close thereto, a liquid crystal cell 3 was used in which the optical anisotropy Δn of the nematic liquid crystal 10 was 0.2 and the thickness d was 7 μm, in other words in which Δn·d was 1.4 μm, and the retardation R of the retardation film 2 was 2 μm, alternatively a liquid crystal cell 3 was used in which the optical anisotropy Δn of the nematic liquid crystal 10 was 0.24 and the thickness d was 8 μm, in other words in which Δn·d was 1.92 μm, and the retardation R of the retardation film 2 was 1.8 μm; the color tone at zero voltage was black in the former case and the color tone at zero voltage was yellow in the latter case. In other words, these are conditions that are not suitable for the liquid crystal device of this invention.

To further demonstrate conditions outside the portion (a) of FIG. 6 under which display of at least two colors does not occur when a voltage is applied although the color tone displayed at zero voltage is white or a non-color close thereto, a liquid crystal cell 3 was used in which the optical anisotropy Δn of the nematic liquid crystal 10 was 0.13 and the thickness d was 7 μm, in other words in which Δn·d was 0.91 μm, and the retardation R of the retardation film 2 was 1.2 μm; in this case, the color tone at zero voltage was a yellowish white, but the color changed only to orange when a voltage was applied. In other words, these conditions are undesirable for the liquid crystal device of this invention.

Embodiment 1-3

A uniaxially drawn film of polyvinyl alcohol (hereinafter abbreviated to PVA) was used as the retardation film 2 in the above described configuration of FIGS. 1 and 3A.

In this case, the ratio α of the optical anisotropy at a wavelength of 450 nm with respect to the optical anisotropy at a wavelength of 590 nm was 1.01. In addition, the twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 was set to 35° to 55°, the angle θ2 between the direction B1 of the slow axis of the retardation film 2 and the direction of rubbing C1 of the upper plane was set to 80° to 100°, the angle θ3 between the direction of rubbing C2 of the lower plane and the direction A2 of the absorption axis (or polarization axis) of the lower polarizing plate 4 was set to 35° to 55°, combinations of the product Δn·d of the optical anisotropy Δn and the thickness d of the nematic liquid crystal 10 and the retardation R of the retardation film 2 were set up as shown in Table 3, and the change of color produced when a voltage was applied between the upper and lower electrodes 6 and 8 was measured with a spectrophotometer.

TABLE 3

| No. | Δn | d (μm) | Δn · d (μm) | R (μm) |
|---|---|---|---|---|
| 1 | 0.13 | 7.0 | 0.91 | 2.0 |
| 2 | 0.18 | 7.0 | 1.26 | 2.4 |
| 3 | 0.18 | 7.0 | 1.26 | 2.6 |

TABLE 3-continued

| No. | Δn   | d (μm) | Δn · d (μm) | R (μm) |
|-----|------|--------|-------------|--------|
| 4   | 0.18 | 7.0    | 1.26        | 2.8    |
| 5   | 0.23 | 7.0    | 1.61        | 2.4    |
| 6   | 0.23 | 7.0    | 1.61        | 2.6    |
| 7   | 0.23 | 7.0    | 1.61        | 2.8    |
| 8   | 0.24 | 8.0    | 1.92        | 2.4    |
| 9   | 0.24 | 8.0    | 1.92        | 2.6    |
| 10  | 0.24 | 8.0    | 1.92        | 2.8    |

As a result, the color tone at zero voltage was seen to be white or a non-color close thereto and at least two colors were displayed when a voltage was applied, provided that the retardation R of the retardation film 2 and the product Δn·d of the optical anisotropy Δn and the thickness d of the nematic liquid crystal 10 were in a predetermined relationship. These results are shown in FIG. 8.

Figure 8:
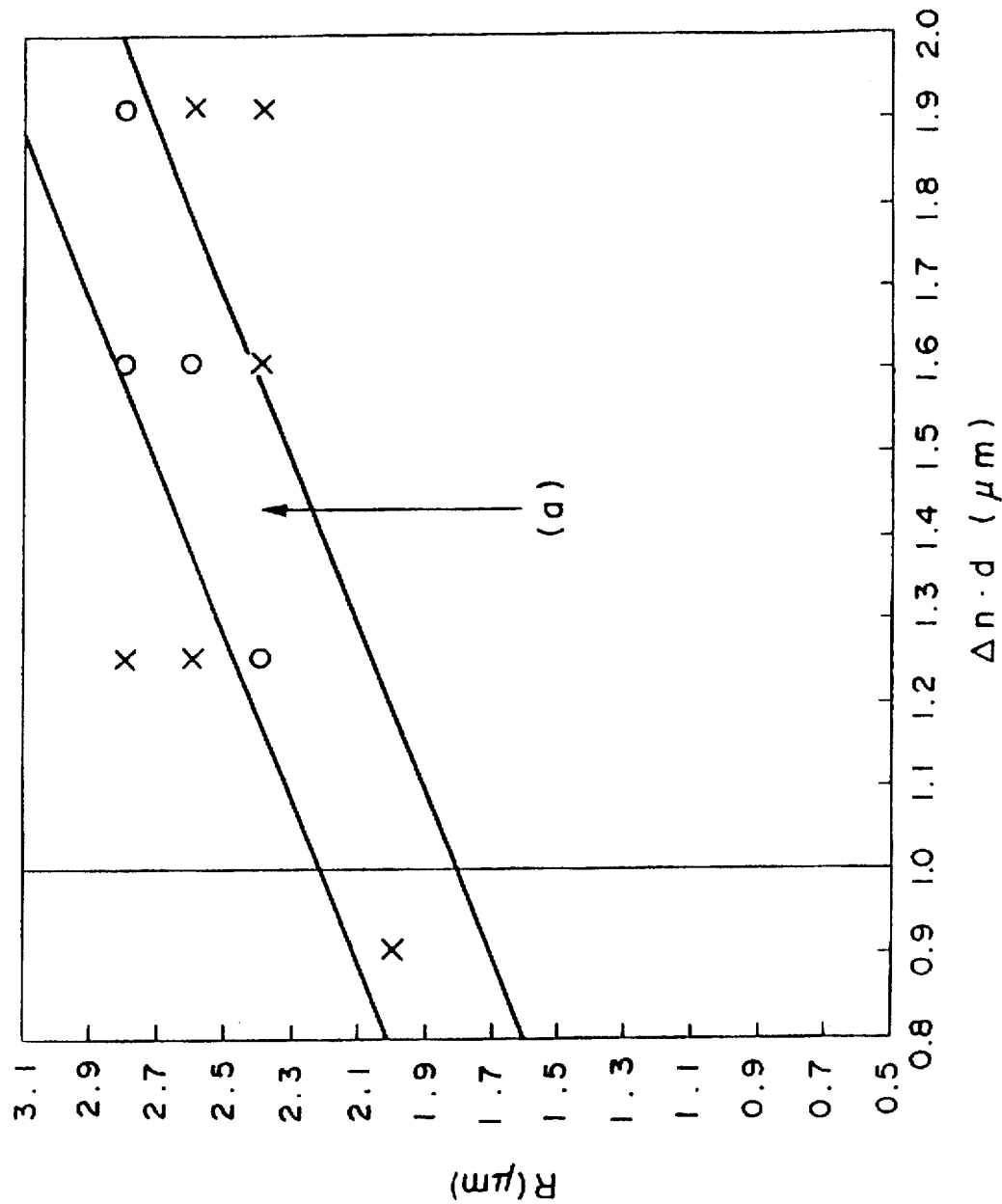
FIG. 8 shows an example of ranges of the values of $\Delta n \cdot d$ of the liquid crystal and the retardation R of the retardation film that are suitable for achieving the desired display, when a uniaxially drawn retardation film of polyvinyl alcohol (PVA) is used as the retardation film 2 of FIG. 1.

In FIG. 8, a portion (a) is a range within which the color tone at zero voltage is white or a non-color close thereto and at least two colors are displayed when a voltage is applied, so that this is the range in which both of the previously described first and second conditions are satisfied.

Therefore, within the range (a) of FIG. 8, the color tone at zero voltage was white or a non-color close thereto and at least two colors were displayed when a voltage was applied. Conversely, outside the range (a) of FIG. 8, either the color tone at zero voltage was not white or a non-color close thereto, or display of at least two colors did not occur when a voltage was applied.

To demonstrate an example of conditions within the portion (a) of FIG. 8, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 2.6 μm. In this example, the color tone at zero voltage was a yellowish white, at an effective voltage of 2.12 V it was orange, at 2.17 V it was blue, and at 2.19 V it was green. In other words, this is one set of conditions that is most suitable for the liquid crystal device of this invention.

In addition, to demonstrate the boundary conditions at which it is assumed the color tone at zero voltage becomes white or a non-color close thereto within the portion (a) of FIG. 8, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 2.8 μm, alternatively a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 2.4 μm. In these examples, the color tone at zero voltage was a reddish white. When a voltage was applied, color changes to orange, blue, and green occurred as the voltage increased. In other words, these are boundary conditions for the liquid crystal device of this invention.

Conversely, to demonstrate conditions outside the portion (a) of FIG. 8 under which the color tone at zero voltage is not white or a non-color close thereto, a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 2.6 μm, alternatively a liquid crystal cell 3 was used in which the optical anisotropy Δn of the nematic liquid crystal 10 was 0.24 and the thickness d was 8 μm, in other words in which Δn·d was 1.92 μm, and the retardation R of the retardation film 2 was 2.6 μm; in the former case, the color tone at zero voltage was orange, and in the latter case, the color tone at zero voltage was blue. In other words, these are conditions that are not suitable for the liquid crystal device of this invention.

To further demonstrate conditions outside the portion (a) of FIG. 8 under which display of at least two colors does not occur when a voltage is applied although the color tone displayed at zero voltage is white or a non-color close thereto, a liquid crystal cell 3 was used in which the optical anisotropy Δn of the nematic liquid crystal 10 was 0.13 and the thickness d was 7 μm, in other words in which Δn·d was 0.91 μm, and the retardation R of the retardation film 2 was 2 μm; in this case, the color tone at zero voltage was a bluish white, but the color changed only to orange when a voltage was applied. In other words, these are conditions that are not suitable for the liquid crystal device of this invention.

Embodiment 1-4

A uniaxially drawn film of PVA was used as the retardation film 2 in the configuration of FIGS. 1 and 3B.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 was set to 35° to 55°, the angle θ2 between the direction B1 of the slow axis of the retardation film 2 and the direction of rubbing C1 of the upper plane was set to 80° to 100°, the angle θ3 between the direction of rubbing C2 of the lower plane and the direction A2 of the absorption axis (or polarization axis) of the lower polarizing plate 4 was set to 35° to 55°, combinations of the product Δn·d of the optical anisotropy Δn and the thickness d of the nematic liquid crystal 10 and the retardation R of the retardation film 2 were set up as shown in Table 4, the change of color produced when a voltage was applied between the upper and lower electrodes 6 and 8 was measured with a spectrophotometer.

TABLE 4

| No. | Δn   | d (μm) | Δn · d (μm) | R (μm) |
|-----|------|--------|-------------|--------|
| 1   | 0.13 | 7.0    | 0.91        | 1.8    |
| 2   | 0.18 | 7.0    | 1.26        | 2.0    |
| 3   | 0.20 | 7.0    | 1.4         | 2.2    |
| 4   | 0.20 | 7.0    | 1.4         | 2.4    |
| 5   | 0.20 | 7.0    | 1.4         | 2.6    |
| 6   | 0.23 | 7.0    | 1.61        | 2.2    |
| 7   | 0.23 | 7.0    | 1.61        | 2.4    |
| 8   | 0.23 | 7.0    | 1.61        | 2.6    |
| 9   | 0.24 | 8.0    | 1.92        | 2.2    |
| 10  | 0.24 | 8.0    | 1.92        | 2.4    |
| 11  | 0.24 | 8.0    | 1.92        | 2.6    |

As a result, the color tone at zero voltage was seen to be white or a non-color close thereto and at least two colors were displayed when a voltage was applied, provided that the retardation R of the retardation film 2 and the product Δn·d of the optical anisotropy Δn and the thickness d of the nematic liquid crystal 10 were in a predetermined relationship. These results are shown in FIG. 9.

Figure 9:
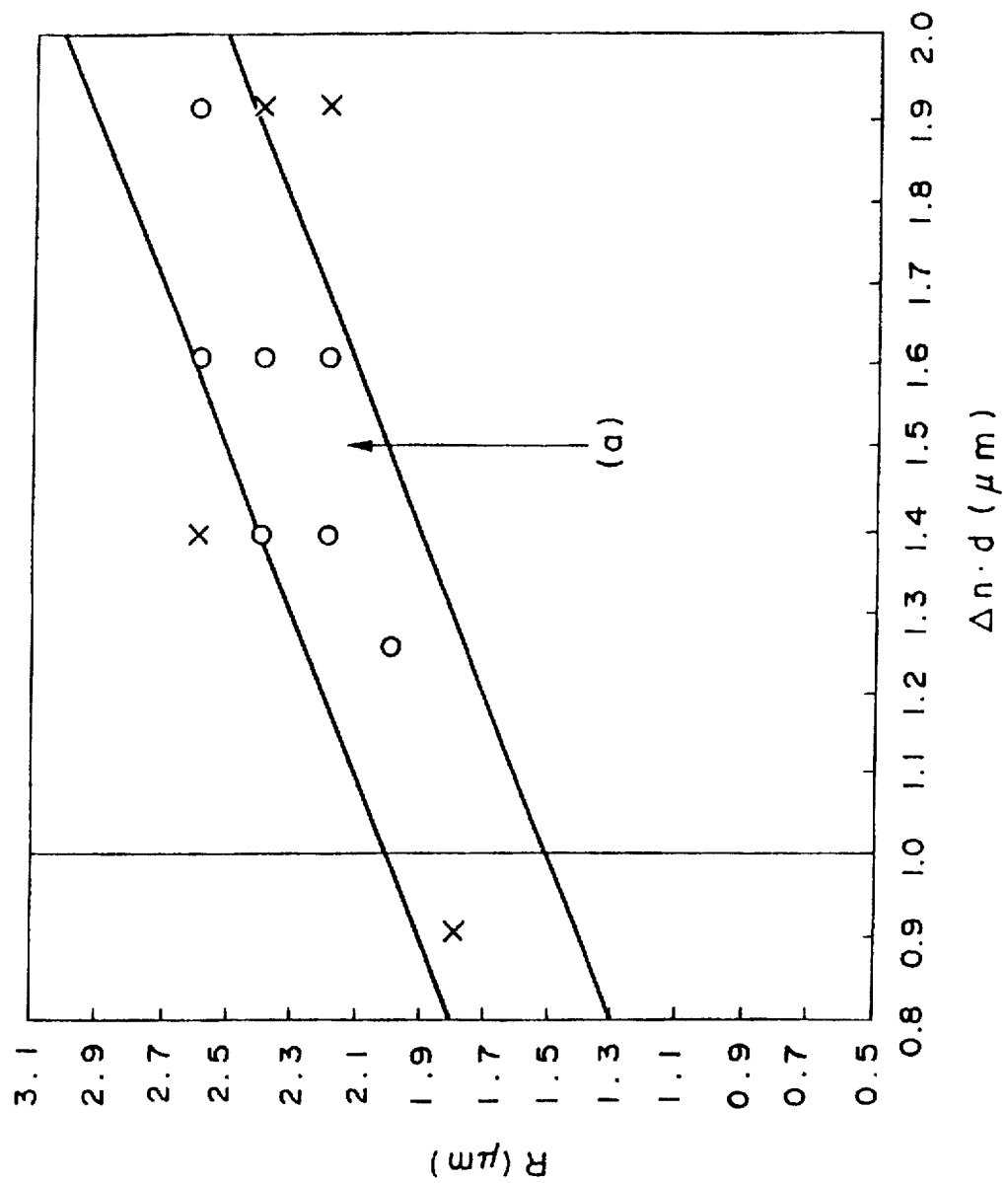
FIG. 9 shows another example of ranges of the values of $\Delta n \cdot d$ of the liquid crystal and the retardation R of the retardation film that are suitable for achieving the desired display, when a uniaxially drawn retardation film of polyvinyl alcohol (PVA) is used as the retardation film 2 of FIG. 1.

In FIG. 9, a portion (a) is a range within which the color tone at zero voltage is white or a non-color close thereto and at least two colors are displayed when a voltage is applied, so that this is the range in which both of the previously described first and second conditions are satisfied.

Therefore, within the range (a) of FIG. 9, the color tone at zero voltage was white or a non-color close thereto and at least two colors were displayed when a voltage was applied. Conversely, outside the range (a) of FIG. 9, either the color tone at zero voltage was not white or a non-color close thereto, or display of at least two colors did not occur when a voltage was applied.

To demonstrate an example of conditions within the portion (a) of FIG. 9, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 2.4 μm. In this example, the color tone at zero voltage was a yellowish white, at an effective voltage of 2.24 V it was black, at 2.27 V it was blue, at 2.29 V it was a yellow-green, and at 2.39 V it was pink. In other words, this is one set of conditions that is most suitable for the liquid crystal device of this invention.

In addition, to demonstrate the boundary conditions at which it is assumed the color tone at zero voltage becomes white or a non-color close thereto within the portion (a), a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 2.6 μm, alternatively a liquid crystal cell 3 was used in which the optical anisotropy Δn of the nematic liquid crystal 10 was 0.2 and the thickness d was 7 μm, in other words in which Δn·d was 1.4 μm, and the retardation R of the retardation film 2 was 2.4 μm; in this case, the color tone at zero voltage was gray. When a voltage was applied, color changes to black, blue, yellow-green, and pink occurred as the voltage increased. In other words, these are boundary conditions for the liquid crystal device of this invention.

Furthermore, as an example of another set of conditions within the range (a) of FIG. 9, a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 2 μm. In this example, the color tone at zero voltage was a greenish white, at an effective voltage of 2.21 V it was orange, at 2.25 V it was blue, and at 2.28 V it was green. In other words, this is one set of conditions that is most suitable for the liquid crystal device of this invention.

Conversely, to demonstrate conditions outside the range (a) of FIG. 9 under which the color tone at zero voltage is not white or a non-color close thereto, a liquid crystal cell 3 was used in which the optical anisotropy Δn of the nematic liquid crystal 10 was 0.2 and the thickness d was 7 μm, in other words in which Δn·d was 1.4 μm, and the retardation R of the retardation film 2 was 2.6 μm, alternatively a liquid crystal cell 3 was used in which the optical anisotropy Δn of the nematic liquid crystal 10 was 0.24 and the thickness d was 8 μm, in other words in which Δn·d was 1.92 μm, and the retardation R of the retardation film 2 was 2.2 μm; the color tone at zero voltage was black in the former case and the color tone at zero voltage was yellow in the latter case. In other words, these are conditions that are not suitable for the liquid crystal device of this invention.

To further demonstrate conditions outside the range (a) of FIG. 9 under which display of at least two colors does not occur when a voltage is applied although the color tone displayed at zero voltage is white or a non-color close thereto, a liquid crystal cell 3 was used in which the optical anisotropy Δn of the nematic liquid crystal 10 was 0.13 and the thickness d was 7 μm, in other words in which Δn·d was 0.91 μm, and the retardation R of the retardation film 2 was 1.8 μm; in this case, the color tone at zero voltage was a yellowish white, but the color changed only to orange when a voltage was applied. In other words, these are conditions that are not suitable for the liquid crystal device of this invention.

Embodiment 1-5

A uniaxially drawn film of polysulfone (hereinafter abbreviated to PSF) was used as the retardation film 2 in the configuration of FIGS. 1 and 3A.

In this case, the ratio α of the optical anisotropy at a wavelength of 450 nm with respect to the optical anisotropy at a wavelength of 590 nm was 1.15.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 was set to 35° to 55°, the angle θ2 between the direction B1 of the slow axis of the retardation film 2 and the direction of rubbing C1 of the upper plane was set to 80° to 100°, the angle θ3 between the direction of rubbing C2 of the lower plane and the direction A2 of the absorption axis (or polarization axis) of the lower polarizing plate 4 was set to 35° to 55°, combinations of the product Δn·d of the optical anisotropy Δn and the thickness d of the nematic liquid crystal 10 and the retardation R of the retardation film 2 were set up as shown in Table 5, and the change of color produced when a voltage was applied between the upper and lower electrodes 6 and 8 was measured with a spectrophotometer.

TABLE 5

| No. | Δn | d (μm) | Δn · d (μm) | R (μm) |
|---|---|---|---|---|
| 1 | 0.13 | 7.0 | 0.91 | 0.7 |
| 2 | 0.18 | 7.0 | 1.26 | 1.2 |
| 3 | 0.20 | 7.0 | 1.4 | 1.2 |
| 4 | 0.20 | 7.0 | 1.4 | 1.4 |
| 5 | 0.20 | 7.0 | 1.4 | 1.6 |
| 6 | 0.23 | 7.0 | 1.61 | 1.2 |
| 7 | 0.23 | 7.0 | 1.61 | 1.4 |
| 8 | 0.23 | 7.0 | 1.61 | 1.6 |
| 9 | 0.24 | 8.0 | 1.92 | 1.2 |
| 10 | 0.24 | 8.0 | 1.92 | 1.4 |
| 11 | 0.24 | 8.0 | 1.92 | 1.6 |

As a result, the color tone at zero voltage was seen to be white or a non-color close thereto and at least two colors were displayed when a voltage was applied, provided that the retardation R of the retardation film 2 and the product Δn·d of the optical anisotropy Δn and the thickness d of the nematic liquid crystal 10 were in a predetermined relationship.

Figure 10:
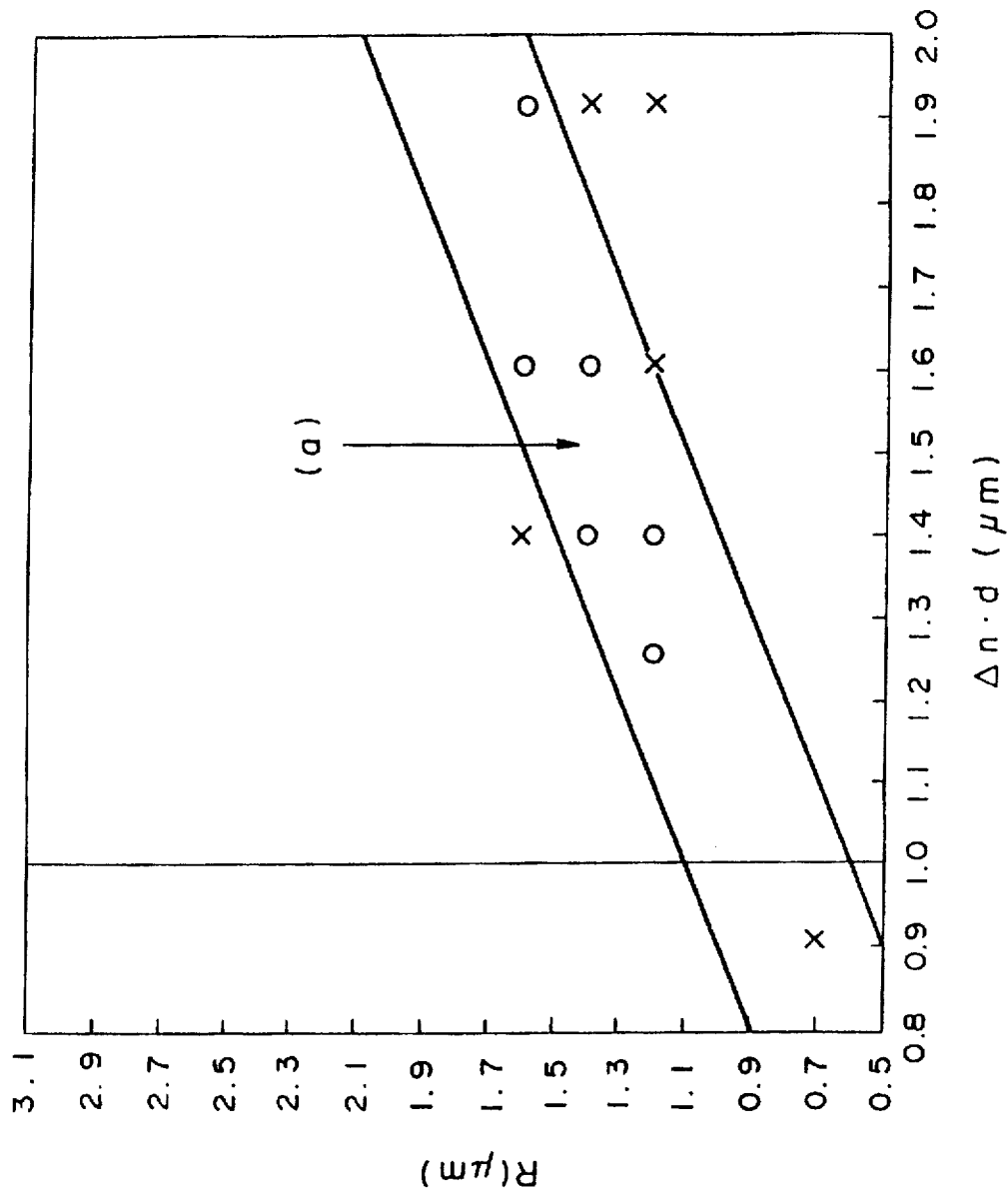
FIG. 10 shows an example of ranges of the values of $\Delta n \cdot d$ of the liquid crystal and the retardation R of the retardation film that are suitable for achieving the desired display, when a uniaxially drawn retardation film of polysulfone (PSF) is used as the retardation film 2 of FIG. 1.

These results are shown in FIG. 10. In FIG. 10, a portion (a) is a range within which the color tone at zero voltage is white or a non-color close thereto and at least two colors are displayed when a voltage is applied, so that this is a range in which the previously described first and second conditions are both satisfied.

Therefore, within the range (a) of FIG. 10, the color tone at zero voltage was white or a non-color close thereto and at least two colors were displayed when a voltage was applied. Conversely, outside the range (a) of FIG. 10, either the color tone at zero voltage was not white or a non-color close thereto, or display of at least two colors did not occur when a voltage was applied.

To demonstrate an example of conditions within the portion (a) of FIG. 10, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 1.4 μm. In this example, the color tone at zero voltage was a bluish white, at an effective voltage of 2.22 V it was black, at 2.25 V it was blue, at 2.27 V it was a yellow-green, and at 2.37 V it was pink. In other words, this is one set of conditions that is most suitable for the liquid crystal device of this invention.

In addition, as an example of another set of conditions within the portion (a) of FIG. 10, a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 1.2 μm. In this example, the color tone at zero voltage was a reddish white, at an effective voltage of 2.19 V it was orange, at 2.23 V it was blue, and at 2.26 V it was green. In other words, this is one set of conditions that is most suitable for the liquid crystal device of this invention.

Conversely, to demonstrate conditions outside the range (a) of FIG. 10 under which the color tone at zero voltage is not white or a non-color close thereto, a liquid crystal cell 3 was used in which the optical anisotropy Δn of the nematic liquid crystal 10 was 0.2 and the thickness d was 7 μm, in other words in which Δn·d was 1.4 μm, and the retardation R of the retardation film 2 was 1.6 μm, alternatively a liquid crystal cell 3 was used in which the optical anisotropy Δn of the nematic liquid crystal 10 was 0.24 and the thickness d was 8 μm, in other words in which Δn·d was 1.92 μm, and the retardation R of the retardation film 2 was 1.4 μm; the color tone at zero voltage was black in the former case and the color tone at zero voltage was yellow in the latter case. In other words, these are conditions that are not suitable for the liquid crystal device of this invention.

To further demonstrate conditions outside the range (a) of FIG. 10 under which display of at least two colors does not occur when a voltage is applied although the color tone displayed at zero voltage is white or a non-color close thereto, a liquid crystal cell 3 was used in which the optical anisotropy Δn of the nematic liquid crystal 10 was 0.13 and the thickness d was 7 μm, in other words in which Δn·d was 0.91 μm, and the retardation R of the retardation film 2 was 0.7 μm; in this case, the color tone at zero voltage was a yellowish white, but the only change that occurred when a voltage was applied was to orange. In other words, these are conditions that are not suitable for the liquid crystal device of this invention.

Embodiment 1-6

A uniaxially drawn film of PSF was used as the retardation film 2 in the configuration of FIGS. 1 and 3B.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 was set to 35° to 55°, the angle θ2 between the direction B1 of the slow axis of the retardation film 2 and the direction of rubbing C1 of the upper plane was set to 80° to 100°, the angle θ3 between the direction of rubbing C2 of the lower plane and the direction A2 of the absorption axis (or polarization axis) of the lower polarizing plate 4 was set to 35° to 55°, combinations of the product Δn·d of the optical anisotropy Δn and the thickness d of the nematic liquid crystal 10 and the retardation R of the retardation film 2 were set up as shown in Table 6, and the change of color produced when a voltage was applied between the upper and lower electrodes 6 and 8 was measured with a spectrophotometer.

TABLE 6

| No. | Δn | d (μm) | Δn · d (μm) | R (μm) |
|-----|------|--------|-------------|--------|
| 1   | 0.13 | 7.0    | 0.91        | 1.0    |
| 2   | 0.18 | 7.0    | 1.26        | 1.5    |
| 3   | 0.18 | 7.0    | 1.26        | 1.7    |
| 4   | 0.18 | 7.0    | 1.26        | 1.9    |
| 5   | 0.23 | 7.0    | 1.61        | 1.5    |
| 6   | 0.23 | 7.0    | 1.61        | 1.7    |
| 7   | 0.23 | 7.0    | 1.61        | 1.9    |
| 8   | 0.24 | 8.0    | 1.92        | 1.5    |
| 9   | 0.24 | 8.0    | 1.92        | 1.7    |
| 10  | 0.24 | 8.0    | 1.92        | 1.9    |

As a result, the color tone at zero voltage was seen to be white or a non-color close thereto and at least two colors were displayed when a voltage was applied, provided that the retardation R of the retardation film 2 and the product Δn·d of the optical anisotropy Δn and the thickness d of the nematic liquid crystal 10 were in a predetermined relationship.

Figure 11:
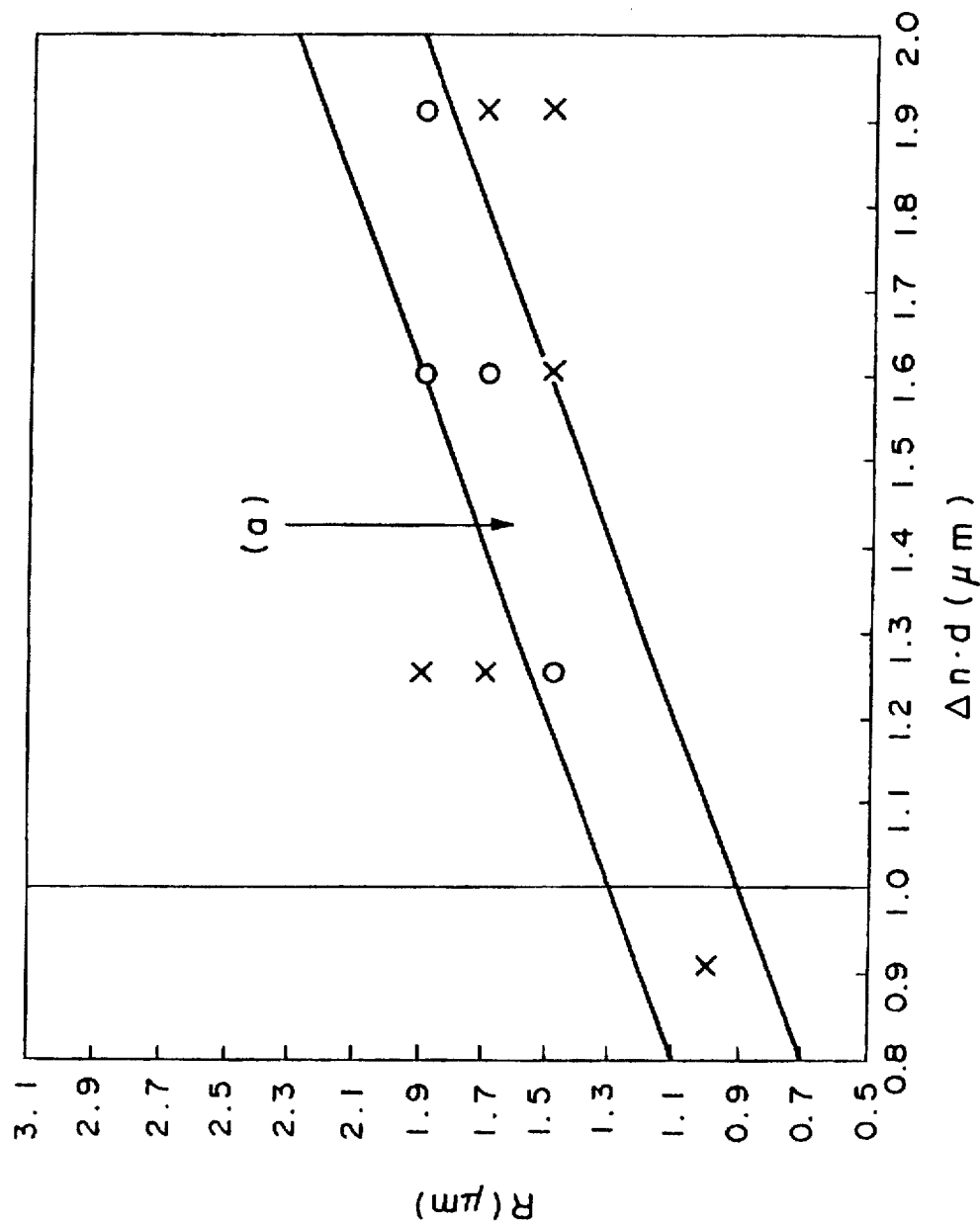
FIG. 11 shows another example of ranges of the values of $\Delta n \cdot d$ of the liquid crystal and the retardation R of the retardation film that are suitable for achieving the desired display, when a uniaxially drawn retardation film of polysulfone (PSF) is used as the retardation film 2 of FIG. 1.

These results are shown in FIG. 11. In FIG. 11, a portion (a) is a range within which the color tone at zero voltage is white or a non-color close thereto and at least two colors are displayed when a voltage is applied, so that this is a range in which the previously described first and second conditions are both satisfied Therefore, within the range (a) of FIG. 11, the color tone at zero voltage was white or a non-color close thereto and at least two colors were displayed when a voltage was applied. Conversely, outside the range (a) of FIG. 11, either the color tone at zero voltage was not white or a non-color close thereto, or color display of at least two colors did not occur when a voltage was applied.

To demonstrate an example of the conditions within the range (a) of FIG. 11, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 1.7 μm. In this example, the color tone at zero voltage was a yellowish white, at an effective voltage of 2.10 V it was orange, at 2.15 V it was blue, and at 2.17 V it was green. In other words, this is one set of conditions that is most suitable for the liquid crystal device of this invention.

In addition, to demonstrate the boundary conditions at which it is assumed the color tone at zero voltage becomes white or a non-color close thereto within the portion (a) of FIG. 11, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 1.9 μm, alternatively a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 1.5 μm; in these cases, the color tone at zero voltage became a reddish white. When a voltage was applied, color changes to orange, blue, and green occurred as the voltage increased. In other words, these are boundary conditions for the liquid crystal device of this invention.

Conversely, to demonstrate conditions outside the range (a) of FIG. 11 under which the color tone at zero voltage is not white or a non-color close thereto, a liquid crystal cell 3 was used in which the optical anisotropy Δn of the nematic liquid crystal 10 was 0.18 and the thickness d was 7 μm, in other words in which Δn·d was 1.26 μm, and the retardation R of the retardation film 2 was 1.7 μm, alternatively a liquid crystal cell 3 was used in which the optical anisotropy Δn of the nematic liquid crystal 10 was 0.24 and the thickness d was 8 μm, in other words in which Δn·d was 1.92 μm, and the retardation R of the retardation film 2 was 1.7 μm; and the color tone at zero voltage was orange in the former case and the color tone at zero voltage was blue in the latter case. In other words, these are conditions that are not suitable for the liquid crystal device of this invention.

To further demonstrate conditions outside the range (a) of FIG. 11 under which display of at least two colors does not occur when a voltage is applied although the color tone displayed at zero voltage is white or a non-color close thereto, a liquid crystal cell 3 was used in which the optical anisotropy Δn of the nematic liquid crystal 10 was 0.13 and the thickness d was 7 μm, in other words in which Δn·d was 0.91 μm, and the retardation R of the retardation film 2 was 1 μm; in this case, the color tone at zero voltage was a bluish white, but the color changed only to orange when a voltage was applied. In other words, these are conditions that are not suitable for the liquid crystal device of this invention.

EMBODIMENT 2

This embodiment gives examples of the use of two uniaxially drawn retardation films of PC as optically anisotropic substances.

Figure 12:
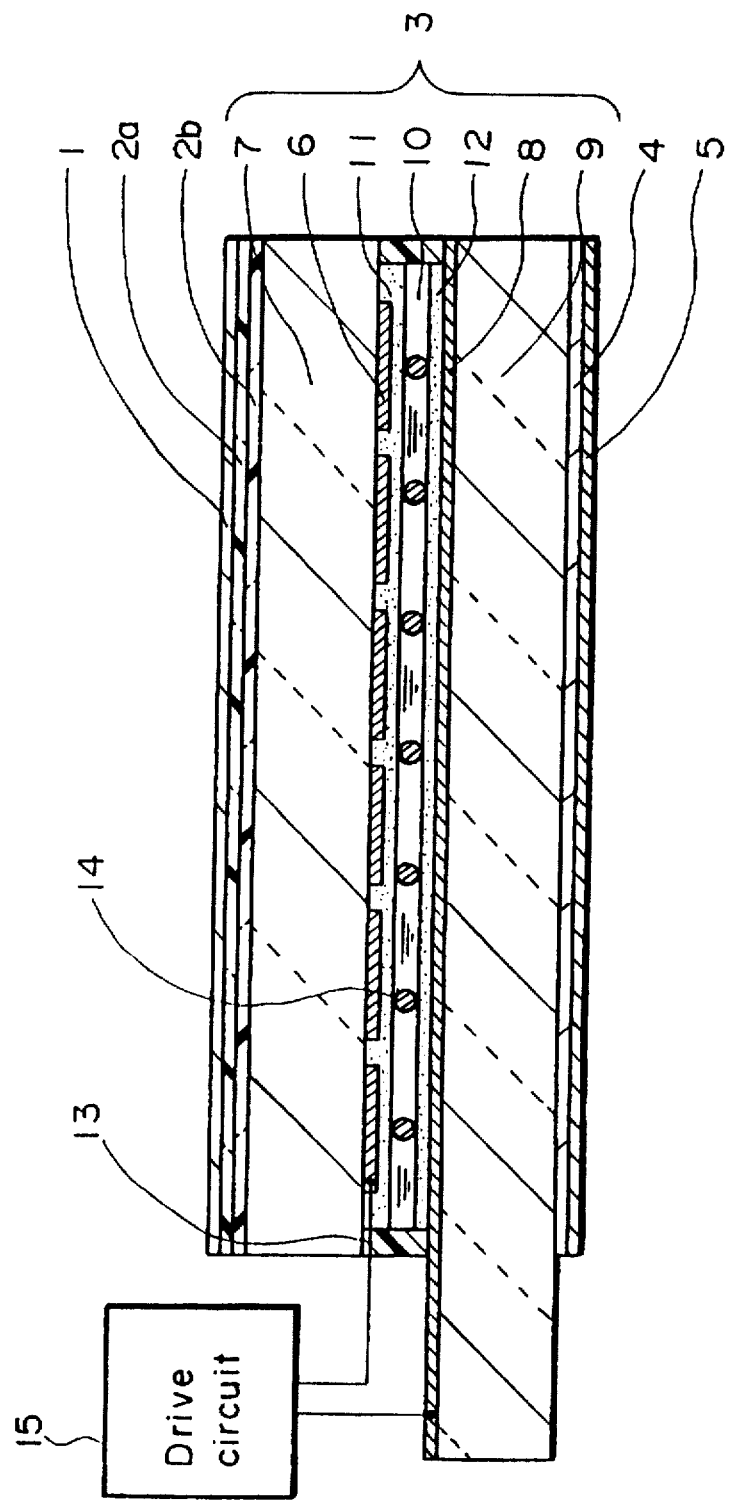
FIG. 12 is a sectional view through another example of the liquid crystal device of this invention.

A sectional view through a second reflective type of liquid crystal device to which this invention is applied is shown in FIG. 12.

In FIG. 12, reference number 1 denotes an upper polarizing plate, reference numbers 2a and 2b denote retardation films, reference number 3 denotes a liquid crystal cell, reference number 4 denotes a lower polarizing plate, and reference number 5 denotes a reflective plate. The configuration of the liquid crystal cell 3 is the same as that of FIG. 1.

Figure 13B:
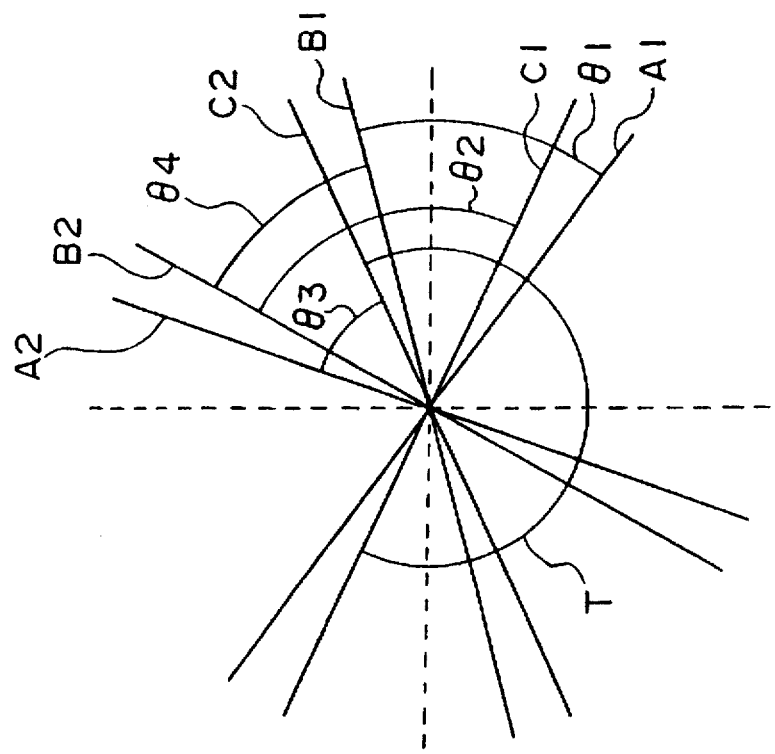
FIG. 13B shows another example of the mutual relationships between these directions.
Figure 13A:
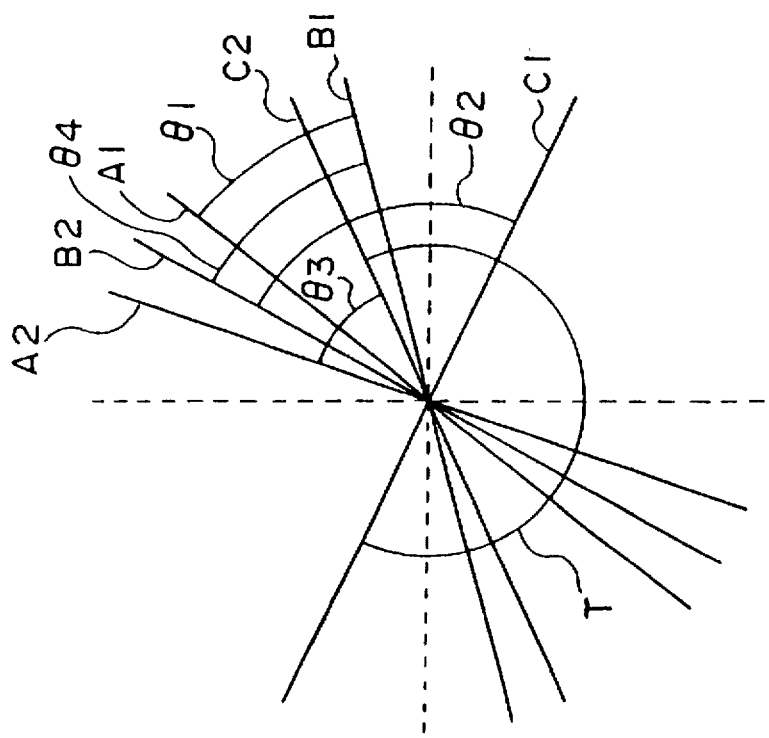
FIG. 13A shows an example of the mutual relationships between the directions of the absorption axes (polarization axes) of the polarizing plates, the direction of the slow axis of the retardation film, and the directions of alignment of the nematic liquid crystal in the liquid crystal device of FIG. 12.

The relationships between the directions of the absorption axes (or polarization axes) of the polarizing plates 1 and 4 of FIG. 12, the directions of the slow axes of the retardation films 2a and 2b, and the directions of rubbing of the upper and lower planes are shown in FIGS. 13A and 13B.

FIGS. 13A and 13B are differentiated by the direction of the absorption axis (or polarization axis) of the upper polarizing plate 1. In these figures, A1 and A2 are the directions of the absorption axes (or polarization axes) of the upper and lower polarizing plates 1 and 4, B1 and B2 are the directions of the slow axes of the retardation films 2a and 2b, and C1 and C2 are the directions of rubbing of the upper and lower planes. In addition, T is the twist angle of the nematic liquid crystal 10, θ1 is the angle between the direction A1 of the absorption axis (or polarization axis) of the upper polarizing plate 1 and the direction B1 of the slow axis of the retardation film 2a, θ2 is the angle between the direction B2 of the slow axis of the retardation film 2b and the direction of rubbing C1 of the upper plane, θ3 is the angle between the direction of rubbing C2 of the lower plane and the direction A2 of the absorption axis (or polarization axis) of the lower polarizing plate 4, and θ4 is the angle between the direction B1 of the slow axis of the retardation film 2a and the direction B2 of the slow axis of the retardation film 2b. θ1 is set to be more than 0° and less than 90°.

Embodiment 2-1

A uniaxially drawn film of PC was used as each of the retardation films 2a and 2b in the configuration of FIGS. 12 and 13A.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2a and the angle θ3 between the direction of rubbing C2 of the lower plane and the direction A2 of the absorption axis (or polarization axis) of the lower polarizing plate 4 were both set to 35° to 55°, the angle θ2 between the direction B2 of the slow axis of the retardation film 2b and the direction of rubbing C1 of the upper plane was set to 80° to 100°, and the angle θ4 between the direction B1 of the slow axis of the retardation film 2a and the direction B2 of the slow axis of the retardation film 2b was set to 0° to 20°. A liquid crystal cell 3 was used in which the optical anisotropy Δn of the nematic liquid crystal 10 was 0.23 and the thickness d was 7 μm, in other words in which Δn·d was 1.61 μm, and the sum of the product Δn1·d1 of the optical anisotropy Δn1 and the thickness d1 of the retardation film 2a plus the product Δn2·d2 of the optical anisotropy Δn2 and the thickness d2 of the retardation film 2b (hereinafter called the retardation R for Embodiment 2) was set to 2 μm. As a result, the color tone at zero voltage was seen to be white or a non-color close thereto and color changes to orange, blue, and green occurred as the voltage increased. The various colors could be perceived over a wider viewing angle than in the configuration of Embodiment 1-1 in which a single uniaxially drawn film of PC was used.

Embodiment 2-2

A uniaxially drawn film of PC was used as each of the retardation films 2a and 2b in the configuration of FIGS. 12 and 13B.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2a and the angle θ3 between the direction of rubbing C2 of the lower plane and the direction A2 of the absorption axis (or polarization axis) of the lower polarizing plate 4 were both set to 35° to 55°, the angle θ2 between the direction B2 of the slow axis of the retardation film 2b and the direction of rubbing C1 of the upper plane was set to 80° to 100°, and the angle θ4 between the direction B1 of the slow axis of the retardation film 2a and the direction B2 of the slow axis of the retardation film 2b was set to 0 to 20°. A liquid crystal cell 3 was used in which the optical anisotropy Δn of the nematic liquid crystal 10 was 0.23 and the thickness d was 7 μm, in other words in which Δn·d was 1.61 μm, and the retardation R of the retardation films 2a and 2b was 1.8 μm. As a result, the color tone at zero voltage was seen to be white or a non-color close thereto and color changes to black, blue, yellow-green, and pink occurred when a voltage was applied. The various colors could be perceived over a wider viewing angle than in the configuration of Embodiment 1-2 in which a single uniaxially drawn film of PC was used.

EMBODIMENT 3

This embodiment gives examples of the use of two uniaxially drawn retardation films of PC as optically anisotropic substances.

Figure 14:
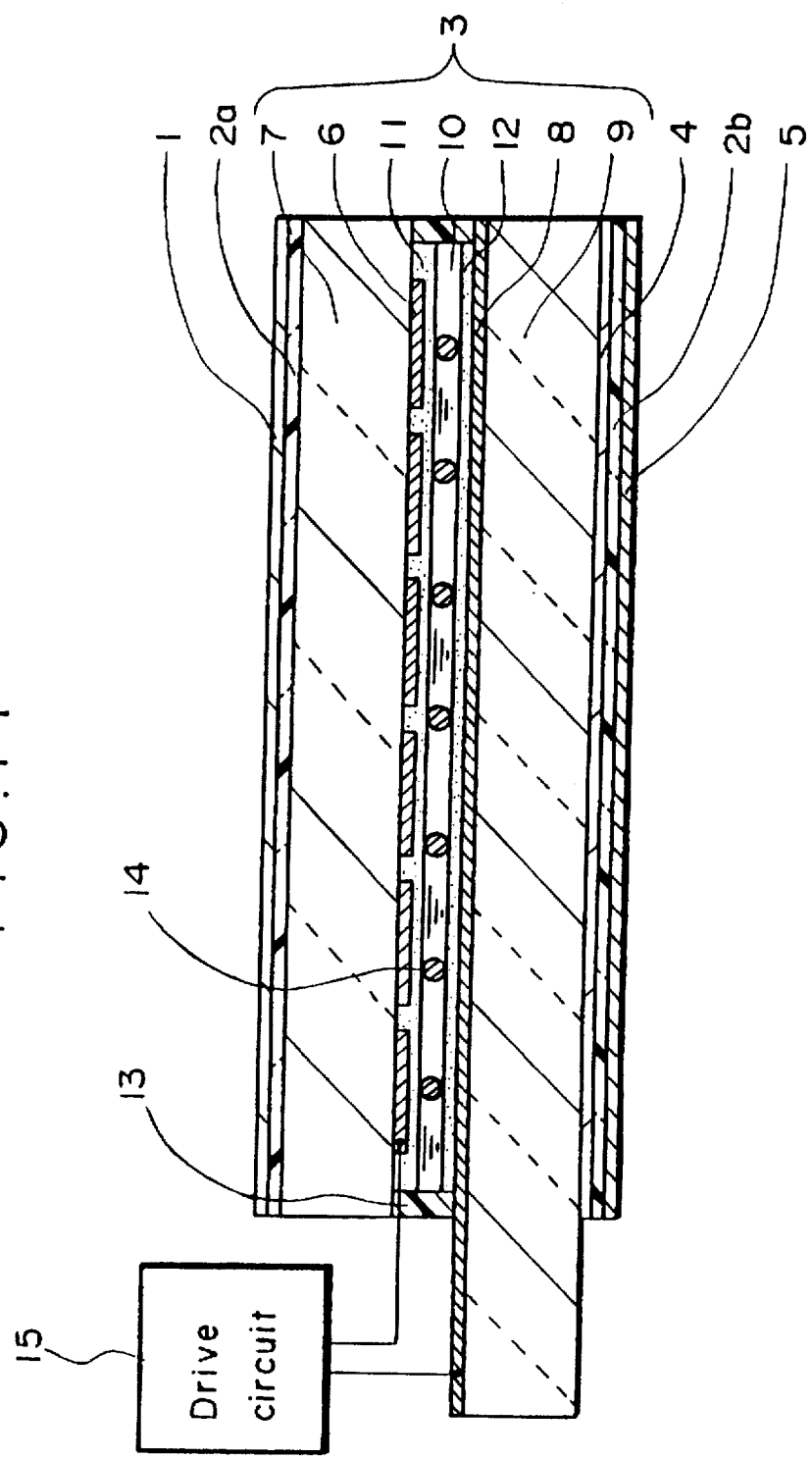
FIG. 14 is a sectional view through another example of the liquid crystal device of this invention.

A sectional view through a third reflective type of liquid crystal device to which this invention is applied is shown in FIG. 14. In FIG. 14, reference number 1 denotes an upper polarizing plate, reference numbers 2a and 2b denote retardation films, reference number 3 denotes a liquid crystal cell, reference number 4 denotes a lower polarizing plate, and reference number 5 denotes a reflective plate. The configuration of the liquid crystal cell 3 is the same as that of FIG. 1.

The retardation films 2a and 2b were disposed between the upper polarizing plate 1 and the liquid crystal cell 3 in the above described Embodiment 2, but in Embodiment 3, the retardation film 2a is disposed between the upper polarizing plate 1 and the liquid crystal cell 3, and the retardation film 2b is disposed between the liquid crystal cell 3 and the lower polarizing plate.

Figure 15A:
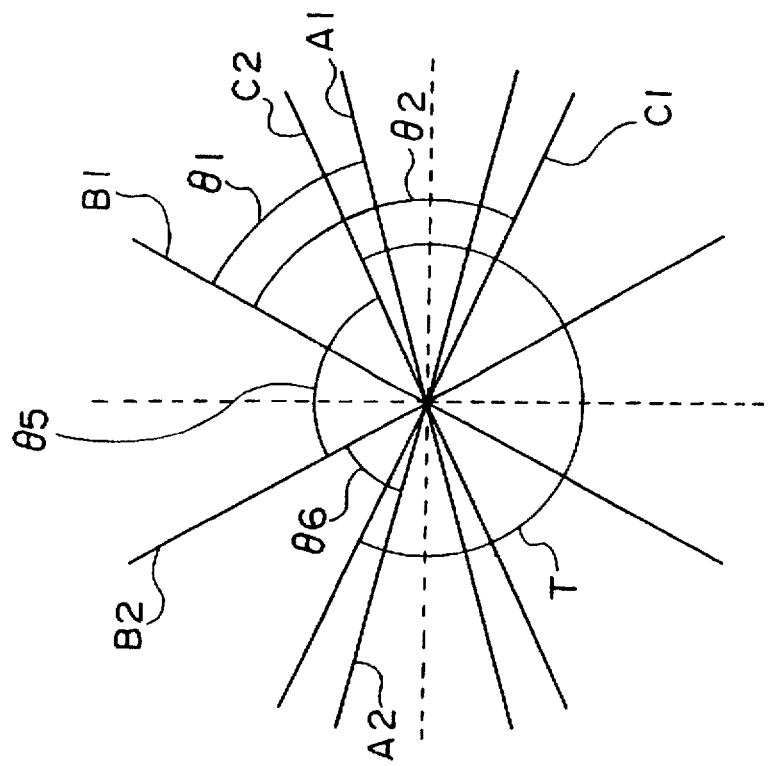
FIG. 15A shows an example of the mutual relationships between the directions of the absorption axes (polarization axes) of the polarizing plates, the direction of the slow axis of the retardation film, and the directions of alignment of the nematic liquid crystal in the liquid crystal device of FIG. 14.
Figure 15B:
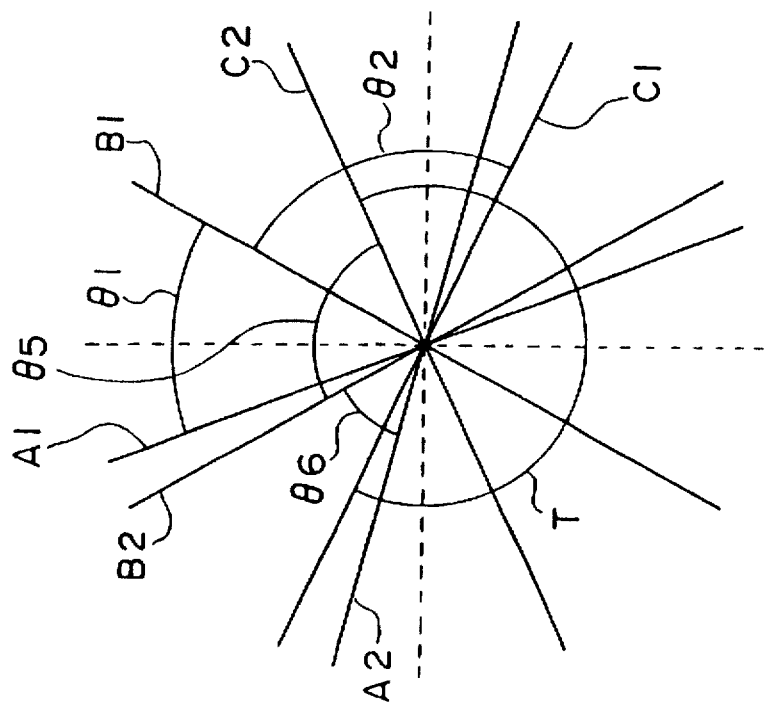
FIG. 15B shows another example of the mutual relationships between these directions.

The mutual relationships between the directions of the absorption axes (or polarization axes) of the polarizing plates 1 and 4 of FIG. 14, the directions of the slow axes of the retardation films 2a and 2b, and the directions of rubbing of the upper and lower planes are shown in FIGS. 15A and 15B. FIGS. 15A and 15B are differentiated by the direction of the absorption axis (or polarization axis) of the upper polarizing plate 1.

In FIGS. 15A and 15B, A1 and A2 are the directions of the absorption axes (or polarization axes) of the upper and lower polarizing plates 1 and 4, B1 and B2 are the directions of the slow axes of the retardation films 2a and 2b, and C1 and C2 are the directions of rubbing of the upper and lower planes. In addition, T is the twist angle of the nematic liquid crystal 10, θ1 is the angle between the direction A1 of the absorption axis (or polarization axis) of the upper polarizing plate 1 and the direction B1 of the slow axis of the retardation film 2a, 62 is the angle between the direction B1 of the slow axis of the retardation film 2a and the direction of rubbing C1 of the upper plane, θ5 is the angle between the direction of rubbing C2 of the lower plane and the direction B2 of the slow axis of the retardation film 2b, and 66 is the angle between the direction B2 of the slow axis of the retardation film 2b and the direction A2 of the absorption axis (or polarization axis) of the lower polarizing plate 4. θ1 is set to be more than 0° and less than 90°.

Embodiment 3-1

A uniaxially drawn film of PC was used as each of the retardation films 2a and 2b in the configuration of FIGS. 14 and 15A.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2a and the angle θ6 between the direction A2 of the absorption axis (or polarization axis) of the lower polarizing plate 4 of the retardation film 2b were both set to 35° to 55°, and the angle θ2 between the direction B1 of the slow axis of the retardation film 2a and the direction of rubbing C1 of the upper plane and the angle θ5 between the direction of rubbing C2 of the lower plane and the direction B2 of the slow axis of the retardation film 2b were both set to 80° to 100°.

A liquid crystal cell 3 was used in which the optical anisotropy Δn of the nematic liquid crystal 10 was 0.23 and the thickness d was 7 μm, in other words in which Δn·d was 1.61 μm, and the sum of the product Δn1·d1 of the optical anisotropy Δn1 and the thickness d1 of the retardation film 2a plus the product Δn2·d2 of the optical anisotropy Δn2 and the thickness d2 of the retardation film 2b (hereinafter called the retardation R for Embodiment 3) was set to 2 μm. As a result, the color tone at zero voltage was seen to be white or a non-color close thereto and color changes to orange, blue, and green occurred as the voltage increased. In a similar manner to that of Embodiment 2-1, the various colors could be perceived over a wider viewing angle than in the configuration of Embodiment 1-1 in which a single uniaxially drawn film of PC was used.

Embodiment 3-2

A uniaxially drawn film of PC was used as each of the retardation films 2a and 2b in the configuration of FIGS. 14 and 15B.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2a and the angle θ6 between the direction A2 of the absorption axis (or polarization axis) of the lower polarizing plate 4 of the retardation film 2b were both set to 350° to 55°, and the angle θ2 between the direction B1 of the slow axis of the retardation film 2a and the direction of rubbing C1 of the upper plane and the angle θ5 between the direction of rubbing C2 of the lower plane and the direction B2 of the slow axis of the retardation film 2b were both set to 80° to 100°. A liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2a was 1.8 μm. As a result, the color tone at zero voltage was seen to be white or a non-color close thereto and color changes to black, blue, yellow-green, and pink occurred when a voltage was applied.

In a similar manner to that of the above Embodiment 2-2, the various colors could be perceived over a wider viewing angle than in the configuration of Embodiment 1-2 in which a single uniaxially drawn film of PC was used.

EMBODIMENT 4

This embodiment gives examples of the use of six uniaxially drawn retardation films of PC as optically anisotropic substances.

Figure 16:
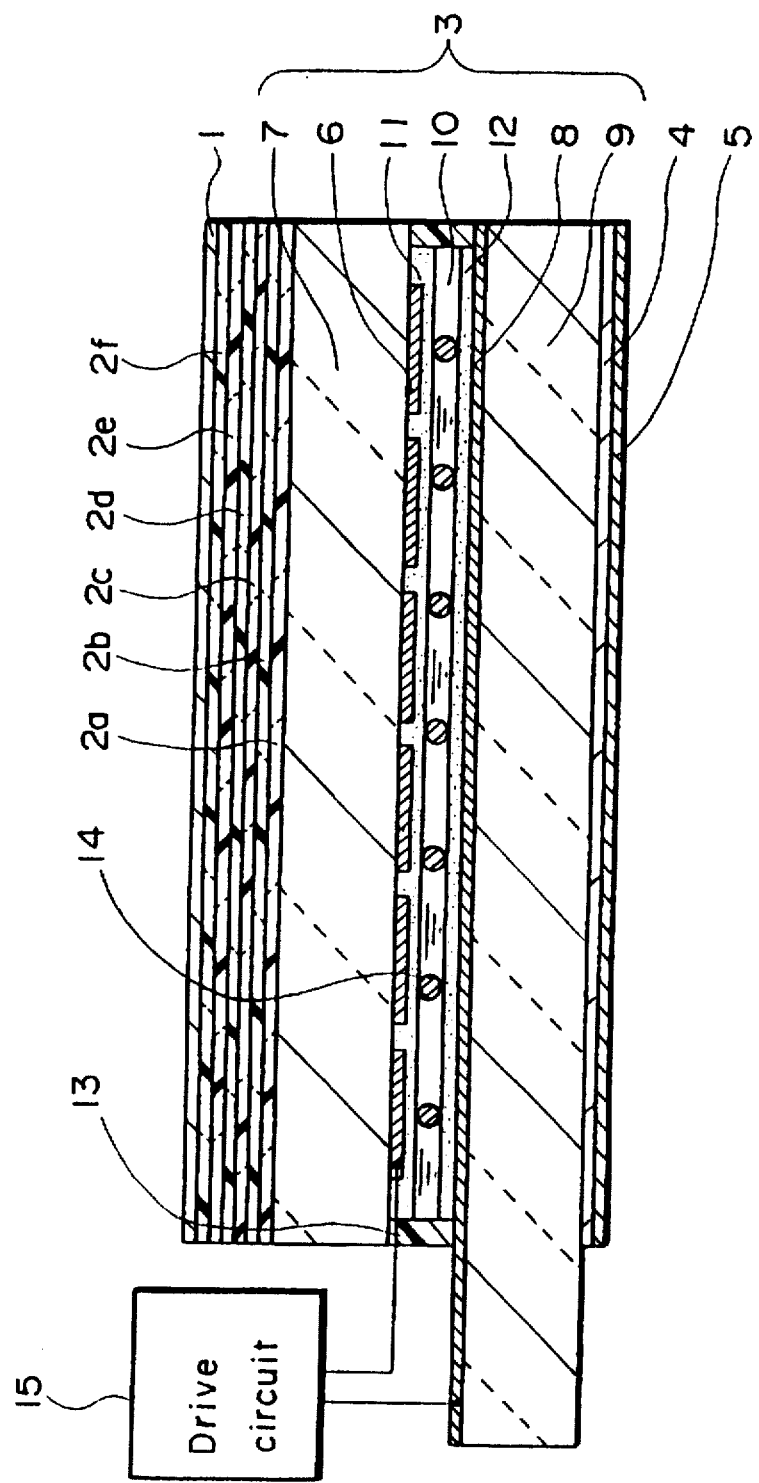
FIG. 16 is a sectional view through another example of the liquid crystal device of this invention.

A sectional view through a fourth reflective type of liquid crystal device to which this invention is applied is shown in FIG. 16. In FIG. 16, reference number 1 denotes an upper polarizing plate, reference numbers 2a to 2f denote retardation films, reference number 3 denotes a liquid crystal cell, reference number 4 denotes a lower polarizing plate, and reference number 5 denotes a reflective plate. The configuration of the liquid crystal cell 3 is the same as that of FIG. 1.

Figure 17B:
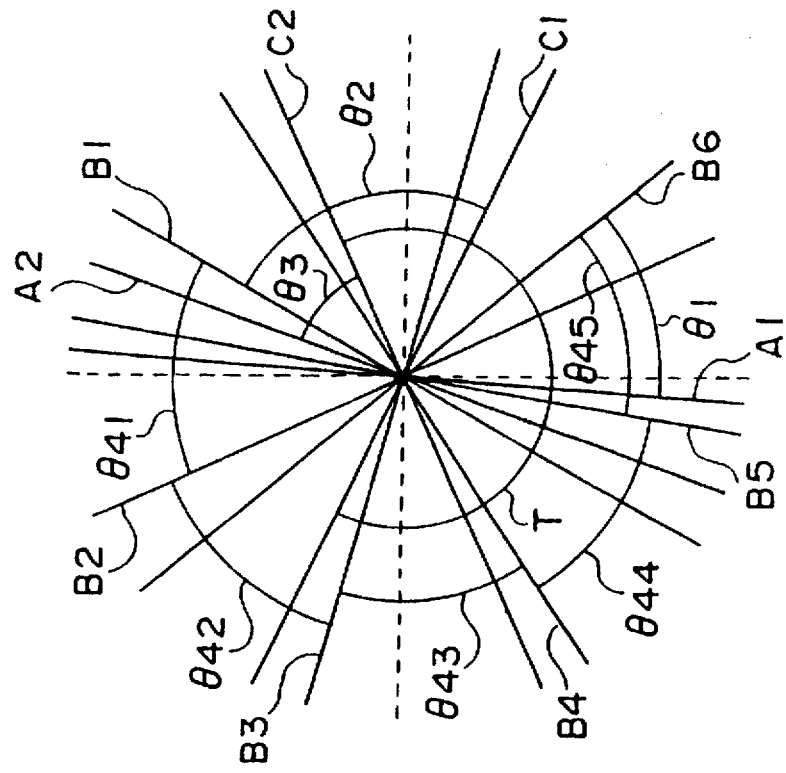
FIG. 17B shows another example of the mutual relationships between these directions.
Figure 17A:
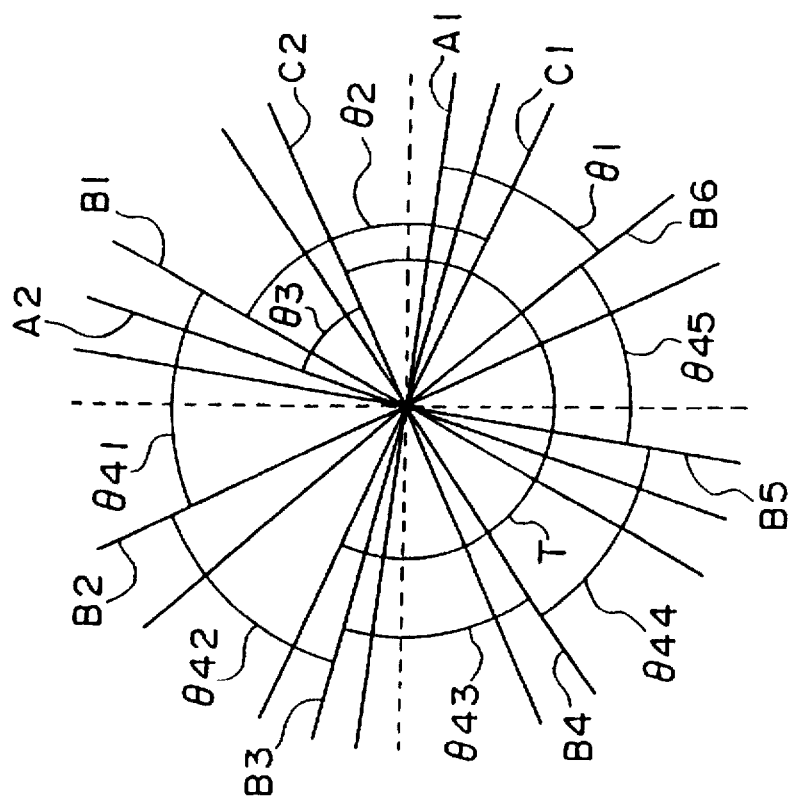
FIG. 17A shows an example of the mutual relationships between the directions of the absorption axes (polarization axes) of the polarizing plates, the direction of the slow axis of the retardation film, and the directions of alignment of the nematic liquid crystal in the liquid crystal device of FIG. 16.

The mutual relationships between the directions of the absorption axes (or polarization axes) of the polarizing plates 1 and 4 of FIG. 16, the directions of the slow axes of the retardation films 2a to 2f, and the directions of rubbing of the upper and lower planes are shown in FIGS. 17A and 17B. FIGS. 17A and 17B are differentiated by the direction of the absorption axis (or polarization axis) of the upper polarizing plate 1.

In FIGS. 17A and 17B, A1 and A2 are the directions of the absorption axes (or polarization axes) of the upper and lower polarizing plates 1 and 4, B1 to B6 are the directions of the slow axes of the retardation films 2a to 2f, and C1 and C2 are the directions of rubbing of the upper and lower planes. In addition, T is the twist angle of the nematic liquid crystal 10, θ1 is the angle between the direction A1 of the absorption axis (or polarization axis) of the upper polarizing plate 1 and the direction B6 of the slow axis of the retardation film 2f, θ2 is the angle between the direction B1 of the slow axis of the retardation film 2a and the direction of rubbing C1 of the upper plane, θ3 is the angle between the direction of rubbing C2 of the lower plane and the direction A2 of the absorption axis (or polarization axis) of the lower polarizing plate 4, θ41 is the angle between the direction B1 of the slow axis of the retardation film 2a and the direction B2 of the slow axis of the retardation film 2b, and θ42 to θ45 are similarly the angles between the directions of the slow axes of each pair of retardation films 2b and 2c, 2c and 2d, 2d and 2e, and 2e and 2f. θ1 is set to be more than 0° and less than 90°.

Embodiment 4-1

A uniaxially drawn film of PC was used as each of the retardation films 2a to 2f in the configuration of FIGS. 16 and 17A.

The twist angle T of the nematic liquid crystal 10 was set to 240°, the angle θ1 between the direction A1 of the absorption axis (or polarization axis) of the upper polarizing plate 1 and the direction B6 of the slow axis of the retardation film 2f and the angle θ3 between the direction of rubbing C2 of the lower plane and the direction A2 of the absorption axis (or polarization axis) of the lower polarizing plate 4 were both set to 35° to 55°, the angle θ2 between the direction B1 of the slow axis of the retardation film 2a and the direction of rubbing C1 of the upper plane was set to 80° to 100°, and the angles θ41 to θ45 between the directions of the slow axes of the retardation films 2a and 2b, 2b and 2c, 2c and 2d, 2d and 2e, and 2e and 2f were all set to 40°. A liquid crystal cell 3 was used in which the optical anisotropy Δn of the nematic liquid crystal 10 was 0.23 and the thickness d was 7 μm, in other words in which Δn·d was 1.61 μm, and the total sum of the product Δn1·d1 of the optical anisotropy Δn1 and the thickness d1 of the retardation film 2a plus the product Δn2·d2 of the optical anisotropy Δn2 and the thickness d2 of the retardation film 2b plus, in a similar manner, the product Δnj·dj (where j is an integer of 6 or less) of the optical anisotropy Δnj and the thickness dj of each of the retardation films 2c to 2f (hereinafter called the retardation R for Embodiment 4) was 2 μm.

As a result, the color tone at zero voltage was seen to be white or a non-color close thereto and color changes to orange, blue, and green occurred as the voltage increased. The various colors could be perceived over a wider viewing angle than in the configurations of Embodiments 2-1 and 3-1 in which two uniaxially drawn films of PC were used.

Embodiment 4-2

A uniaxially drawn film of PC was used as each of the retardation films 2a to 2f in the configuration of FIGS. 16 and 17B.

The twist angle T of the nematic liquid crystal 10 was set to 240°, the angle θ1 between the direction A1 of the absorption axis (or polarization axis) of the upper polarizing plate 1 and the direction B6 of the slow axis of the retardation film 2f and the angle θ3 between the direction of rubbing C2 of the lower plane and the direction A2 of the absorption axis (or polarization axis) of the lower polarizing plate 4 were both set to 35° to 55°, the angle θ2 between the direction B1 of the slow axis of the retardation film 2a and the direction of rubbing C1 of the upper plane was set to 80° to 100°, and the angles θ41 to θ45 between the directions of the slow axes of the retardation films 2a and 2b, 2b and 2c, 2c and 2d, 2d and 2e, and 2e and 2f were all set to 40°. A liquid crystal cell 3 was used in which the optical anisotropy Δn of the nematic liquid crystal 10 was 0.23 and the thickness d was 7 μm, in other words in which Δn·d was 1.61 μm, and the retardation R of the retardation films 2a to 2f was 1.8 μm. As a result, the color tone at zero voltage was seen to be white or a non-color close thereto and color changes to black, blue, yellow-green, and pink occurred when a voltage was applied. The various colors could be perceived over a wider viewing angle than in the configurations of Embodiments 2-2 and 3-2 in which two uniaxially drawn films of PC were used.

EMBODIMENT 5

This embodiment gives examples of the use of an NZ retardation film of PC as the optically anisotropic substance.

Figure 18:
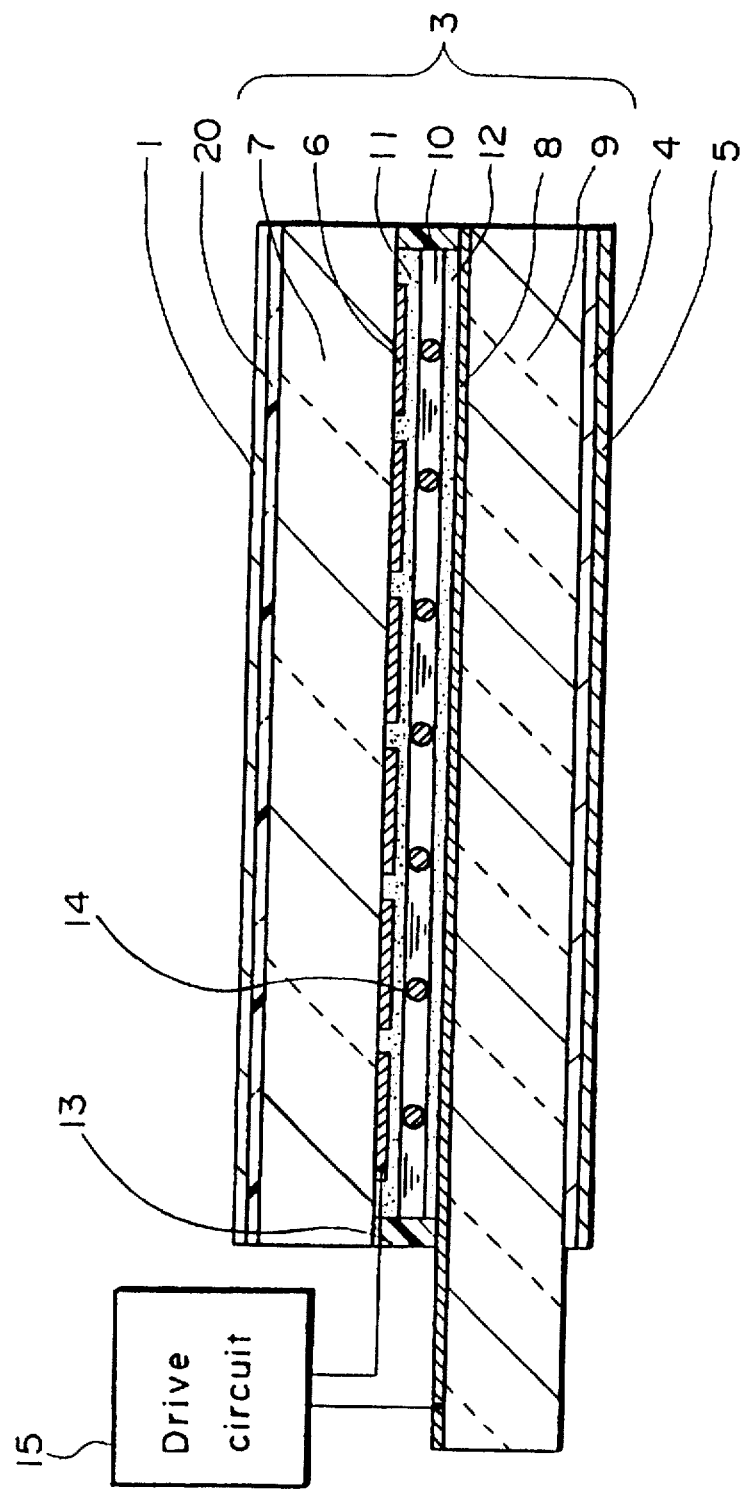
FIG. 18 is a sectional view through another example of the liquid crystal device of this invention.

A sectional view through a fifth reflective type of liquid crystal device to which this invention is applied is shown in FIG. 18. In FIG. 18, reference number 1 denotes an upper polarizing plate, reference number 20 denotes an NZ retardation film, reference number 3 denotes a liquid crystal cell, reference number 4 denotes a lower polarizing plate, and reference number 5 denotes a reflective plate. The configuration of the liquid crystal cell 3 is the same as that of FIG. 1.

An NZ retardation film is a retardation film having different values of ny and nz, where the refractive index thereof in the direction of the maximum refractive index parallel to the film surface is nx, the refractive index thereof in a direction perpendicular to nx and parallel to the film surface is ny, and the refractive index thereof in the film thickness direction is nz. In this case, the value of (nx−nz)/(nx−ny) is defined as the NZ factor.

Figure 19A:
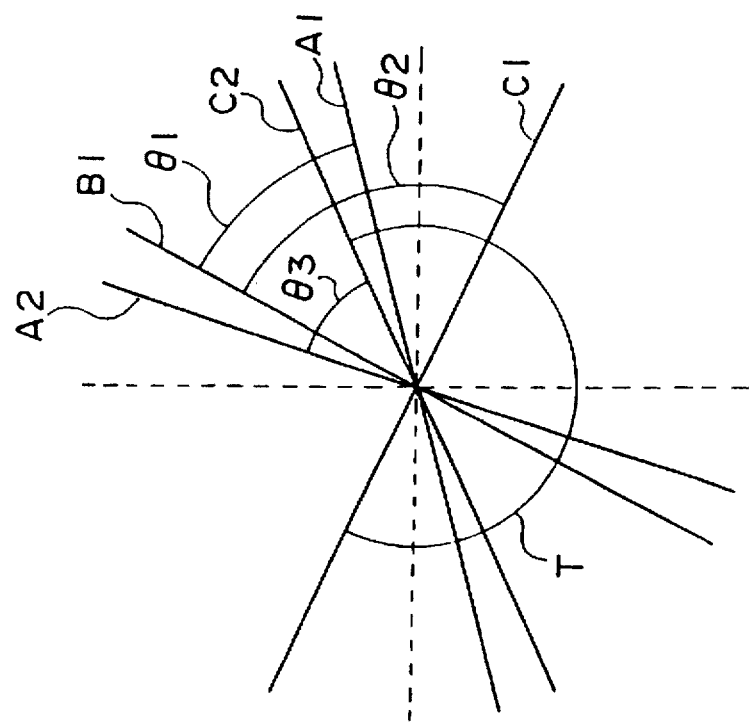
FIG. 19A shows an example of the mutual relationships between the directions of the absorption axes (polarization axes) of the polarizing plates, the direction of the slow axis of the retardation film, and the directions of alignment of the nematic liquid crystal in the liquid crystal device of FIG. 18.
Figure 19B:
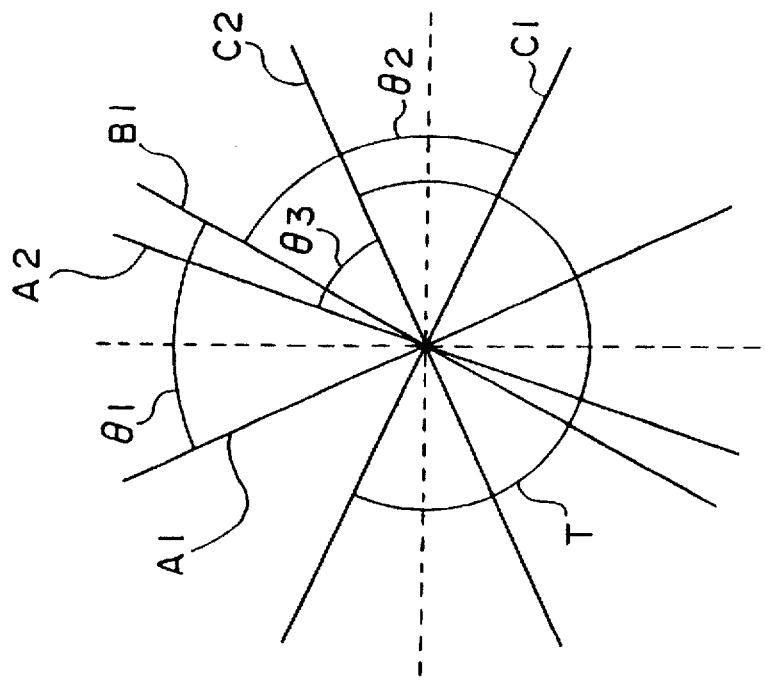
FIG. 19B shows another example of the mutual relationships between these directions.

The mutual relationships between the directions of the absorption axes (or polarization axes) of the polarizing plates 1 and 4 of FIG. 18, the direction of the slow axis of the NZ retardation film 20, and the directions of rubbing of the upper and lower planes are shown in FIGS. 19A and 19B. FIGS. 19A and 19B are differentiated by the direction of the absorption axis (or polarization axis) of the upper polarizing plate 1.

In FIGS. 19A and 19B, A1 and A2 are the directions of the absorption axes (or polarization axes) of the upper and lower polarizing plates 1 and 4, B1 is the direction of the slow axis of the NZ retardation film 20, and C1 and C2 are the directions of rubbing of the upper and lower planes.

In addition, T is the twist angle of the nematic liquid crystal 10, θ1 is the angle between the direction A1 of the absorption axis (or polarization axis) of the upper polarizing plate 1 and the direction B1 of the slow axis of the NZ retardation film 20, θ2 is the angle between the direction B1 of the slow axis of the NZ retardation film 20 and the direction of rubbing C1 of the upper plane, and θ3 is the angle between the direction of rubbing C2 of the lower plane and the direction A2 of the absorption axis (or polarization axis) of the lower polarizing plate 4. θ1 is set to be more than 0° and less than 90°

Embodiment 5-1

NZ retardation films of PC having NZ factors of 0 to 1 were used as the NZ retardation film 20 in the configuration of FIGS. 18 and 19A.

The twist angle T of the nematic liquid crystal 10 was set to 240°, the angle θ1 between the direction A1 of the absorption axis (or polarization axis) of the upper polarizing plate 1 and the direction B1 of the slow axis of the NZ retardation film 20 and the angle θ3 between the direction of rubbing C2 of the lower plane and the direction A2 of the absorption axis (or polarization axis) of the lower polarizing plate 4 were both set to 35° to 55°, and the angle θ2 between the direction B1 of the slow axis of the NZ retardation film 20 and the direction of rubbing C1 of the upper plane was set to 80° to 100°. A liquid crystal cell 3 was used in which the optical anisotropy Δn of the nematic liquid crystal 10 was 0.23 and the thickness d was 7 μm, in other words in which Δn·d was 1.61 μm, the product Δn1·d1 of the optical anisotropy Δn1 and the thickness d1 of the NZ retardation film 20 (hereinafter called the retardation R for Embodiment 5) was 2 μm. As a result, the color tone of the display viewed from the front irrespective of the value of the NZ factor was such that the color tone at zero voltage was seen to be white or a non-color close thereto, and color changes that were exactly the same as those to orange, blue, and green shown in the color chart of FIG. 4 occurred when a voltage was applied.

Figure 20:
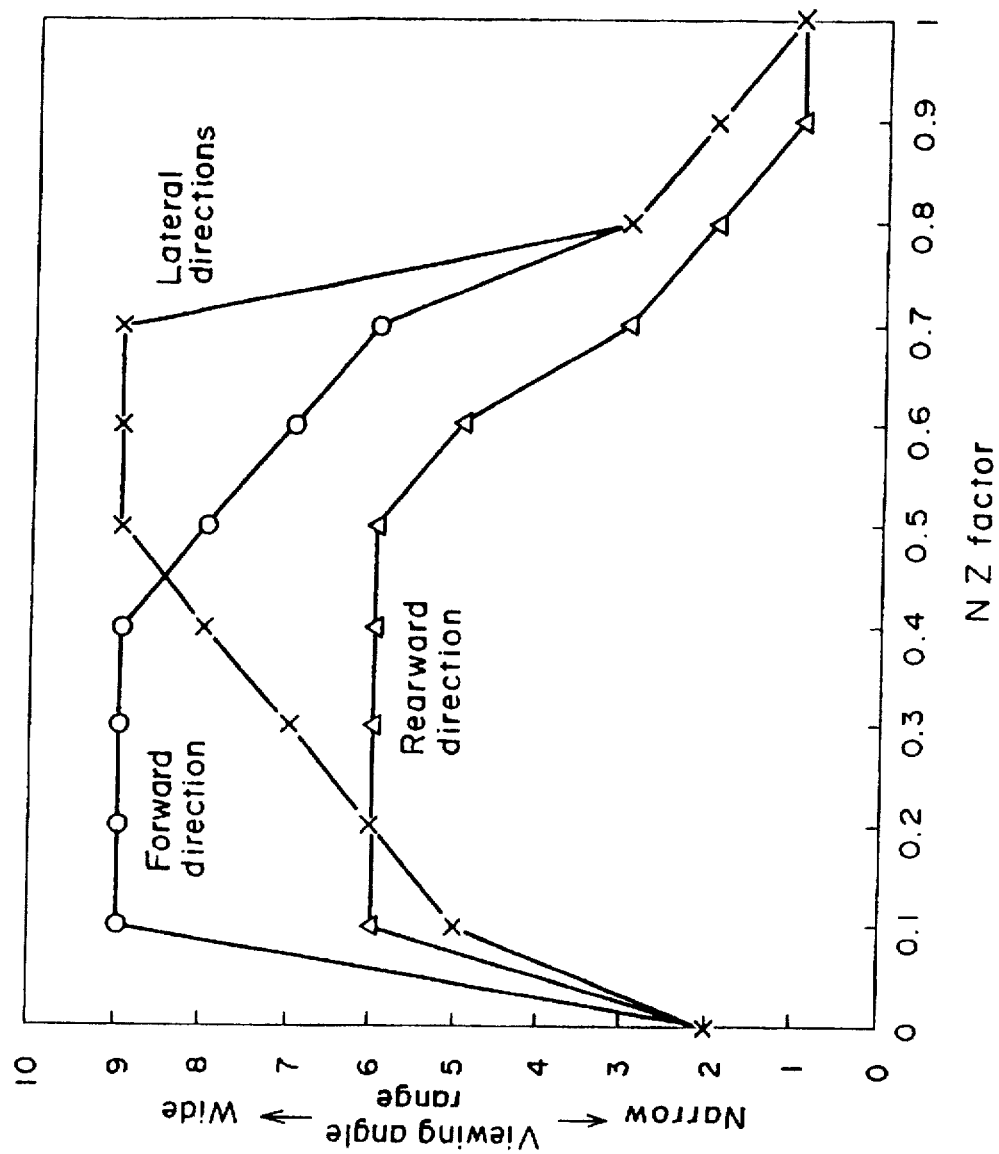
FIG. 20 shows the results of evaluation of the viewing angle characteristics of the liquid crystal device of FIG. 18.

Evaluations were made of the visibility of color tone on a scale of one to ten when NZ retardation films with NZ factors of 0 to 1 were used and the angle of view was shifted through 30° in the forward, rearward, and lateral directions with respect to the front, with the results being as shown in FIG. 20. The various colors could be seen over a wide viewing angle range in the forward and lateral directions when the NZ factor was 0.7 or less, and the various colors could be seen over a wide viewing angle in the rearward direction when the NZ factor was 0.6 or less. In other words, the various colors could be seen over a wide viewing angle when the NZ factor was 0.7 or less, and over an even wider viewing angle when the NZ factor was between 0.1 and 0.6.

Embodiment 5-2

NZ retardation films of PC having NZ factors of 0 to 1 were used as the NZ retardation film 20 in the configuration of FIGS. 18 and 19B.

The twist angle T of the nematic liquid crystal 10 was set to 240°, the angle θ1 between the direction A1 of the absorption axis (or polarization axis) of the upper polarizing plate 1 and the direction B1 of the slow axis of the NZ retardation film 20 and the angle θ3 between the direction of rubbing C2 of the lower plane and the direction A2 of the absorption axis (or polarization axis) of the lower polarizing plate 4 were both set to 35° to 55°, the angle θ2 between the direction B1 of the slow axis of the NZ retardation film 20 and the direction of rubbing C1 of the upper plane was set to 80° to 100°. A liquid crystal cell 3 was used in which the optical anisotropy Δn of the nematic liquid crystal 10 was 0.23 and the thickness d was 7 μm, in other words in which Δn·d was 1.61 μm, and the retardation R of the NZ retardation film 20 was 1.8 μm. As a result, the color tone of the display viewed from the front irrespective of the value of the NZ factor was such that the color tone at zero voltage was seen to be white or a non-color close thereto, and color changes that were exactly the same as those to black, blue, yellow-green, and pink shown in the color chart of the curve (b) of FIG. 6 occurred when a voltage was applied.

When the angle of view was shifted through 30° in the upward, downward, and lateral directions with respect to the front, in a similar manner to that shown in FIG. 20, the various colors could be seen over a wide viewing angle range in the downward and lateral directions when the NZ factor was 0.7 or less, and the various colors could be seen over a wide viewing angle range in the upward direction when the NZ factor was 0.6 or less. In other words, the various colors could be seen over a wide viewing angle range when the NZ factor was 0.7 or less, and over an even wider viewing angle when the NZ factor was between 0.1 and 0.6.

In Embodiment 5, NZ retardation films of PC were used as the NZ retardation film 20 but the invention is not limited thereto; similar results could be obtained by superimposing two or more types of retardation film, such as a uniaxially drawn film of polystyrene with an NZ factor of 0 and a uniaxially drawn film of PC with an NZ factor of 1, to give an average value of NZ factor that lies within the above range.

EMBODIMENT 6

This embodiment gives examples of the use of a twisted retardation film as the optically anisotropic substance.

A sectional view through a sixth reflective type of liquid crystal device to which this invention is applied is shown in FIG. 21. In FIG. 21, reference number 1 denotes an upper polarizing plate, reference number 22 denotes a twisted retardation film, reference number 3 denotes a liquid crystal cell, reference number 4 denotes a lower polarizing plate, and reference number 5 denotes a reflective plate. The configuration of the liquid crystal cell 3 is the same as that of FIG. 1.

A twisted retardation film is a retardation film that is characterized in that the direction of the slow axis thereof is parallel to the film surface and also the twist thereof varies continuously with respect to the film thickness direction.

The mutual relationships between the directions of the absorption axes (or polarization axes) of the polarizing plates 1 and 4 of FIG. 21, the direction of the slow axis of the twisted retardation film 22, and the directions of rubbing of the upper and lower planes are shown in FIGS. 22A and 22B.

FIGS. 22A and 22B are differentiated by the direction of the absorption axis (or polarization axis) of the upper polarizing plate 1. In FIGS. 22A and 22B, A1 and A2 are the directions of the absorption axes (or polarization axes) of the upper and lower polarizing plates 1 and 4, B1 is the direction of the slow axis at the surface of the twisted retardation film 22 in contact with the upper polarizing plate 1, B2 is the direction of the slow axis at the surface of the twisted retardation film 22 in contact with the liquid crystal cell 3, and C1 and C2 are the directions of rubbing of the upper and lower planes.

In addition, T1 is the twist angle of the nematic liquid crystal 10, T2 is the twist angle of the slow axis of the twisted retardation film 22, θ1 is the angle between the direction A1 of the absorption axis (or polarization axis) of the upper polarizing plate 1 and the direction B2 of the slow axis of the twisted retardation film 22, θ2 is the angle between the direction B2 of the slow axis of the twisted retardation film 22 and the direction of rubbing C1 of the upper plane, and θ3 is the angle between the direction of rubbing C2 of the lower plane and the direction A2 of the absorption axis (or polarization axis) of the lower polarizing plate 4. θ1 is set to be more than 0° and less than 90°.

Embodiment 6-1

A twisted retardation film in which the ratio α of the optical anisotropy at a wavelength of 450 nm with respect to the optical anisotropy at a wavelength of 590 nm was 1.09 was used as the twisted retardation film 22 in the configuration of FIGS. 21 and 22A.

The twist angle T1 of the nematic liquid crystal 10 was set to 240°, the angle θ1 between the direction A1 of the absorption axis (or polarization axis) of the upper polarizing plate 1 and the direction B1 of the slow axis of the twisted retardation film 22 and the angle θ3 between the direction of rubbing C2 of the lower plane and the direction A2 of the absorption axis (or polarization axis) of the lower polarizing plate 4 were both set to 35° to 55°, and the angle θ2 between the direction B2 of the slow axis of the twisted retardation film 22 and the direction of rubbing C1 of the upper plane was set to 80° to 100°. A liquid crystal cell 3 was used in which the optical anisotropy Δn of the nematic liquid crystal 10 was 0.23 and the thickness d was 7 μm, in other words in which Δn·d was 1.61 μm, and the product Δn1·d1 of the optical anisotropy Δn1 and the thickness d1 of the twisted retardation film 22 (hereinafter called the retardation R for Embodiment 6) was set to 2 μm. Four values were used for the twist angle T2 of the slow axis of the twisted retardation film 22:120°, 160°, 200°, and 240°. As a result, the color tone at zero voltage in every example was seen to be white or a non-color close thereto and color changes to orange, blue, and green occurred as the voltage increased. A particularly vivid color tone was produced when the twist angle T2 of the slow axis of the twisted retardation film 22 was 240°.

Embodiment 6-2

A twisted retardation film in which the ratio α of the optical anisotropy at a wavelength of 450 nm with respect to the optical anisotropy at a wavelength of 590 nm was 1.17 was used as the twisted retardation film 22 in the configuration of FIGS. 21 and 22A.

The twist angle T1 of the nematic liquid crystal 10 was set to 240°, the angle θ1 between the direction A1 of the absorption axis (or polarization axis) of the upper polarizing plate 1 and the direction B1 of the slow axis of the twisted retardation film 22 and the angle θ3 between the direction of rubbing C2 of the lower plane and the direction A2 of the absorption axis (or polarization axis) of the lower polarizing plate 4 were both set to 35° to 55°, and the angle θ2 between the direction B2 of the slow axis of the twisted retardation film 22 and the direction of rubbing C1 of the upper plane was set to 80° to 100°. A liquid crystal cell 3 was used in which the optical anisotropy Δn of the nematic liquid crystal 10 was 0.23 and the thickness d was 7 μm, in other words in which Δn·d was 1.61 μm, and the retardation R of the twisted retardation film 22 was 1.8 μm.

Four values were used for the twist angle T2 of the slow axis of the twisted retardation film 22:120°, 160°, 200°, and 240°. As a result, the color tone at zero voltage in every example was seen to be white or a non-color close thereto and color changes to orange, blue, and green occurred as the voltage increased. A particularly vivid color tone was produced when the twist angle T2 of the slow axis of the twisted retardation film 22 was 240°.

Embodiment 6-3

A twisted retardation film in which the ratio α of the optical anisotropy at a wavelength of 450 nm with respect to the optical anisotropy at a wavelength of 590 nm was 1.09 was used as the twisted retardation film 22 in the configuration of the configuration of FIGS. 21 and 22B. In addition, the twist angle T1 of the nematic liquid crystal 10 was set to 240°, the angle θ1 between the direction A1 of the absorption axis (or polarization axis) of the upper polarizing plate 1 and the direction B1 of the slow axis of the twisted retardation film 22 and the angle θ3 between the direction of rubbing C2 of the lower plane and the direction A2 of the absorption axis (or polarization axis) of the lower polarizing plate 4 were both set to 35° to 55°, the angle θ2 between the direction B2 of the slow axis of the twisted retardation film 22 and the direction of rubbing C1 of the upper plane was set to 80° to 100°. A liquid crystal cell 3 was used in which the optical anisotropy Δn of the nematic liquid crystal 10 was 0.23 and the thickness d was 7 μm, in other words in which Δn·d was 1.61 μm, and the retardation R of the twisted retardation film 22 was 1.8 μm. Four values were used for the twist angle T2 of the slow axis of the twisted retardation film 22:120°, 160°, 200°, and 240°. As a result, the color tone at zero voltage in every example was seen to be white or a non-color close thereto and color changes to black, blue, yellow-green, and pink occurred when a voltage was applied. A particularly vivid color tone was produced when the twist angle T2 of the slow axis of the twisted retardation film 22 was 240°.

Embodiment 6-4

A twisted retardation film in which the ratio α of the optical anisotropy at a wavelength of 450 nm with respect to the optical anisotropy at a wavelength of 590 nm was 1.17 was used in place of the retardation film 2 in the configuration of FIGS. 1 and 19B.

The twist angle T1 of the nematic liquid crystal 10 was set to 240°, the angle θ1 between the direction A1 of the absorption axis (or polarization axis) of the upper polarizing plate 1 and the direction B1 of the slow axis of the twisted retardation film and the angle θ3 between the direction of rubbing C2 of the lower plane and the direction A2 of the absorption axis (or polarization axis) of the lower polarizing plate 4 were both set to 35° to 55°, the angle θ2 between the direction B1 of the slow axis of the twisted retardation film and the direction of rubbing C1 of the upper plane was set to 80° to 100°. A liquid crystal cell 3 was used in which the optical anisotropy Δn of the nematic liquid crystal 10 was 0.23 and the thickness d was 7 μm, in other words in which Δn·d was 1.61 μm, and the retardation R of the twisted retardation film was 1.6 μm. Four values were used for the twist angle T2 of the slow axis of the twisted retardation film:120°, 160°, 200°, and 240°. As a result, the color tone at zero voltage in every example was seen to be white or a non-color close thereto and color changes to black, blue, yellow-green, and pink occurred when a voltage was applied. A particularly vivid color tone was produced when the twist angle T2 of the slow axis of the twisted retardation film was 240°.

The nematic liquid crystal 10 used in Embodiment 6 had an optical anisotropy Δn of 0.23 and the ratio α of its optical anisotropy at a wavelength of 450 nm with respect to its optical anisotropy at a wavelength of 590 nm was 1.17.

Embodiment 6-4 was a specific example in which the ratio α of the optical anisotropy of the nematic liquid crystal 10 at a wavelength of 450 nm with respect to the optical anisotropy thereof at a wavelength of 590 nm was substantially the same as the ratio α of the optical anisotropy of the twisted retardation film at a wavelength of 450 nm with respect to the optical anisotropy thereof at a wavelength of 590 nm; in that case, when the twist angle T1 of the nematic liquid crystal 10 and the twist angle T2 of the twisted retardation film had substantially the same degrees but were twisted inversely and the product Δn·d of the optical anisotropy Δn and the thickness d of the nematic liquid crystal 10 and the retardation R of the twisted retardation film were substantially the same, the color tone at zero voltage was seen to be white or a non-color close thereto and color changes to black, blue, yellow-green, and pink occurred when a voltage was applied.

In addition, although only a twisted retardation film was disposed between the upper polarizing plate 1 and the liquid crystal cell 3 in Embodiment 6, this invention is not limited to this configuration and thus a combination of a twisted retardation film and a uniaxially drawn retardation film could be disposed therebetween instead.

EMBODIMENT 7

This embodiment gives examples of the use of a second liquid crystal cell as the optically anisotropic substance.

A sectional view through a seventh reflective type of liquid crystal device to which this invention is applied is shown in FIG. 23. In FIG. 23, reference number 1 denotes an upper polarizing plate, reference number 26 denotes a second liquid crystal cell, reference number 3 denotes a liquid crystal cell, reference number 4 denotes a lower polarizing plate, and reference number 5 denotes a reflective plate. The configuration of each of the liquid crystal cell 3 and the second liquid crystal cell 26 is the same as that of the liquid crystal cell 3 of FIG. 1. Note, however, that there the second liquid crystal cell 26 does not have the upper and lower electrodes 6 and 8.

Figure 24A:
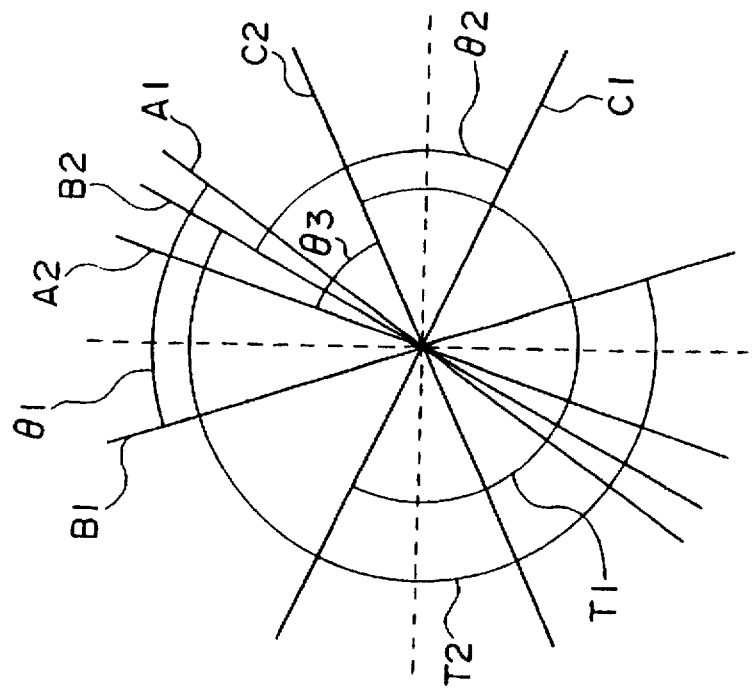
FIG. 24A shows an example of the mutual relationships between the directions of the absorption axes (polarization axes) of the polarizing plates and the directions of alignment of the nematic liquid crystal in the liquid crystal device of FIG. 23.
Figure 24B:
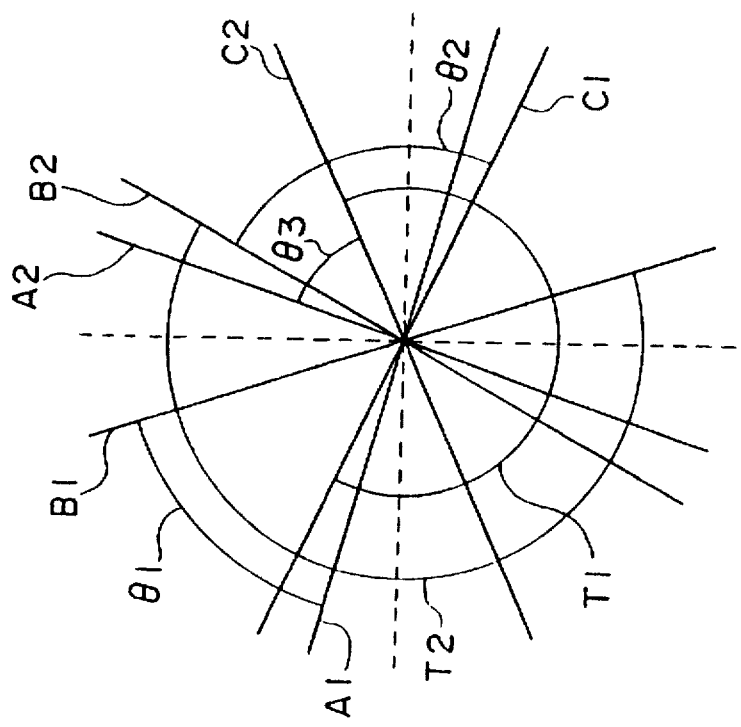
FIG. 24B shows another example of the mutual relationships between these directions.

The mutual relationships between the directions of the absorption axes (or polarization axes) of the polarizing plates 1 and 4 of FIG. 23, the directions of rubbing of the upper and lower planes of the second liquid crystal cell 26, and the directions of rubbing of the upper and lower planes of the liquid crystal cell 3 are shown in FIGS. 24A and 24B.

In FIGS. 24A and 24B, A1 and A2 are the directions of the absorption axes (or polarization axes) of the upper and lower polarizing plates 1 and 4 of FIG. 23, B1 and B2 are the directions of rubbing of the upper and lower planes of the second liquid crystal cell 26, and C1 and C2 are the directions of rubbing of the upper and lower planes of the liquid crystal cell 3. In addition, T1 is the twist angle of the nematic liquid crystal 10 filling the liquid crystal cell 3, T2 is the twist angle of the nematic liquid crystal 10 filling the second liquid crystal cell 26, θ1 is the angle between the direction A1 of the absorption axis (or polarization axis) of the upper polarizing plate 1 and the direction of rubbing B1 of the upper plane of the second liquid crystal cell 26, θ2 is the angle between the direction of rubbing B2 of the lower plane of the second liquid crystal cell 26 and the direction of rubbing C1 of the upper plane of the liquid crystal cell 3, and θ3 is the angle between the direction of rubbing C2 of the lower plane of the liquid crystal cell 3 and the direction A2 of the absorption axis (or polarization axis) of the lower polarizing plate 4. θ1 is set to be more than 0° and less than 90°.

Embodiment 7-1

With the configuration of FIGS. 23 and 24 A, the twist angle T1 of the nematic liquid crystal 10 filling the liquid crystal cell 3 was set to 240° and the twist angle T2 of the nematic liquid crystal 10 filling the second liquid crystal cell 26 was set to 0°.

In other words, this was a homogeneous alignment. The angle θ1 between the direction A1 of the absorption axis (or polarization axis) of the upper polarizing plate 1 and the direction of rubbing B1 of the upper plane of the second liquid crystal cell 26 and the angle θ3 between the direction of rubbing C2 of the lower plane of the liquid crystal cell 3 and the direction A2 of the absorption axis (or polarization axis) of the lower polarizing plate 4 were both set to 35° to 55°, and the angle θ2 between the direction of rubbing B2 of the lower plane of the second liquid crystal cell 26 and the direction of rubbing C1 of the upper plane of the liquid crystal cell 3 was set to 80° to 100°. The optical anisotropy Δn of the nematic liquid crystal 10 filling the liquid crystal cell 3 was 0.23 and the thickness d thereof was 7 μm, in other words Δn·d was 1.61 μm, and the optical anisotropy Δn of the nematic liquid crystal 10 filling the liquid crystal cell 26 was 0.13 and the thickness d thereof was 15 μm, in other words Δn·d was 1.95 μm. As a result, the color tone at zero voltage was seen to be white or a non-color close thereto and color changes to orange, blue, and green occurred when a voltage was applied.

Embodiment 7-2

With the configuration of FIGS. 23 and 24B, the twist angle T1 of the nematic liquid crystal 10 filling the liquid crystal cell 3 was set to 240° and the twist angle T2 of the nematic liquid crystal 10 filling the second liquid crystal cell 26 was also set to 240°. The angle θ1 between the direction A1 of the absorption axis (or polarization axis) of the upper polarizing plate 1 and the direction of rubbing B1 of the upper plane of the second liquid crystal cell 26 and the angle θ3 between the direction of rubbing C2 of the lower plane of the liquid crystal cell 3 and the direction A2 of the absorption axis (or polarization axis) of the lower polarizing plate 4 were both set to 35° to 55°, and the angle θ2 between the direction of rubbing B2 of the lower plane of the second liquid crystal cell 26 and the direction of rubbing C1 of the upper plane of the liquid crystal cell 3 was set to 80° to 100°. The optical anisotropy Δn of the nematic liquid crystal 10 filling the liquid crystal cell 3 was 0.23 and the thickness d thereof was 7 μm, in other words Δn·d was 1.61 μm, and the optical anisotropy Δn of the nematic liquid crystal 10 filling the liquid crystal cell 26 was 0.23 and the thickness d thereof was 7 μm, in other words Δn·d was 1.61 μm.

As a result, the color tone at zero voltage was seen to be white or a non-color close thereto and color changes to black, blue, yellow-green, and pink occurred when a voltage was applied.

In Embodiment 7, the ratio of the nematic-isotropic phase transition temperature of the nematic liquid crystal 10 filling the second liquid crystal cell 26 with respect to the nematic-isotropic phase transition temperature of the nematic liquid crystal 10 filling the first liquid crystal cell 3 is within the range of 0.8 to 1.2. In addition, these nematic-isotropic phase transition temperature were both at least 80° C. In these examples, a liquid crystal device was obtained in which the color tone at zero voltage was seen to be white or a non-color close thereto within at least the range of −20° to 70°, and there was hardly any change in external color with changes in temperature. Instead of using a second liquid crystal cell, it is clear that similar results could be obtained by using a retardation film with a retardation that has substantially the same temperature dependency of the retardation R as that of a liquid crystal cell, such as a retardation film in which liquid crystal polymers are aligned horizontally or twisted.

With this invention, when the means capable of selecting at least three values of voltage to be applied between the pair of electrode substrates is further defined as a time division drive circuit that is capable of applying at least one other drive voltage between a selected voltage and a non-selected voltage, in addition to the selected voltage and the non-selected voltage, it has been shown that the color tone at zero voltage is white or a non-color close thereto and at least two colors are displayed when a voltage is applied, provided that the liquid crystal cell satisfies the following relationship:

$$\Delta n \cdot d \geqq \frac{0.8 \times (\beta - 1)}{(P - 1)} + 0.6 (\mu m) \qquad (3)$$

This is proved below with the aid of embodiments.

EMBODIMENT 8

This embodiment gives examples of the use of a time division drive circuit as the drive circuit.

Embodiment 8-1

A time division drive circuit was used as the drive circuit 15 in the configuration of FIGS. 1 and 3A, and the relationships between the product $\Delta n \cdot d$ of the optical anisotropy $\Delta n$ and the thickness d of the nematic liquid crystal 10, the ratio P of the off-voltage to the on-voltage, and the steepness ratio $\beta$ of the liquid crystal cell 3 were investigated.

The steepness ratio $\beta$ of the liquid crystal cell 3 is the ratio of the voltage at which the capacitance of the liquid crystal cell 3 is 0.3 to that voltage at which it is 0.1, when the capacitance of the liquid crystal cell 3 is 0 for a voltage of 0.5 V applied between the upper and lower electrodes 6 and 8 and that capacitance is 1 for a voltage of 25 V.

In addition, the ratio P of the off-voltage to the on-voltage is expressed as follows, when the duty ratio is 1/N and the bias ratio is 1/B:

$$P = \sqrt{\frac{B^2 + N - 1}{(B - 2)^2 + N - 1}} \qquad (4)$$

Therefore, if the drive is at the optimal bias at duty ratios of 1/64, 1/120, 1/240, 1/480, the corresponding values of the ratio P of the off-voltage to the on-voltage are 1.13, 1.1, 1.07, 1.05.

A uniaxially drawn film of PC was used as the retardation film 2 in the above described configuration. The twist angle T of the nematic liquid crystal 10 was set to 240°, both the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were set to 35° to 55°, and the angle θ2 between the direction B1 of the slow axis of the retardation film 2 and the direction of rubbing C1 of the upper plane was set to 80° to 100°. In addition, combinations of the product $\Delta n \cdot d$ of the optical anisotropy $\Delta n$ and the thickness d of the nematic liquid crystal 10, the retardation R of the retardation film 2, the steepness ratio $\beta$ of the liquid crystal cell 3 were used as shown in Table 7, and the change of color produced when a voltage was applied was measured with a spectrophotometer. The results are shown in FIG. 26.

TABLE 7

| No. | $\Delta n$ | d (µm) | $\Delta n \cdot d$ (µm) | R (µm) | β |
|---|---|---|---|---|---|
| 1 | 0.20 | 6.0 | 1.20 | 1.55 | 1.06 |
| 2 | 0.20 | 6.0 | 1.20 | 1.55 | 1.08 |
| 3 | 0.20 | 6.0 | 1.20 | 1.55 | 1.10 |
| 4 | 0.20 | 6.0 | 1.20 | 1.55 | 1.12 |
| 5 | 0.23 | 6.0 | 1.38 | 1.75 | 1.06 |
| 6 | 0.23 | 6.0 | 1.38 | 1.75 | 1.08 |
| 7 | 0.23 | 6.0 | 1.38 | 1.75 | 1.10 |
| 8 | 0.23 | 6.0 | 1.38 | 1.75 | 1.12 |

TABLE 7-continued

| No. | $\Delta n$ | d (µm) | $\Delta n \cdot d$ (µm) | R (µm) | β |
|---|---|---|---|---|---|
| 9 | 0.23 | 7.0 | 1.61 | 2.00 | 1.06 |
| 10 | 0.23 | 7.0 | 1.61 | 2.00 | 1.08 |
| 11 | 0.23 | 7.0 | 1.61 | 2.00 | 1.10 |
| 12 | 0.23 | 7.0 | 1.61 | 2.00 | 1.12 |
| 13 | 0.26 | 7.0 | 1.82 | 2.15 | 1.06 |
| 14 | 0.26 | 7.0 | 1.82 | 2.15 | 1.08 |
| 15 | 0.26 | 7.0 | 1.82 | 2.15 | 1.10 |
| 16 | 0.26 | 7.0 | 1.82 | 2.15 | 1.12 |

In FIG. 26, triangles represent samples that exhibited color changes from white or a non-color close thereto, to orange, blue, and green while the voltage varied from the off-voltage to the on-voltage when the ratio P of the off-voltage to the on-voltage was 1.13 (when the duty ratio was set to 1/64 and the bias ratio to 1/9), and crosses represent samples that changed color imperfectly.

In addition, hollow circles represent samples that exhibited color changes from white or a non-color close thereto, to orange, blue, and green while the voltage varied from the off-voltage to the on-voltage when the ratio P of the off-voltage to the on-voltage was 1.1 (when the duty ratio was set to 1/120 and the bias ratio to 1/12), and squares represent samples that exhibited color changes from white or a non-color close thereto, to orange, blue, and green while the voltage varied from the off-voltage to the on-voltage even though the ratio P of the off-voltage to the on-voltage was 1.07 (when the duty ratio was set to 1/240 and the bias ratio to 1/17). Furthermore, solid circles represent samples that exhibited color changes from white or a non-color close thereto, to orange, blue, and green while the voltage varied from the off-voltage to the on-voltage even though the ratio P of the off-voltage to the on-voltage was 1.05 (when the duty ratio was set to 1/480 and the bias ratio to 1/23).

The above results show that the color tone at zero voltage is white or a non-color close thereto and color changes to the three colors of orange, blue, and green occur when a voltage is applied, provided that the relationships between the product $\Delta n \cdot d$ of the optical anisotropy $\Delta n$ and the thickness d of the nematic liquid crystal 10, the ratio P of the off-voltage to the on-voltage, and the steepness ratio $\beta$ of the liquid crystal cell 3 satisfy the following relationship:

$$\Delta n \cdot d \geqq \frac{0.8 \times (\beta - 1)}{(P - 1)} + 0.6 (\mu m) \qquad (3)$$

It is necessary to satisfy the relationship above in order to implement the color changes from white through to green.

Figure 27:
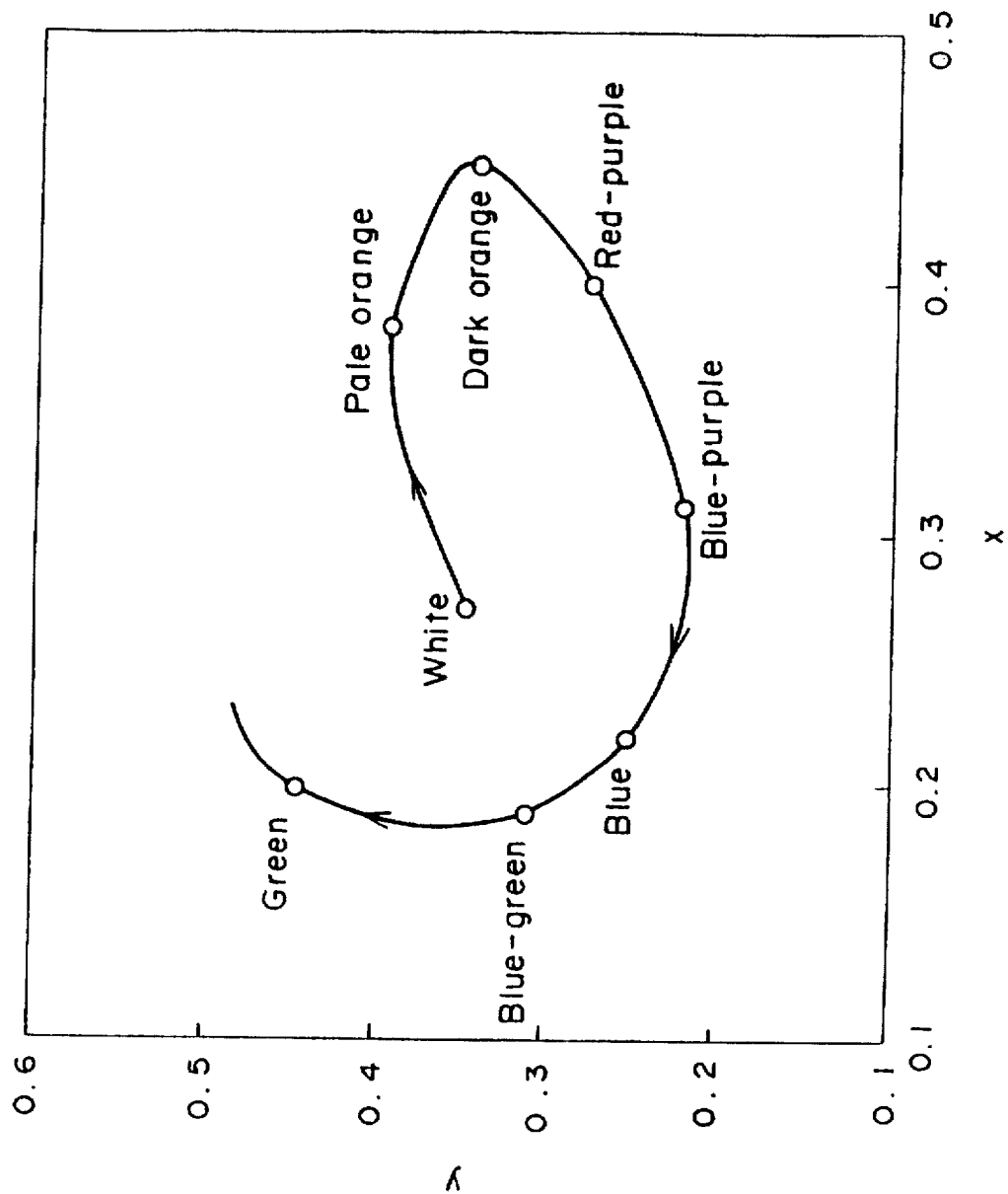
FIG. 27 is a CIE chromaticity diagram of the colors exhibited when a liquid crystal device that satisfies the relationships within the suitable range shown in FIG. 4 is driven in eight steps.

A time division drive circuit was used to provide a pulse width modulation drive in eight steps with the duty ratio set to 1/240 and the bias ratio set to 1/1.7 for a liquid crystal cell 3 in which the optical anisotropy $\Delta n$ of the nematic liquid crystal 10 was 0.23 and the thickness d was 7 µm, in other words in which $\Delta n \cdot d$ was 1.61 µm, the retardation R of the retardation film 2 was 2 µm, and the steepness ratio $\beta$ of the liquid crystal cell 3 was 1.08, and the colors obtained at each of these steps were as shown in FIG. 27. The colors white, pale orange, dark orange, red-purple, blue-purple, blue, blue-green, and green were displayed at each of these steps.

It should be noted, however, that the effective voltage at each of the steps when this stepped pulse drive was performed is given by:

$$V_{L/F} = V_{OP} \times \qquad (5)$$

$$\sqrt{\frac{L \times (B^2 + N - 1) + (F - 1 - L) \times ((B - 2)^2 + N - 1)}{B^2 \times N \times (F - 1)}} \quad (V)$$

In this case, $V_{L/F}$ is the effective voltage in an F-step drive (where F is a positive integer) at an Lth level (where L is an integer from 0 to F−1), $V_{O/F}$ is the off-voltage, and $V_{(F-1)/F}$ is the on-voltage. In addition, VOP is the drive voltage when the duty ratio is 1/N and the bias ratio is 1/B. The effective voltage at each step of a frame rate control drive is expressed by the same equation and similar results can be obtained thereby. Similar results can equally well be obtained by the use of a combination of a pulse width modulation drive and a frame rate control drive.

Embodiment 8-2

A time division drive circuit was used as the drive circuit 15 in the configuration of FIGS. 1 and 3B, and the relationships between the product Δn·d of the optical anisotropy Δn and the thickness d of the nematic liquid crystal 10, the ratio P of the off-voltage to the on-voltage, and the steepness ratio β of the liquid crystal cell 3 were investigated.

A uniaxially drawn film of PC was used as the retardation film 2 in the above described configuration. The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were both set to 35° to 55°, and the angle θ2 between the direction B1 of the slow axis of the retardation film 2 and the direction of rubbing C1 of the upper plane was set to 80° to 100°. In addition, combinations of the product Δn·d of the optical anisotropy Δn and the thickness d of the nematic liquid crystal 10, the retardation R of the retardation film 2, the steepness ratio β of the liquid crystal cell 3 were used as shown in Table 8, and the change of color produced when a voltage was applied was measured with a spectrophotometer. The results are shown in FIG. 28.

TABLE 8

| No. | Δn | d (μm) | Δn · d (μm) | R (μm) | β |
|-----|------|--------|-------------|--------|------|
| 1   | 0.23 | 7.0    | 1.61        | 1.80   | 1.06 |
| 2   | 0.23 | 7.0    | 1.61        | 1.80   | 1.08 |
| 3   | 0.23 | 7.0    | 1.61        | 1.80   | 1.10 |
| 4   | 0.23 | 7.0    | 1.61        | 1.80   | 1.12 |
| 5   | 0.25 | 8.0    | 2.00        | 2.15   | 1.06 |
| 6   | 0.25 | 8.0    | 2.00        | 2.15   | 1.08 |
| 7   | 0.25 | 8.0    | 2.00        | 2.15   | 1.10 |
| 8   | 0.25 | 8.0    | 2.00        | 2.15   | 1.12 |
| 9   | 0.24 | 10.0   | 2.40        | 2.55   | 1.06 |
| 10  | 0.24 | 10.0   | 2.40        | 2.55   | 1.08 |
| 11  | 0.24 | 10.0   | 2.40        | 2.55   | 1.10 |
| 12  | 0.24 | 10.0   | 2.40        | 2.55   | 1.12 |
| 13  | 0.24 | 11.7   | 2.81        | 3.00   | 1.06 |
| 14  | 0.24 | 11.7   | 2.81        | 3.00   | 1.08 |
| 15  | 0.24 | 11.7   | 2.81        | 3.00   | 1.10 |
| 16  | 0.24 | 11.7   | 2.81        | 3.00   | 1.12 |

Figure 28:
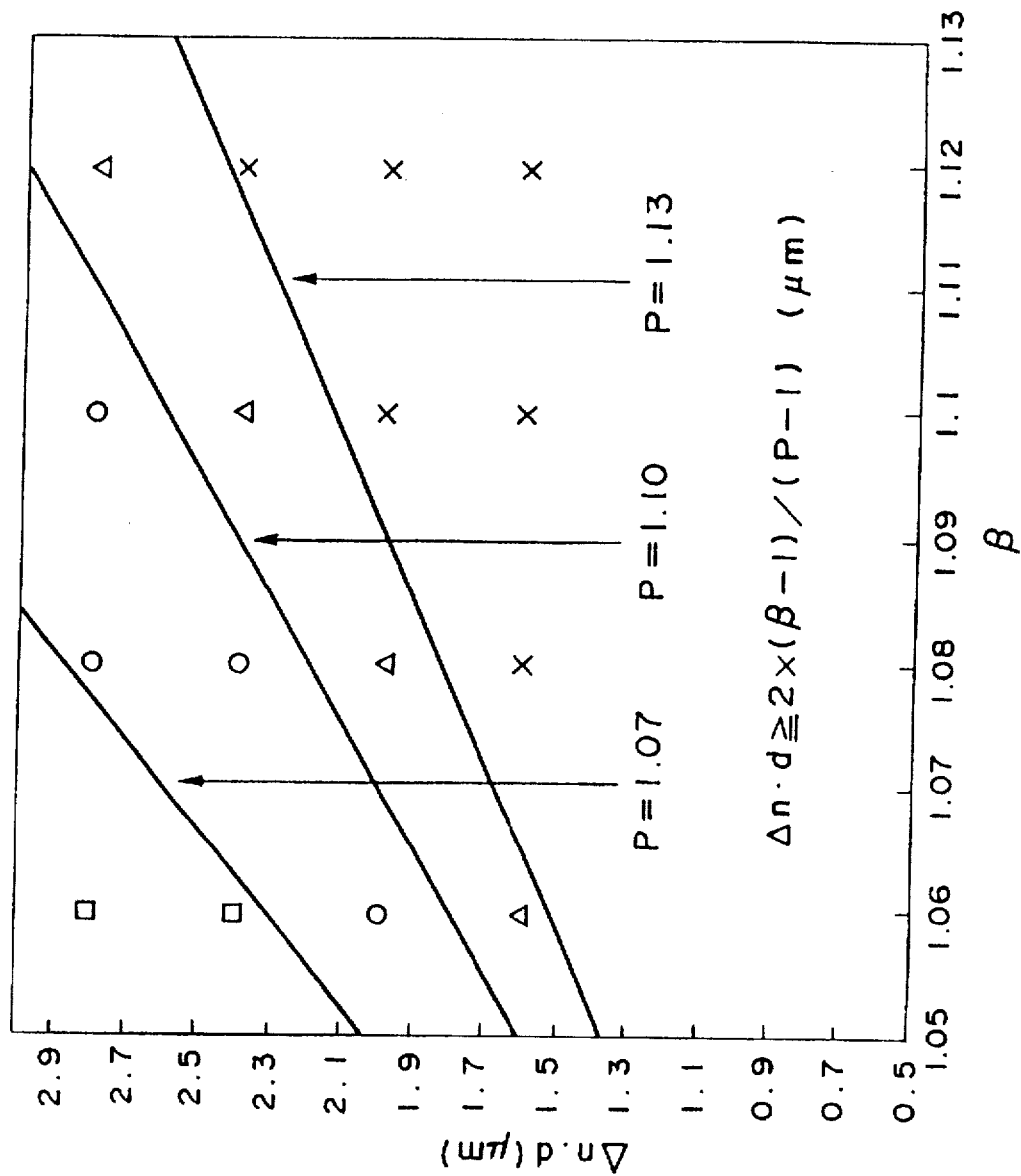
FIG. 28 shows the relationships between Δn·d of the liquid crystal cell, the retardation R of the retardation film, and the steepness ratio β of the nematic liquid crystal in a liquid crystal device that satisfies the relationships within the suitable range shown in FIG. 6.

In FIG. 28, triangles represent samples that exhibited color changes from white or a non-color close thereto, to black, blue, yellow-green, and pink while the voltage varied from the off-voltage to the on-voltage when the ratio P of the off-voltage to the on-voltage was 1.13 (when the duty ratio was set to 1/64 and the bias ratio to 1/9), and crosses represent samples that changed color imperfectly. In addition, hollow circles represent samples that exhibited color changes from white or a non-color close thereto, to black, blue, yellow-green, and pink while the voltage varied from the off-voltage to the on-voltage when the ratio P of the off-voltage to the on-voltage was 1.1 (when the duty ratio was set to 1/120 and the bias ratio to 1/12), and squares represent samples that exhibited color changes from white or a non-color close thereto, to black, blue, yellow-green, and pink while the voltage varied from the off-voltage to the on-voltage even though the ratio P of the off-voltage to the on-voltage was 1.07 (when the duty ratio was set to 1/240 and the bias ratio to 1/17).

The above results show that the color tone at zero voltage is white or a non-color close thereto and four color changes to black, blue, yellow-green, and pink occur when a voltage is applied, provided that the product Δn·d of the optical anisotropy Δn and the thickness d of the nematic liquid crystal 10, the ratio P of the off-voltage to the on-voltage, and the steepness ratio β of the liquid crystal cell 3 satisfy the following relationship:

$$\Delta n \cdot d \geq \frac{2 \times (\beta - 1)}{(P - 1)} + 0.6 (\mu m) \quad (6)$$

This relationship is more restrictive than the range of Equation (3) above; it is necessary that the relationship of Equation (6) be satisfied to implement the color changes from white through to pink.

Figure 29:
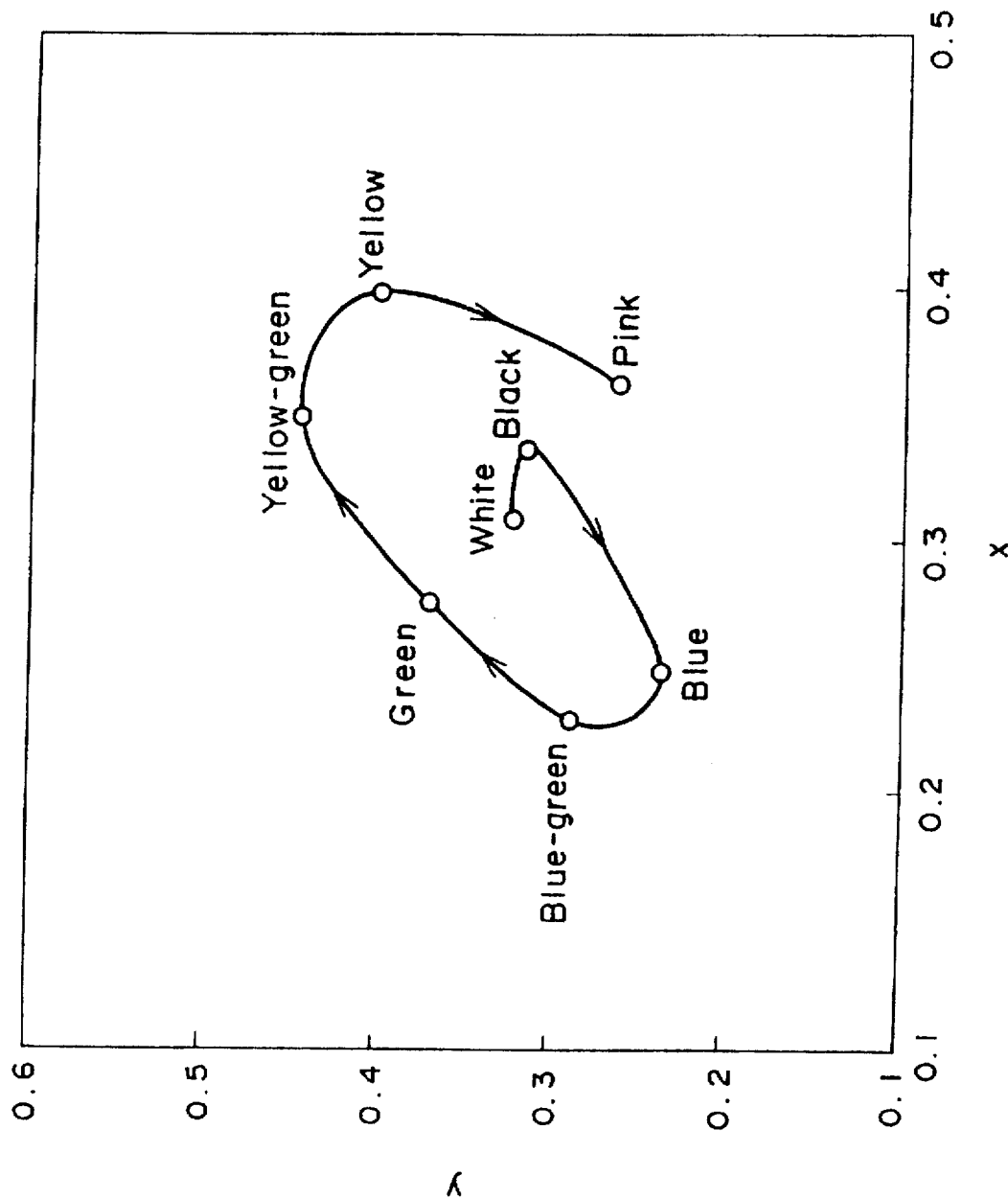
FIG. 29 is a CIE chromaticity diagram of the colors exhibited when a liquid crystal device that satisfies the relationships within the suitable range shown in FIG. 6 is driven in eight steps.

A time division drive circuit was used to provide a pulse width modulation drive in eight steps with the duty ratio set to 1/64 and the bias ratio set to 1/9 for a liquid crystal cell 3 in which the optical anisotropy Δn of the nematic liquid crystal 10 was 0.23 and the thickness d was 7 μm, in other words in which Δn·d was 1.61 μm, the retardation R of the retardation film 2 was 1.8 μm, and the steepness ratio β of the liquid crystal cell 3 was 1.06, and the colors obtained at each of these steps were as shown in FIG. 29. The colors white, black, blue, blue-green, green, yellow-green, yellow, and pink were displayed at each of these steps.

EMBODIMENT 9

This embodiment illustrates the relationships between the absorption axes of the upper and lower polarizing plates, the slow axis of the optically anisotropic substance, and the directions of rubbing of the upper and lower planes.

A uniaxially drawn film of PC was used as the retardation film 2 in the configuration of FIGS. 1 and 3A.

The twist angle T of the nematic liquid crystal 10 was set to 240°, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film was 2 μm. Each of the angle θ1 between the direction A1 of the absorption axis (or polarization axis) of the upper polarizing plate 1 and the direction B1 of the slow axis of the retardation film 2, the angle θ2 between the direction B1 of the slow axis of the retardation film 2 and the direction of rubbing C1 of the upper plane, the angle θ3 between the direction of rubbing C2 of the lower plane and the direction A2 of the absorption axis (polarization axis) of the lower polarizing plate 4 were varied.

As a result, it was found that the various colors were displayed clearly within a preferable range in which the angle θ1 between the direction A1 of the absorption axis (or polarization axis) of the upper polarizing plate 1 and the direction B1 of the slow axis of the retardation film 2 was 15° to 75°, particularly within the range of 20° to 50°, but the color purity dropped dramatically outside this range. In addition, the various colors were displayed clearly within a preferable range in which the angle θ2 between the direction B1 of the slow axis of the retardation film 2 and the direction of rubbing C1 of the upper plane was 60° to 120°, particularly within the range of 75° to 105°, but the color purity dropped dramatically outside this range. Furthermore, the various colors were displayed clearly within a preferable range in which the angle θ3 between the direction of rubbing C2 of the lower plane and the direction A2 of the absorption axis (or polarization axis) of the lower polarizing plate 4 was 15° to 75°, particularly within the range of 30° to 60°, but the color purity dropped dramatically outside this range.

A uniaxially drawn film of PC was also used as the retardation film 2 in the configuration of FIGS. 1 and 3B.

The various colors were displayed clearly within ranges similar to those described above, when the twist angle T of the nematic liquid crystal 10 was set to 240°, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film was 1.8 μm, but the color purity dropped dramatically outside this range.

EMBODIMENT 10

This embodiment gives examples of the analysis of the effects of twist angle on the nematic liquid crystal.

A uniaxially drawn film of PC was used as the retardation film 2 in the configuration of FIGS. 1 and 3A.

A liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 2 μm. Furthermore, the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were both set to 35° to 55°, and the angle θ2 between the direction B1 of the slow axis of the retardation film 2 and the direction of rubbing C1 of the upper plane was set to 80° to 100°. The color changes that appeared when a voltage was applied were substantially similar to those shown in FIG. 4, as the twist angle T of the nematic liquid crystal 10 was varied within the range of 180° to 360° at 20° intervals.

A uniaxially drawn film of PC was also used as the retardation film 2 in the configuration of FIGS. 1 and 3B. In addition, a liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 1.8 μm. Furthermore, the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were both set to 35° to 55°, and the angle θ2 between the direction B1 of the slow axis of the retardation film 2 and the direction of rubbing C1 of the upper plane was set to 80° to 100°.

The color changes that appeared when a voltage was applied were substantially similar to those shown in the curve (a) of FIG. 7, as the twist angle T of the nematic liquid crystal 10 was varied within the range of 180° to 360° at 20° intervals.

Although uniaxially drawn films of PC were used as the retardation film 2 in Embodiments 2 to 4, and Embodiments 8 to 10, the present invention should not be taken as being limited thereto; similar results can be obtained by using retardation films of other materials such as PVA or PSF. Similarly, although the twist angle T of the nematic liquid crystal 10 was set to 240° in Embodiments 1 to 9, similar results can be obtained when it is within the range of 180° to 360°. In addition, although the twist angle T of the nematic liquid crystal 10 was measured counterclockwise from the direction of rubbing C1 of the upper plane to the direction of rubbing C2 of the lower plane in Embodiments 1 to 10, similar results can be obtained with a clockwise twist. In such a case, all of the other angles θ1 to θ6 would be measured in the opposite direction. Furthermore, similar results can be obtained when the product Δn·d of the optical anisotropy Δn and the thickness d of the nematic liquid crystal 10 is greater than 1 μm, provided that the retardation R of the retardation film 2 satisfies the predetermined relationship. Particularly when a time division drive circuit is used as the drive circuit 15, Δn·d is preferably at least 1.3 μm in order to obtain clear color changes, more preferably at least 1.5 μm. In addition, there is an upper limit of approximately 0.3 to the optical anisotropy Δn of the nematic liquid crystal 10 in practice so that it would be necessary to increase the cell thickness d in order to increase Δn·d, but in practice Δn·d is preferably 2 μm or less from consideration of the fact that the response speed of the nematic liquid crystal 10 when the off-voltage has switched to the on-voltage is proportional to the square of the cell thickness d. In practice, the optical anisotropy Δn of the nematic liquid crystal 10 is preferably within the range of 0.15 to 0.29.

EMBODIMENT 11

This embodiment gives an example of the use of a color polarizing plate.

A uniaxially drawn film of PC was used as the retardation film 2 in the configuration of FIGS. 1 and 3B.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were both set to 35° to 55°, and the angle θ2 between the direction B1 of the slow axis of the retardation film 2 and the direction of rubbing C1 of the upper plane was set to 80° to 100°. A liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 1.6 μm.

In this case, when neutral polarizing plates (NPF-F1220DU, made by Nitto Denko) were used as the upper and lower polarizing plates 1 and 4, the color tone at zero voltage was a yellowish white and color changes to black, blue, yellow-green, and pink occurred when a voltage was applied. On the other hand, when blue polarizing plates (B-1824ST, made by Polartechno) were used as the upper and lower polarizing plates 1 and 4, the color tone at zero voltage became whiter and the blue that occurred when a voltage was applied became bluer.

In a similar manner, when red, blue, or green color polarizing plates were used as the upper and lower polarizing plates 1 and 4, the purity of that particular color tone increased and the color tone at zero voltage became closer to white.

EMBODIMENT 12

This embodiment gives an example of varying the thicknesses of the upper and lower substrates.

A uniaxially drawn film of PC was used as the retardation film 2 in the configuration of FIGS. 1 and 3B.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were both set to 35° to 55°, and the angle θ2 between the direction B1 of the slow axis of the retardation film 2 and the direction of rubbing C1 of the upper plane was set to 80° to 100°. A liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 1.8 μm.

In this case, when glass substrates of a thickness of 0.7 mm were used as the upper and lower substrates 7 and 9, the color tone displayed at zero voltage was white and color changes to black, blue, yellow-green, and pink occurred when a voltage was applied; however, when both black of a low reflection luminance and yellow of a high reflection luminance were displayed at the same time, parallax between the colors was large because yellow-green appeared to be displayed at the position of the reflective plate 5 because the depressions in the front surface of the reflective plate become visible, whereas black appeared to be displayed at the position of the upper polarizing plate 1. On the other hand, when glass substrates of a thickness of 0.4 mm were used as the upper and lower substrates 7 and 9, this parallax was less than that with 0.7-mm thick glass substrates. Furthermore, when a flexible film such as plastic film was used, this parallax was virtually indistinguishable.

Each of the liquid crystal devices of the above described Embodiments 1 to 12 can be made to display more colors than the display colors described above, by dividing each pixel into a plurality of parts for driving, and using additive color mixing. Furthermore, each of the liquid crystal devices of Embodiments 1 to 12 may be capable of displaying more colors than those described above, by superimposing two or more liquid crystal devices. In addition, reflective-type liquid crystal devices were used by way of example in the above described Embodiments 1 to 12, but similar results were obtained with transflective-type liquid crystal device and even transmittance-type liquid crystal devices.

In the above description of the embodiments, a time division drive circuit was used as the drive circuit, but an active matrix drive circuit such as thin film transistors (TFTs) or metal insulator metal (MIM) could equally well be used.

EMBODIMENT 13

The electronic equipment of this embodiment is a pager in which the reflective type of liquid crystal device of FIGS. 23 and 24B is installed.

Figure 32:
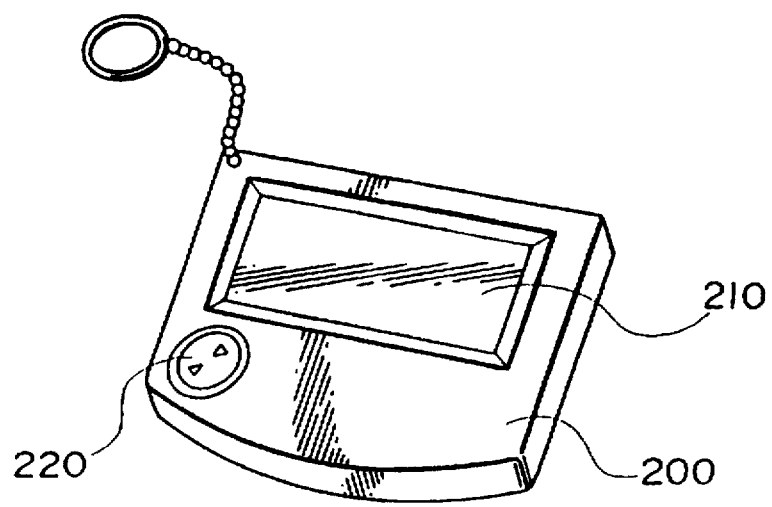
FIG. 32 shows the exterior of an example of the electronic equipment of this invention (a pager) in which a liquid crystal device is installed.

This pager comprises a pager unit 200, a liquid crystal display 210, and a button 220 for switching operating modes, as shown in FIG. 32.

The liquid crystal display 210 is configured to use the liquid crystal device of FIGS. 23 and 24B.

In this embodiment, the twist angle T1 of the nematic liquid crystal 10 filling the liquid crystal cell 3 of FIG. 23 was set to 240° and the twist angle T2 of the nematic liquid crystal 10 filling the second liquid crystal cell 26 was also set to 240°.

In addition, the angle θ1 between the direction A1 of the absorption axis (or polarization axis) of the upper polarizing plate 1 and the direction of rubbing B1 of the upper plane of the second liquid crystal cell 26 and the angle θ3 between the direction of rubbing C2 of the lower plane of the liquid crystal cell 3 and the direction A2 of the absorption axis (or polarization axis) of the lower polarizing plate 4 were both set to 35° to 55°, and the angle θ2 between the direction of rubbing B2 of the lower plane of the second liquid crystal cell 26 and the direction of rubbing C1 of the upper plane of the liquid crystal cell 3 was set to 80° to 100°.

The optical anisotropy Δn of the nematic liquid crystal 10 filling the liquid crystal cell 3 was 0.23 and the thickness d thereof was 7 μm, in other words Δn·d was 1.61 μm, and the optical anisotropy Δn of the nematic liquid crystal 10 filling the liquid crystal cell 26 was 0.23 and the thickness d thereof was 7 μm, in other words Δn·d was 1.61 μm. The same liquid crystal filled both the liquid crystal cell 3 and the second liquid crystal cell 26.

The liquid crystal device installed in this pager was set in such a manner that the color tone of the background color display was white at a tone level 0 (at the off-voltage), the display of ordinary alphanumeric characters was black at a tone level 3, and the display of emphasis or warning messages was yellow-green at a tone level 5 or pink at a tone level 7 (at the on-voltage).

This pager was not only capable of displaying more information at a high reflection luminance and with improved visibility of the color display, the use of a reflective device enabled a sufficiently low power consumption.

In addition, since the same liquid crystal was used as the nematic liquid crystal 10 that filled the liquid crystal cell 3 and the nematic liquid crystal 10 that filled the second liquid crystal cell 26, the ratio of the respective nematic-isotropic phase transition temperatures (clearing point or NI point) was 1 and thus the various colors could be perceived over a temperature range of −20° C. to 70° C.

Figure 33:
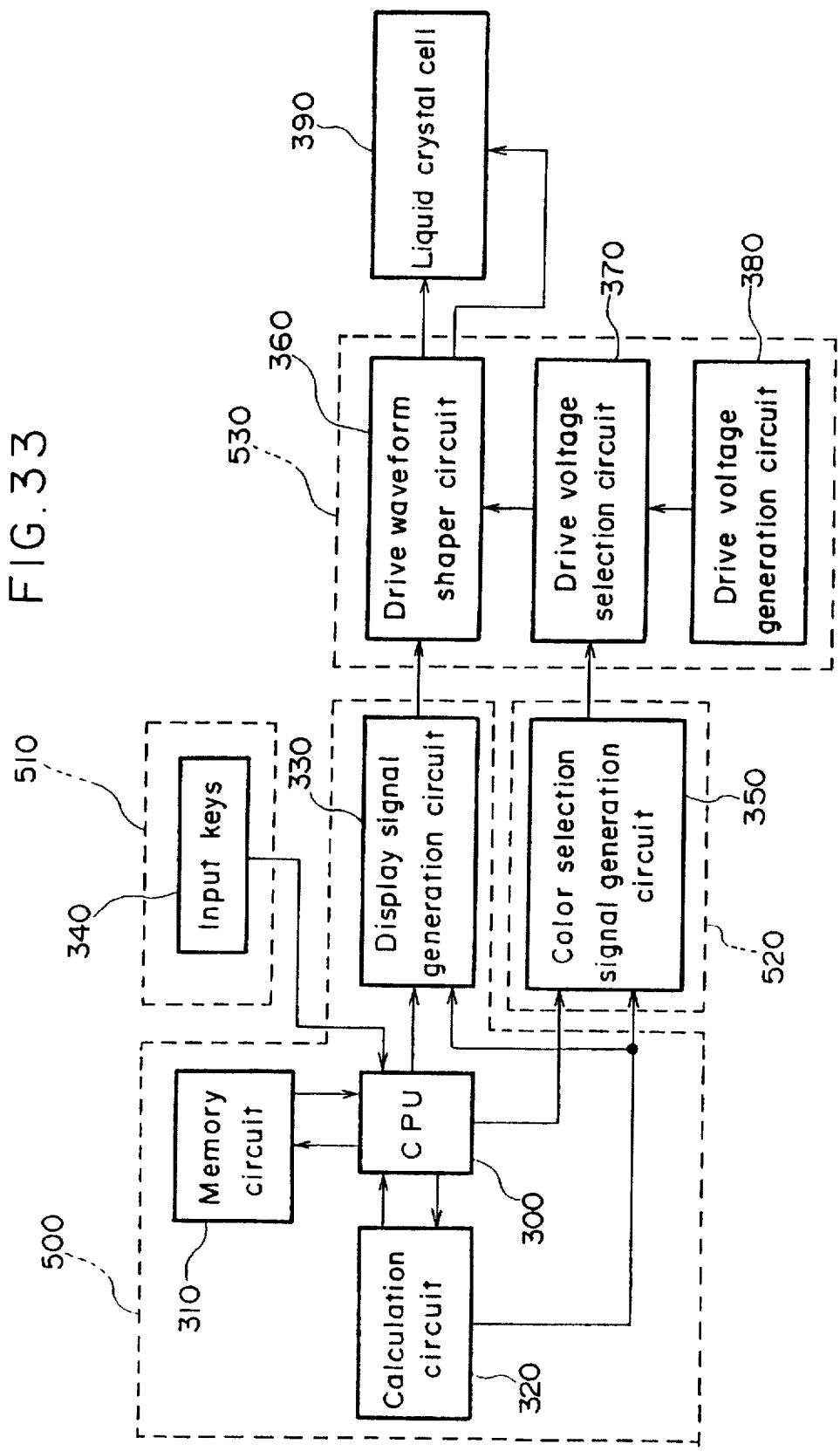
FIG. 33 shows an example of a circuit for driving the liquid crystal device mounted in the electronic equipment of FIG. 32.

Note that the liquid crystal cell 3 was driven by the drive circuitry shown in FIG. 33. This display circuitry comprises a calculation section 500, a key input section 510, a color control section 520, and a drive circuit 530. The calculation section 500 comprises a CPU 300, a memory circuit 310, a calculation circuit 320, and a display signal generation circuit 330. The CPU 300 controls the operations of all of the circuitry.

The key input section 510 is provided with input keys 340, and the configuration is such that signals that are input by using these input keys 340 are transferred to the CPU 300.

The color control section 520 is provided with a color selection signal generation circuit 35°.

The drive circuit 530 is provided with a drive waveform shaper circuit 360, a drive voltage selection circuit 370, and a drive voltage generation circuit 380. The drive voltage generation circuit 380 causes voltages of different voltage levels to be generated. The drive voltage selection circuit 370 selects a voltage level in answer to an instruction from the color selection signal generation circuit 35°, then supplies it to the drive waveform shaper circuit 360. The drive waveform shaper circuit 360 creates a drive waveform for the liquid crystal cell 3 on the basis of the voltage supplied from the drive voltage selection circuit 370 and a display signal supplied from the display signal generation circuit 330, and the liquid crystal cell 3 is driven by this drive waveform.

EMBODIMENT 14

The electronic equipment of this embodiment is an electronic organizer in which a liquid crystal display is installed.

In this embodiment, the liquid crystal display is configured of the liquid crystal device shown in FIGS. 1 and 3B.

In the configuration of FIGS. 1 and 3B, a uniaxially drawn film of PC was used as the retardation film 2. In addition, the twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were both set to 35° to 55°, and the angle θ2 between the direction B1 of the slow axis of the retardation film 2 and the direction of rubbing C1 of the upper plane was set to 80° to 100°.

A liquid crystal cell 3 was used in which the optical anisotropy Δn of the nematic liquid crystal 10 was 0.23 and the thickness d was 7 μm, in other words in which Δn·d was 1.61 μm, and the retardation R of the retardation film 2 was 1.8 μm. This reflective type of liquid crystal device was installed in the electronic organizer.

In this example, a graphics display controller (SED1351F, made by Seiko Epson Co.) was used as the drive circuit 15.

This graphics display controller is capable of selecting the display of two intermediate tones from eight steps between an off-voltage and an on-voltage, in addition to the off-voltage and on-voltage. From these steps, the display was set in such a manner that the color tone of the background color display was white at a tone level 0 (at the off-voltage), the display of ordinary alphanumeric characters was black at a tone level 3, and the display of emphasis or warning messages was yellow-green at a tone level 5 or pink at a tone level 7 (at the on-voltage). In this example, the frame frequency is preferably either 70 to 110 Hz or 120 to 180, because flickering that disrupts the screen is generated at other frequencies.

This electronic organizer was not only capable of displaying more information at a high reflection luminance and with improved visibility of the color display, the use of a reflective device enabled a sufficiently low power consumption.

EMBODIMENT 15

The electronic equipment of this embodiment is a personal digital assistant (PDA) in which a liquid crystal display is installed.

. In this embodiment, a uniaxially drawn film of PC was used as the retardation film 2 in the configuration of FIGS. 1 and 3B.

The twist angle T of the nematic liquid crystal 10 was set to 240°, the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were both set to 35° to 55°, and the angle θ2 between the direction B1 of the slow axis of the retardation film 2 and the direction of rubbing C1 of the upper plane was set to 80° to 100°. A liquid crystal cell 3 was used in which the optical anisotropy Δn of the nematic liquid crystal 10 was 0.22 and the thickness d was 7 μm, in other words in which Δn·d was 1.54 μm, and the retardation R of the retardation film 2 was 1.7 μm.

The above reflective type of liquid crystal device was installed in the PDA. In this example, a graphics display controller (SED1351F, made by Seiko Epson Co.) was used as the drive circuit. In addition, touch-sensitive keys were super imposed on the upper polarizing plate 1 to act as an input device.

The configuration was such that a palette of selectable tone levels was displayed on the screen, so that, if a palette corresponding to each tone level is selected by a pen-input device, alphanumeric characters can be displayed in a color corresponding to the voltage of the tone level selected. This enables the creation of an inherently colorful screen display, so that more information can be displayed in an easy-to-read fashion.

Figure 36:
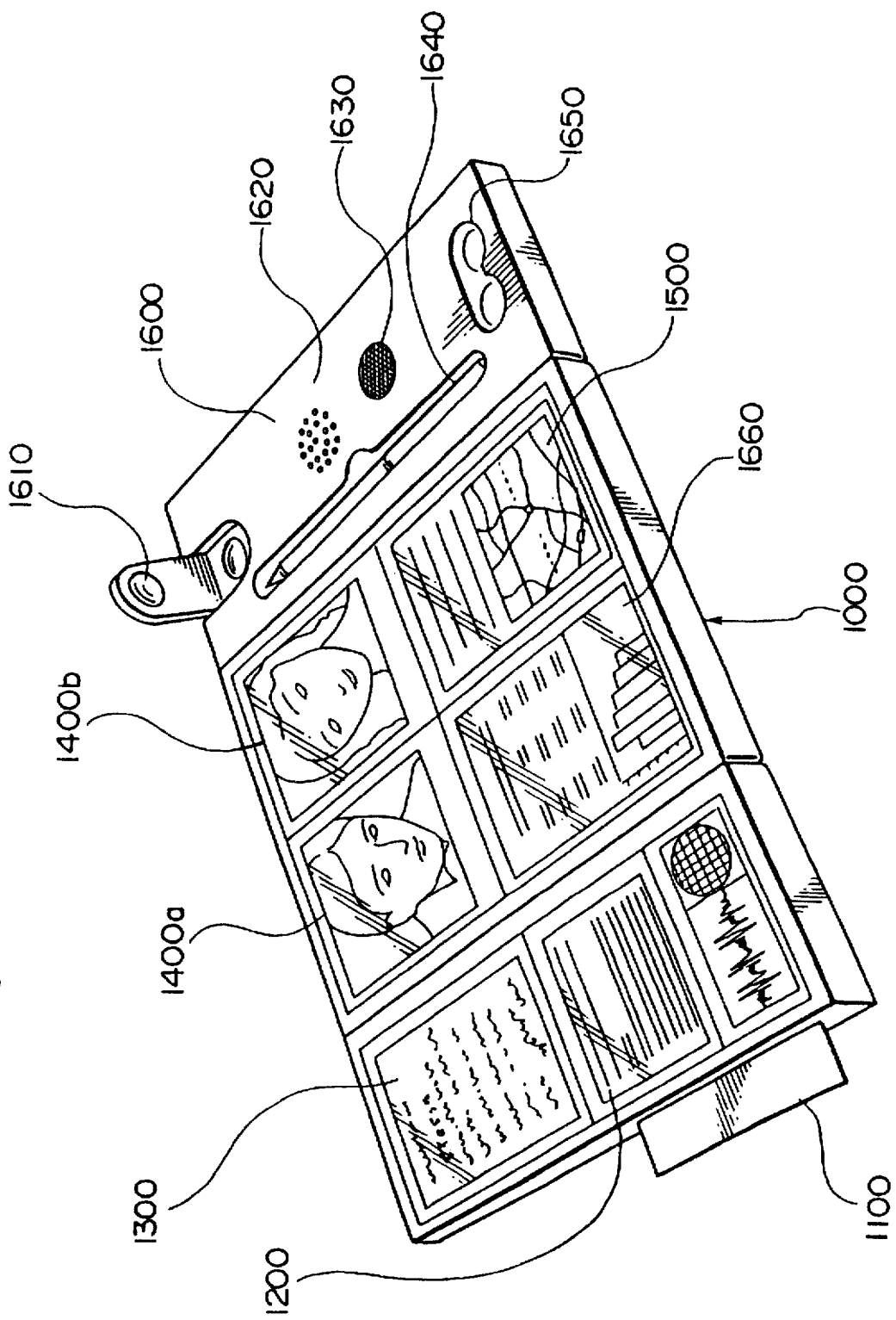
FIG. 36 shows another example of the electronic equipment of this invention in which a liquid crystal device is installed.

Therefore, the liquid crystal device of this invention could be installed in a more advanced personal portable information apparatus 1000, as shown in FIG. 36. The personal portable information apparatus 1000 of FIG. 36 comprises an IC card 1100, a simultaneous interpretation system 1200, a handwriting input screen 1300, a TV conferencing system 1400a and 1400b, a map information system 1500, and a liquid crystal display screen 1660.

The personal portable information apparatus 1000 is also provided with a video camera 1610, a speaker 1620, microphone 1630, an input pen 1640, and earphones 1650 in an input-output interface unit 1600.

EMBODIMENT 16

The electronic equipment of this embodiment is a calculator or a controller for an air-conditioner in which a liquid crystal display is installed.

In this embodiment, a uniaxially drawn film of PC was used as the retardation film 2 in the configuration of FIGS. 1 and 3B.

The twist angle T of the nematic liquid crystal 10 was set to 240°, both the angle θ1 between the direction A1 of the absorption axis (or polarization axis) of the upper polarizing plate 1 and the direction B1 of the slow axis of the retardation film 2 and the angle θ3 between the direction of rubbing C2 of the lower plane and the direction A2 of the absorption axis (or polarization axis) of the lower polarizing plate 4 were set to 35° to 55°, and the angle θ2 between the direction B1 of the slow axis of the retardation film 2 and the direction of rubbing C1 of the upper plane was set to 80° to 100°.

A liquid crystal cell 3 was used in which the optical anisotropy Δn of the nematic liquid crystal 10 was 0.22 and the thickness d was 7 μm, in other words in which Δn·d was 1.54 μm, and the retardation R of the retardation film 2 was 1.7 μm.

Figure 34A:
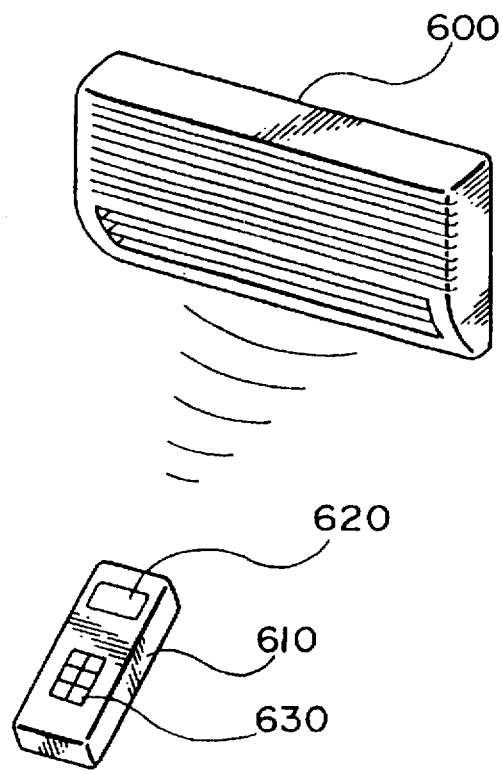
FIG. 34A shows another example of the electronic equipment of this invention (a controller of an air-conditioner) in which a liquid crystal device is installed and FIG. 34B shows yet another example of electronic equipment (a calculator)

The above described reflective type of liquid crystal device was installed as a display device in a controller of an air-conditioner. The external appearance of this air-conditioner controller is shown in FIG. 34A. This controller 610 is provided with a liquid crystal display 620 and input keys 630 and is designed to provide remote control over an air-conditioner 600.

A time division drive circuit that varies an on-voltage by varying a bias ratio was used as the drive circuit. In other words, the liquid crystal device was set in such a manner that a background color of white and another single color can be displayed simultaneously.

The configuration is such that alphanumeric characters are displayed in blue when the air-conditioner is functioning as a cooler, and in orange when it is functioning as a heater. In this manner, the configuration of the drive circuitry can be made comparatively simple by causing the voltage to vary over the entire screen surface, and thus an inexpensive drive system can be used.

Note that the liquid crystal display 620 installed in the air-conditioner controller of FIG. 34A is configured to be driven by the circuitry shown in FIG. 35.

The circuitry shown in FIG. 35 comprises a calculation section 502, a key input section 512, a color control section 522, and a drive circuit 532.

The calculation section 502 comprises a CPU 302, a memory circuit 312, a calculation circuit 322, and a display signal generation circuit 332. The CPU 302 controls the operations of all of the circuitry.

The key input section 512 is provided with input keys 342, and the configuration is such that signals that are input by using these input keys 342 are transferred to the CPU 302.

The color control section 522 is provided with a color selection signal generation circuit 352.

The drive circuit 532 is provided with a drive waveform shaper circuit 362 and a drive voltage generation circuit 382. The drive voltage generation circuit 382 selects bias ratios in answer to instructions from the color selection signal generation circuit 352, causes voltages of different voltage levels to be generated, and supplies them to the drive waveform shaper circuit 362.

The drive waveform shaper circuit 362 creates a drive waveform on the basis of the voltage supplied from the drive voltage generation circuit 382 and a display signal supplied from the display signal generation circuit 332, then drives the liquid crystal display 620 with this waveform.

Figure 34B:
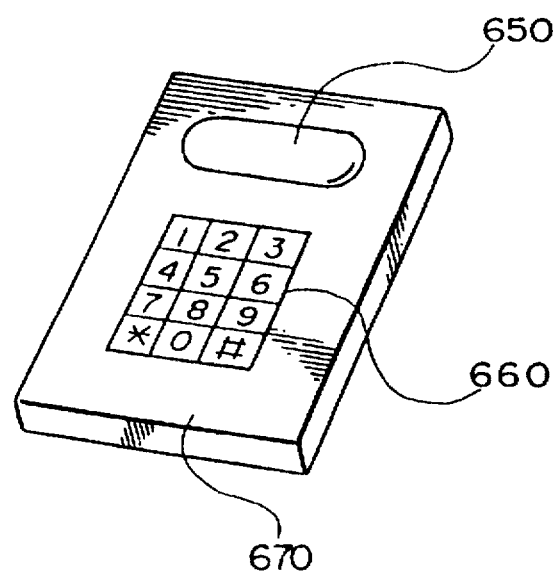

The liquid crystal device of this invention can also be installed in a small calculator as shown in FIG. 34B, in a similar manner to the above examples of electronic equipment. It can also be used as a display device in a games machine or any type of audio equipment in which a color display is necessary. The use of the liquid crystal device of this invention makes it possible to provide electronic equipment that is bright, easy to see, informative, and with a low power consumption.

We claim:

1. A liquid crystal device comprising a liquid crystal cell having a layer of nematic liquid crystal twisted to within the range of 180° to 360° and a pair of substrates on which are formed electrodes for applying a voltage to said nematic liquid crystal layer and which are disposed in an opposing manner in a form that sandwiches said nematic liquid crystal layer therebetween;

a pair of polarizing plates disposed on either side of said liquid crystal cell in a sandwich form;

a retardation film formed of polyvinyl alcohol (PVA) and provided between said liquid crystal cell and at least one polarizing plate of said pair of polarizing plates; and voltage application means capable of selecting at least three voltages to be applied between said pair of substrates; wherein:

said liquid crystal cell and said retardation film satisfy the relationships of Equations 1 and 2 below:

$$\Delta n \cdot d \geq 1 (\mu m) \quad \text{Equation 1}$$

$$0.5 \leq R - \Delta n \cdot d \leq 1.21 (\mu m) \quad \text{Equation 2}$$

where: $\Delta n \cdot d$ is the product of the optical anisotropy $\Delta n$ of said nematic liquid crystal layer and the thickness d of said nematic liquid crystal layer; and R is the sum of the products $\Delta n j \cdot d j$ of the optical anisotropy $\Delta n j$ of a jth (where j is an integer) layer of said retardation film and the thickness dj of the jth layer of said retardation film, taken from a first layer to an ith layer (where i is an integer greater than or equal to j) when i layers of said retardation film are used.

2. Electronic equipment in which is installed a liquid crystal device as defined in claim 1.

3. Electronic equipment in which is installed a liquid crystal device as defined in claim 1, and which is also provided with an input means for inputting data necessary for displaying an image on said liquid crystal device.

4. A liquid crystal device comprising a liquid crystal cell having a layer of nematic liquid crystal twisted to within the range of 180° to 360° and a pair of substrates on which are formed electrodes for applying a voltage to said nematic liquid crystal layer and which are disposed in an opposing manner in a form that sandwiches said nematic liquid crystal layer therebetween;

a pair of polarizing plates disposed on either side of said liquid crystal cell in a sandwich form;

an optically anisotropic substance provided between said liquid crystal cell and at least one polarizing plate of said pair of polarizing plates; and voltage application means capable of selecting at least three voltages to be applied between said pair of substrates; wherein:

said liquid crystal cell and said optically anisotropic substance satisfy the relationships of Equations 7 and 8 below:

$$\Delta n \cdot d \geq 1 (\mu m) \quad \text{Equation 7}$$

$$15.5 \times \alpha^2 - 40 \times \alpha + 25.1 \leq R - \Delta n \cdot d \leq 15.5 \times A^2 - 40 \times \alpha + 25.8 (\mu m) \quad \text{Equation 8}$$

where: $\Delta n \cdot d$ is the product of the optical anisotropy $\Delta n$ of said nematic liquid crystal layer and the thickness d of said nematic liquid crystal layer; R is the sum of the products $\Delta n j \cdot d j$ of the optical anisotropy $\Delta n j$ of a jth (where j is an integer) layer of said optically anisotropic substance and the thickness dj of the jth layer of said optically anisotropic substance, taken from a first layer to an ith layer (where i is an integer greater than or equal to j) when i layers of said optically anisotropic substance are used; and a is the ratio of the optical anisotropy of said optically anisotropic substance at a wavelength of 450 nm with respect to the optical anisotropy of said optically anisotropic substance at a wavelength of 590 nm.

5. The liquid crystal device of claim 4, wherein:

said means capable of selecting at least three values of voltage to be applied between said pair of substrates is a time division drive circuit that is capable of applying at least one other voltage between a selected voltage and a non-selected voltage, in addition to said selected voltage and said non-selected voltage.

49

6. The liquid crystal device of claim 5, wherein:

said optically anisotropic substance is a second liquid crystal cell having an orientated liquid crystal filling a space between said pair of opposed substrates.

7. The liquid crystal device of claim 4, wherein:

said liquid crystal cell satisfies the relationship of Equation 9 below:

$$\Delta n \cdot d \geq \frac{0.8 \times (\beta - 1)}{(P - 1)} + 0.6(\mu m) \qquad \text{Equation 9}$$

where $\Delta n \cdot d$ is the product of the optical anisotropy $\Delta n$ of said nematic liquid crystal layer and the thickness d of said nematic liquid crystal layer; $\beta$ is the ratio of the voltage at which the capacitance of said liquid crystal cell is 0.3 to the voltage at which the capacitance of said liquid crystal cell is 0.1, when the capacitance of said liquid crystal cell is 0 for a voltage of 0.5 V applied between said pair of substrates and the capacitance of said liquid crystal cell is 1 for a voltage of 25 V applied between said pair of substrates; and P is the ratio of a selected voltage to a non-selected voltage.

8. The liquid crystal device of claim 7, wherein:

said optically anisotropic substance is a second liquid crystal cell having an orientated liquid crystal filling a space between said pair of opposed substrates.

9. The liquid crystal device of claim 4, wherein:

said optically anisotropic substance is a polymer film.

10. The liquid crystal device of claim 9, wherein:

said polymer film that is said optically anisotropic substance has a refractive index nx in the direction of the maximum refractive index parallel to the film surface, a refractive index ny in a direction perpendicular to nx and parallel to the film surface, and a refractive index nz in the film thickness direction, where said refractive indices satisfy the relationship of Equation 10 below:

$$(nx-nz)/(nx-ny) \leq 0.7 \qquad \text{Equation 10.}$$

11. The liquid crystal device of claim 9, wherein:

the direction of the slow axis of said polymer film that is said optically anisotropic substance is parallel to the film surface and also varies continuously with respect to said film thickness direction.

12. The liquid crystal device of claim 4, wherein:

said optically anisotropic substance is a second liquid crystal cell having an orientated liquid crystal filling a space between said pair of opposed substrates.

13. The liquid crystal device of claim 12, wherein:

the liquid crystal used in said second liquid crystal cell is a nematic liquid crystal, and the ratio of the nematic first-order phase transition temperatures of said nematic liquid crystal in said second liquid crystal cell and said nematic liquid crystal used in another liquid crystal cell is in the range of 0.8 to 1.2.

14. The liquid crystal device of claim 4, wherein:

at a contacting surface between one polarizing plate of said pair of polarizing plates and said liquid crystal cell, the angle between the direction in which molecules of said nematic liquid crystal are aligned in contact with the inner surface of said liquid crystal cell and one of the absorption axis and polarization axis of said polarizing plate is within the range of 15° to 75°.

15. The liquid crystal device of claim 4, wherein:

at a contacting surface between said liquid crystal cell and said optically anisotropic substance, the angle between the direction in which molecules of said nematic liquid

50 crystal are aligned in contact with the inner surface of said liquid crystal cell and the slow axis of said optically anisotropic substance is in the range of 60° to 120°.

16. The liquid crystal device of claim 4, wherein:

at a contacting surface between said optically anisotropic substance and one polarizing plate of said pair of polarizing plates, the angle between the slow axis of said optically anisotropic substance and one of the absorption axis and polarization axis of said polarizing plate is in the range of 15° to 75°.

17. The liquid crystal device of claim 4, wherein:

one of a reflective plate and transflector is further provided on an outer side of one polarizing plate of said pair of polarizing plates.

18. A liquid crystal device comprising a liquid crystal cell having a layer of nematic liquid crystal twisted to within the range of 180° to 360° and a pair of substrates on which are formed electrodes for applying a voltage to said nematic liquid crystal layer and which are disposed in an opposing manner in a form that sandwiches said nematic liquid crystal layer therebetween;

a pair of polarizing plates disposed on either side of said liquid crystal cell in a sandwich form;

a retardation film formed of polycarbonate (PC) and provided between said liquid crystal cell and at least one polarizing plate of said pair of polarizing plates; and voltage application means capable of selecting at least three voltages to be applied between said pair of substrates; wherein:

said liquid crystal cell and said retardation film satisfy the relationships of Equations 3 and 4 below:

$$\Delta n \cdot d \geq 1 (\mu m) \qquad \text{Equation 3}$$

$$-0.08 \leq R - \Delta n \cdot d \leq 0.62 (\mu m) \qquad \text{Equation 4}$$

where: $\Delta n \cdot d$ is the product of the optical anisotropy $\Delta n$ of said nematic liquid crystal layer and the thickness d of said nematic liquid crystal layer; and R is the sum of the products $\Delta n j \cdot dj$ of the optical anisotropy $\Delta n j$ of a jth (where j is an integer) layer of said retardation film and the thickness dj of the jth layer of said retardation film, taken from a first layer to an ith layer (where i is an integer greater than or equal to j) when i layers of said retardation film are used.

19. A liquid crystal device comprising a liquid crystal cell having a layer of nematic liquid crystal twisted to within the range of 180° to 360° and a pair of substrates on which are formed electrodes for applying a voltage to said nematic liquid crystal layer and which are disposed in an opposing manner in a form that sandwiches said nematic liquid crystal layer therebetween;

a pair of polarizing plates disposed on either side of said liquid crystal cell in a sandwich form;

a retardation film formed of polysulfone (PSF) and provided between said liquid crystal cell and at least one polarizing plate of said pair of polarizing plates; and voltage application means capable of selecting at least three voltages to be applied between said pair of substrates; wherein:

said liquid crystal cell and said retardation film satisfy the relationships of Equations 5 and 6 below:

$$\Delta n \cdot d \geq 1 (\mu m) \qquad \text{Equation 6}$$

$$-0.40 \leq R - \Delta n \cdot d \leq 0.30 (\mu m)$$

where: $\Delta n \cdot d$ is the product of the optical anisotropy $\Delta n$ of said nematic liquid crystal layer and the thickness d of said nematic liquid crystal layer; and R is the sum of the products $\Delta n_j \cdot d_j$ of the optical anisotropy $\Delta n_j$ of a jth (where j is an integer) layer of said retardation film and the thickness dj of the jth layer of said retardation film, taken from a first layer to an ith layer (where i is an integer greater than or equal to j) when i layers of said retardation film are used.

* * * * *